US011699372B2

United States Patent
Lee et al.

(10) Patent No.: US 11,699,372 B2
(45) Date of Patent: Jul. 11, 2023

(54) ELECTRONIC DEVICE INCLUDING A FLEXIBLE DISPLAY WITH VARIABLE REGION AND METHOD OF HEATING THE VARIABLE REGION OF THE FLEXIBLE DISPLAY

(71) Applicant: Samsung Electronics Co., Ltd., Suwon-si (KR)

(72) Inventors: Jookwan Lee, Suwon-si (KR); Youngmin Kang, Suwon-si (KR); Myunghoon Kwak, Suwon-si (KR); Youngrog Kim, Suwon-si (KR); Songyi Lee, Suwon-si (KR); Jihyung Jung, Suwon-si (KR); Hoyoung Jeong, Suwon-si (KR); Baekeun Cho, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/573,138

(22) Filed: Jan. 11, 2022

(65) Prior Publication Data

US 2022/0148478 A1 May 12, 2022

Related U.S. Application Data

(63) Continuation of application No. PCT/KR2021/016063, filed on Nov. 5, 2021.

(30) Foreign Application Priority Data

Nov. 6, 2020 (KR) .................. 10-2020-0147376
Mar. 9, 2021 (KR) .................. 10-2021-0031029

(51) Int. Cl.
*G09G 3/00* (2006.01)

(52) U.S. Cl.
CPC ........ *G09G 3/035* (2020.08); *G09G 2320/041* (2013.01); *G09G 2320/0686* (2013.01)

(58) Field of Classification Search
CPC ..... G09G 2320/041; G09G 2320/0686; G09G 2330/04; G09G 2380/02; G09G 3/035;
(Continued)

(56) References Cited

U.S. PATENT DOCUMENTS 9,693,391 B2   6/2017  Jang et al.
10,156,871 B2  12/2018 Wang et al.
(Continued)

FOREIGN PATENT DOCUMENTS

CN   109799876 A   5/2019
CN   111179758 A   5/2020
(Continued)

OTHER PUBLICATIONS

International Search Report and Written Opinion dated Feb. 14, 2022, issued in International Patent Application No. PCT/KR2021/016063.

*Primary Examiner* — Richard J Hong
(74) *Attorney, Agent, or Firm* — Jefferson IP Law, LLP

(57) ABSTRACT

An operating method of an electronic device is provided. The method includes measuring an external temperature of the electronic device by using at least one sensor. The method may calculate, from an entire region of a flexible display, a fixed region that is visually exposed to an outside regardless of a screen size of the electronic device, and a variable region that is visually exposed at least in part to the outside in a screen expansion or screen size change state of the electronic device. The method may compare the external temperature with a preset first threshold temperature, thereby determining heating of the variable region in response to the external temperature being less than the first
(Continued)

threshold temperature. The method may heat the variable region by controlling at least one of a luminance or a driving frequency of the variable region.

19 Claims, 25 Drawing Sheets

(58) Field of Classification Search
CPC ...... G06F 1/203; G06F 1/1624; G06F 1/1681; H04M 1/0237; H04M 1/0268; F16K 15/063; G09F 9/301
See application file for complete search history.

(56) References Cited

U.S. PATENT DOCUMENTS

| | | | |
|---|---|---|---|
| 10,876,775 B2 * | 12/2020 | Danielson | ............. F16K 15/063 |
| 11,095,761 B1 * | 8/2021 | Lim | .................... H04M 1/0268 |
| 2014/0002114 A1 | 1/2014 | Schwartz et al. | |
| 2014/0361004 A1 | 12/2014 | Jang et al. | |
| 2016/0135286 A1 | 5/2016 | Hwang et al. | |
| 2017/0060189 A1 | 3/2017 | Sohn et al. | |
| 2017/0064879 A1 | 3/2017 | Lee et al. | |
| 2018/0164854 A1 * | 6/2018 | Wood | .................... G06F 1/1681 |
| 2019/0069451 A1 | 2/2019 | Myers et al. | |
| 2020/0194712 A1 | 6/2020 | Choi et al. | |
| 2020/0253069 A1 * | 8/2020 | Cha | ........................ G06F 1/1681 |
| 2020/0264660 A1 * | 8/2020 | Song | ..................... G06F 1/1624 |
| 2020/0337159 A1 * | 10/2020 | Yang | ....................... G06F 1/1624 |
| 2021/0375165 A1 * | 12/2021 | Feng | ........................ G09F 9/301 |
| 2021/0400852 A1 | 12/2021 | Kim | |
| 2021/0405703 A1 * | 12/2021 | Song | .................... H04M 1/0237 |
| 2022/0253103 A1 * | 8/2022 | Choi | ........................ G06F 1/203 |

FOREIGN PATENT DOCUMENTS

| | | |
|---|---|---|
| CN | 112703548 A | 4/2021 |
| CN | 113811136 A | 12/2021 |
| JP | 2016-532136 A | 10/2016 |
| KR | 10-2014-0143638 A | 12/2014 |
| KR | 10-2017-0024204 A | 3/2017 |
| KR | 10-1891169 B1 | 8/2018 |
| KR | 10-2020-0052496 A | 5/2020 |
| KR | 10-2020-0064573 A | 6/2020 |
| KR | 10-2020-0074700 A | 6/2020 |
| WO | 2014/004782 A1 | 1/2014 |

* cited by examiner

ELECTRONIC DEVICE INCLUDING A FLEXIBLE DISPLAY WITH VARIABLE REGION AND METHOD OF HEATING THE VARIABLE REGION OF THE FLEXIBLE DISPLAY

CROSS-REFERENCE TO RELATED APPLICATION(S)

This application is a continuation application, claiming priority under § 365(c), of an International application No. PCT/KR2021/016063, filed on Nov. 5, 2021, which is based on and claims the benefit of a Korean patent application number 10-2020-0147376, filed on Nov. 6, 2020, in the Korean Intellectual Property Office, and of a Korean patent application number 10-2021-0031029, filed on Mar. 9, 2021, in the Korean Intellectual Property Office, the disclosure of each of which is incorporated by reference herein in its entirety.

TECHNICAL FIELD

The disclosure relates to an electronic device including a flexible (e.g., rollable) display and an operating method thereof.

BACKGROUND ART

An electronic device (e.g., a foldable phone) that can be folded or unfolded by applying a flexible display, and an electronic device (e.g., a slidable phone) that can expand the flexible display in a sliding manner are being developed. In addition, an electronic device (e.g., a rollable phone) that can roll or unroll a screen by applying a rollable display is being developed.

The above information is presented as background information only to assist with an understanding of the disclosure. No determination has been made, and no assertion is made, as to whether any of the above might be applicable as prior art with regard to the disclosure.

DISCLOSURE

Technical Problem

When a screen is expanded or reduced by applying a flexible (e.g., rollable) display to an electronic device, a stress that resists an external force applied to the flexible display may occur. Due to the stress and the external force applied to the flexible display, a breakage may occur in a portion (e.g., the variable region 312 in FIG. 3A) where the flexible display is deformed. In particular, as an external temperature and a temperature of the variable region decrease, a breakage risk of the flexible display may increase.

Aspects of the disclosure are to address at least the above-mentioned problems and/or disadvantages and to provide at least the advantages described below. Accordingly, an aspect of the disclosure is to provide an electronic device for reducing a breakage of the display by calculating the external temperature and a movement value of the display (e.g., an unfolded degree of the display) through various sensors and adjusting the temperature of the variable region (e.g., the variable region 312 in FIG. 3A) having a high risk of breakage when the screen of the display is expanded or reduced.

The technical problems to be achieved in the disclosure are not limited to the above-mentioned, and other technical problems not mentioned are clearly understood from the following description by a person skilled in the art to which the disclosure belongs.

Additional aspects will be set forth in part in the description which follows and, in part, will be apparent from the description, or may be learned by practice of the presented embodiments.

Technical Solution

In accordance with an aspect of the disclosure, an operating method of an electronic device is provided. The method includes measuring an external temperature of the electronic device by using at least one sensor module. The method may calculate, from an entire region of a flexible display, a fixed region that is visually exposed to an outside regardless of a screen size of the electronic device, and a variable region that is visually exposed at least in part to the outside in a screen expansion or screen size change state of the electronic device. The method may compare the external temperature with a preset first threshold temperature, thereby determining heating of the variable region when the external temperature is smaller than the first threshold temperature. The method may heat the variable region by controlling at least one of a luminance and a driving frequency of the variable region.

In accordance with another aspect of the disclosure, an electronic device is provided. The electronic device includes a housing, a flexible display, a display driver, a plurality of sensors, a processor, and a memory. The flexible display may include a variable region drawn out from the housing to an outside or inserted into the housing from the outside when a screen size is changed. The display driver may drive the flexible display. The plurality of sensors may sense an external temperature of the electronic device, a temperature of the flexible display, and the variable region depending on a change in the screen size of the electronic device. The processor may control the display driver and the plurality of sensors. The memory may be operatively connected to the processor. The memory may store instructions that cause, when executed, the processor to measure the external temperature of the electronic device by using at least one of the plurality of sensors, to calculate, from an entire region of the flexible display, a fixed region that is visually exposed to the outside regardless of the screen size of the electronic device, and a variable region that is visually exposed at least in part to the outside in a screen expansion or screen size change state of the electronic device, to compare the external temperature with a preset first threshold temperature, thereby determining heating of the variable region when the external temperature is smaller than the first threshold temperature, and to heat the variable region by controlling at least one of a luminance and a driving frequency of the variable region.

In accordance with another aspect of the disclosure, an electronic device is provided. The electronic device includes a housing, a flexible display, a printed circuit board, a heat dissipation member, a slide structure, and a flexible heat dissipation member. The flexible display may include, among an entire region thereof, a fixed region visually exposed to an outside regardless of a screen size of the electronic device, and a variable region drawn out from the housing and visually exposed at least in part to the outside in a screen expansion or screen size change state of the electronic device. The printed circuit board may be disposed in an inner space of the housing and include an electronic component. The heat dissipation member may be disposed on the electronic component and dissipate heat generated by the electronic component. The slide structure may include a slide plate disposed on the heat dissipation member in the inner space of the housing and supporting the fixed region, and a plurality of multi-bars supporting the variable region. The flexible heat dissipation member may be disposed on the slide structure. The flexible heat dissipation member may be disposed between the slide structure and the flexible display, and dissipate heat generated by the electronic component to the flexible display.

Advantageous Effects

The electronic device according to various embodiments of the disclosure can heat the variable region of the display in screen expansion (e.g., slide-out), screen reduction (e.g., slide-in), and screen size change (e.g., sliding) states of the electronic device in consideration of a temperature environment (external temperature) that may cause a breakage of the display. Through this, it is possible to reduce the display breakage caused by a low-temperature environment when the screen size of the electronic device is changed.

The electronic device according to various embodiments of the disclosure may set the luminance and/or the driving frequency for heating the display in consideration of the charge level of the battery. Through this, it is possible to quickly heat the display and thereby reduce a breakage of the display in a low-temperature environment.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

Throughout the drawings, it should be noted that like reference numbers are used to depict the same or similar elements, features, and structures.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
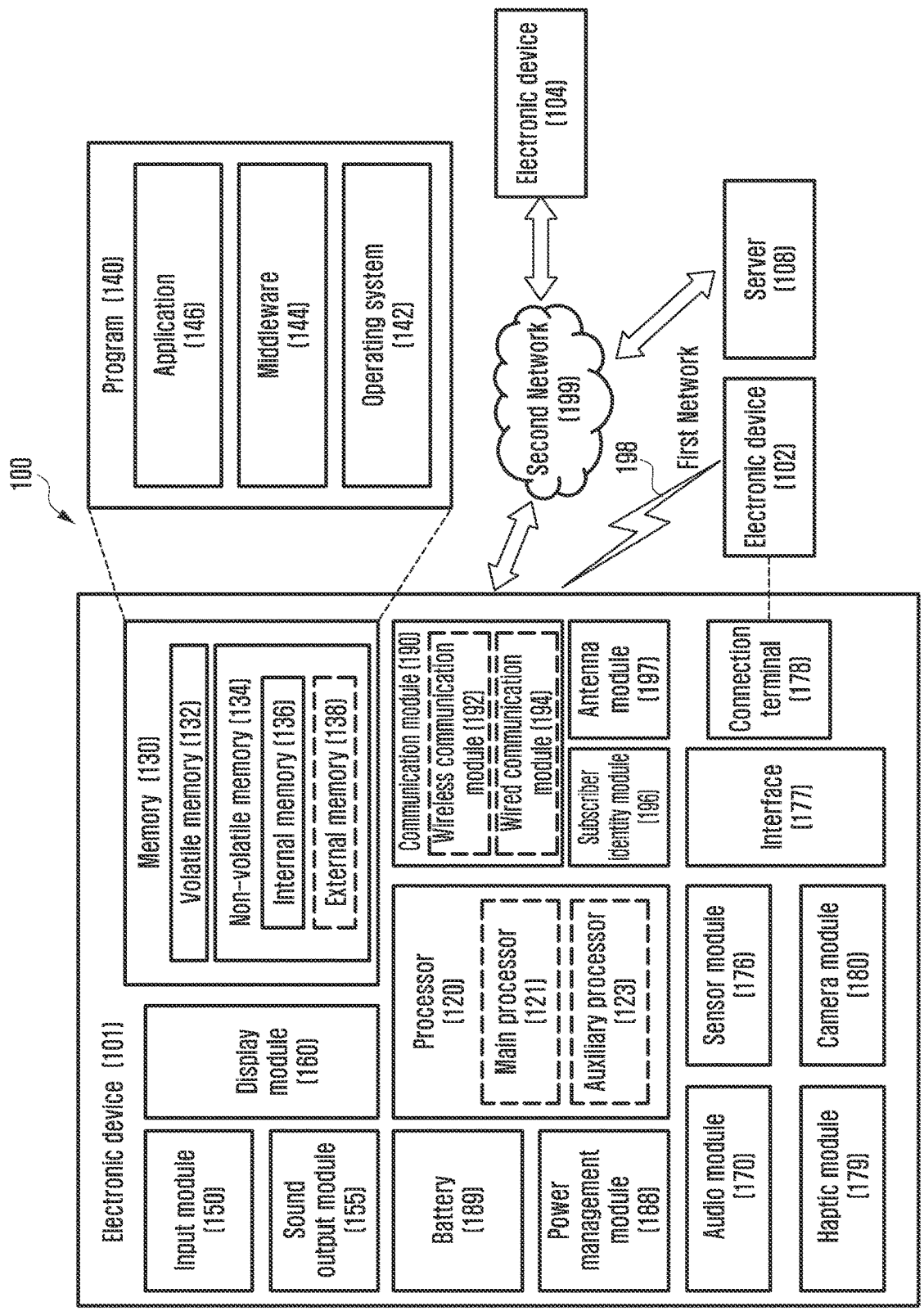
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
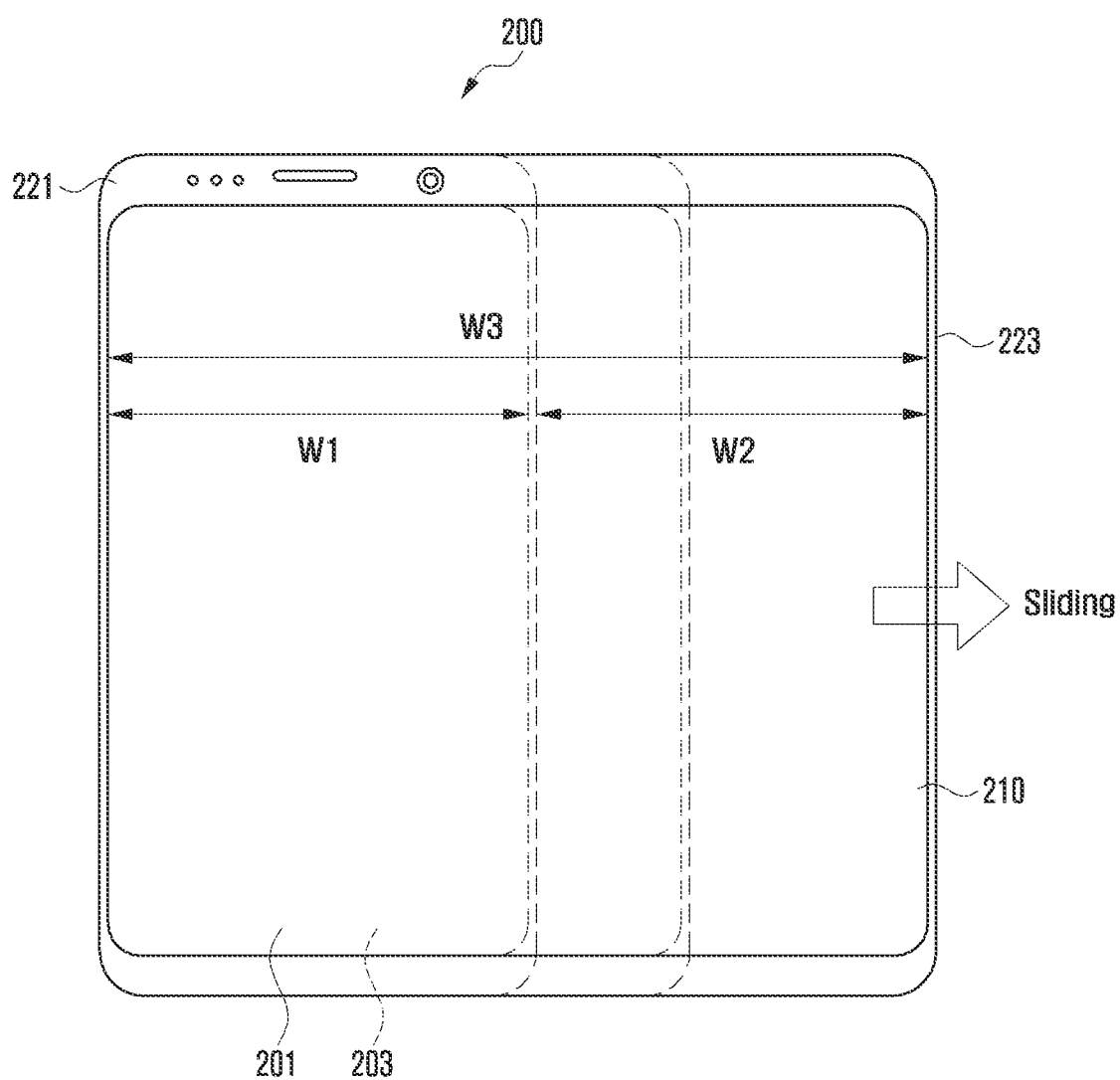
FIG. 2A is a diagram illustrating a form in which an electronic device expands a display according to an embodiment of the disclosure.

FIG. 2A is a diagram illustrating a form in which an electronic device expands a display according to an embodiment of the disclosure.

Referring to FIG. 2A, an electronic device 200 (e.g., an electronic device 101 in FIG. 1) according to an embodiment of the disclosure may include a first plate 201 facing a first direction (e.g., a front surface) and a second plate 203 facing a second direction (e.g., a rear surface) opposite to the first direction. The electronic device 200 may include a flexible display 210 (e.g., the display module 160 in FIG. 1) that is visually exposed through housings 221 and 223 forming a space between the first and second plates 201 and 203 and/or the first plate 201. Here, the flexible display 210 (e.g., a rollable display) may be an OLED display or an LCD display.

According to various embodiments, the term "exposed" in the following description may include "visually exposed". For example, the term "not exposed" in the following description may include "not visually exposed".

According to an embodiment, the electronic device 200 may include a first housing 221 and a second housing 223.

According to an embodiment, the first housing 221 may be formed to be fixed, and the second housing 223 may be formed to be movable in a sliding manner. For example, the second housing 223 may be formed to be slidable in the first direction from the first housing 221. In addition, the second housing 223 may be formed to be slidable in the second direction opposite to the first direction. According to an embodiment, when the second housing 223 of the electronic device 200 slides in the first direction, the flexible display 210 may be expanded to display an expanded screen. According to an embodiment, when the second housing 223 of the electronic device 200 slides in the second direction, the flexible display 210 may be reduced to display a reduced screen (e.g., a fixed region).

According to an embodiment, when the second housing 223 slides in the first direction, the second housing 223 may move by the maximum second width W2 in one direction of the first housing 221.

According to an embodiment, the display 210 may be a flexible display in which the width of an externally exposed region is adjusted based on the movement of the second housing 223. For example, in normal times, at least a portion of the display 210 may be exposed to have the first width W1. The second housing 223 may be moved in a sliding manner, and the other portion of the display 210 may be expanded by the maximum second width W2 and exposed. For example, the flexible display 210 may be expanded from the first width W1 to the second width W2, thereby being exposed to have the third width W3.

When the display 210 does not slide and is thus exposed with the first width W1, this may be defined as a display reduction, display-in, slide close, or slide-in state (e.g., screen reduction state).

When the display 210 slide and is thus exposed with the third width W3, this may be defined as a display expansion, display-out, slide open, or slide-out state (e.g., a screen expansion state).

The electronic device 200 may include at least one sensor module (e.g., the sensor module 176 in FIG. 1) for sensing a screen reduction (e.g., slide-in) state, a screen size change (e.g., sliding) state, and a screen expansion (e.g., slide-out) state of the display 210.

Through the at least one sensor module 176, the electronic device 200 may sense whether the display 210 is in the slide-in state, the slide-out state, or the screen size change state (e.g., a sliding state, an intermediate state between slide-in and slide-out, or an intermediate state between screen expansion and screen reduction).

According to an embodiment, the screen size change state may include a state (e.g., the sliding state) in which the slide-out does not proceed completely from the screen reduction state of the display 210 and a part of the display 210 is unfolded or is being unfolded.

According to an embodiment, the screen size change state may include a state (e.g., the sliding state) in which the slide-in does not proceed completely from the screen expansion state of the display 210 and a part of the display 210 is inserted or is being inserted.

The sensing result of the at least one sensor module 176 may be transmitted to a processor (e.g., the processor 120 in FIG. 1). The processor (e.g., the processor 120 in FIG. 1) may determine whether the display 210 is in the slide-in state, the slide-out state, or the screen size change state (e.g., the sliding state, an intermediate state between slide-in and slide-out, or an intermediate state between screen expansion and screen reduction).

According to an embodiment, the processor (e.g., the processor 120 in FIG. 1) may change the luminance and/or driving frequency of the entire or part of the display depending on the slide-in state, the slide-out state, or the screen size change state (e.g., the sliding state, an intermediate state between slide-in and slide-out, or an intermediate state between screen expansion and screen reduction) of the display 210.

When the display 210 (e.g., a flexible display) is applied to the electronic device 200 and thereby the screen is expanded or reduced, a stress that resists an external force applied to the display 210 may occur. Due to the stress and the external force applied to the display 210, a breakage may occur in a portion (e.g., the variable region 312 in FIG. 3A) where the display 210 is changed in form. As the external temperature and the temperature of the variable region 312 decrease, the risk of breakage of the display 210 may increase. The electronic device 200 according to various embodiments of the disclosure can reduce a breakage of the display 210 by calculating the external temperature and a movement value of the display (e.g., an unfolded degree of the display) through various sensors and adjusting the temperature of the variable region 312 having a high risk of breakage when the screen of the display 210 is expanded or reduced.

Figure 2B:
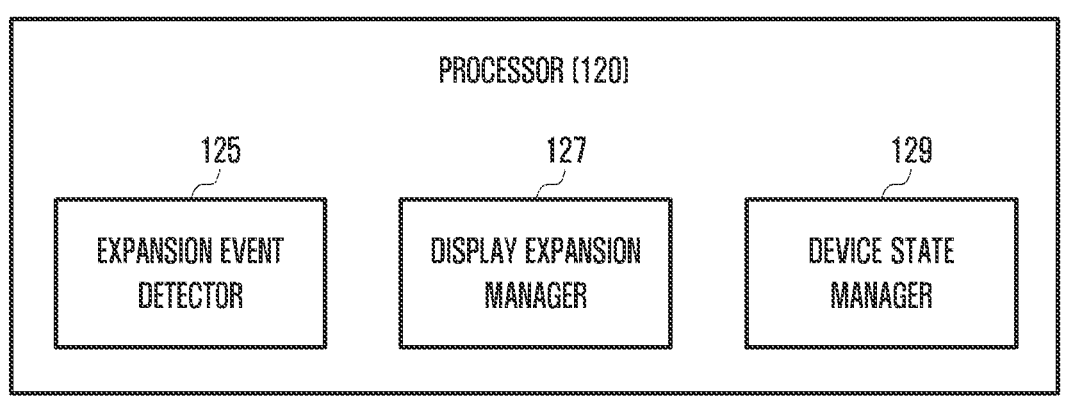
FIG. 2B is a diagram illustrating a processor of an electronic device according to an embodiment of the disclosure.

FIG. 2B is a diagram illustrating a processor of an electronic device according to an embodiment of the disclosure.

Figure 2C:
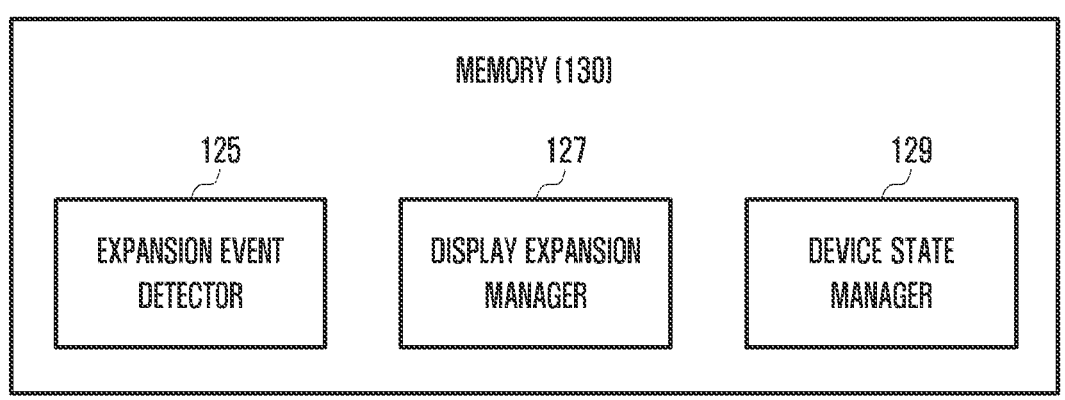
FIG. 2C is a diagram illustrating a memory of an electronic device according to an embodiment of the disclosure.

FIG. 2C is a diagram illustrating a memory of an electronic device according to an embodiment of the disclosure.

Referring to FIGS. 2A and 2B, in an embodiment, a processor 120 may include an expansion event detector 125, a display expansion manager 127, and a device state manager 129.

Referring to FIGS. 2A and 2C, in an embodiment, a memory 130 (e.g., a memory 130 in FIG. 1) may include an expansion event detector 125, a display expansion manager 127, and a device state manager 129. For example, the memory 130 (e.g., the memory 130 in FIG. 1) may store instructions that cause, when executed, the processor (e.g., the processor 120 in FIG. 1) to perform operations of the expansion event detector 125, the display expansion manager 127, and the device state manager 129.

Figure 3A:
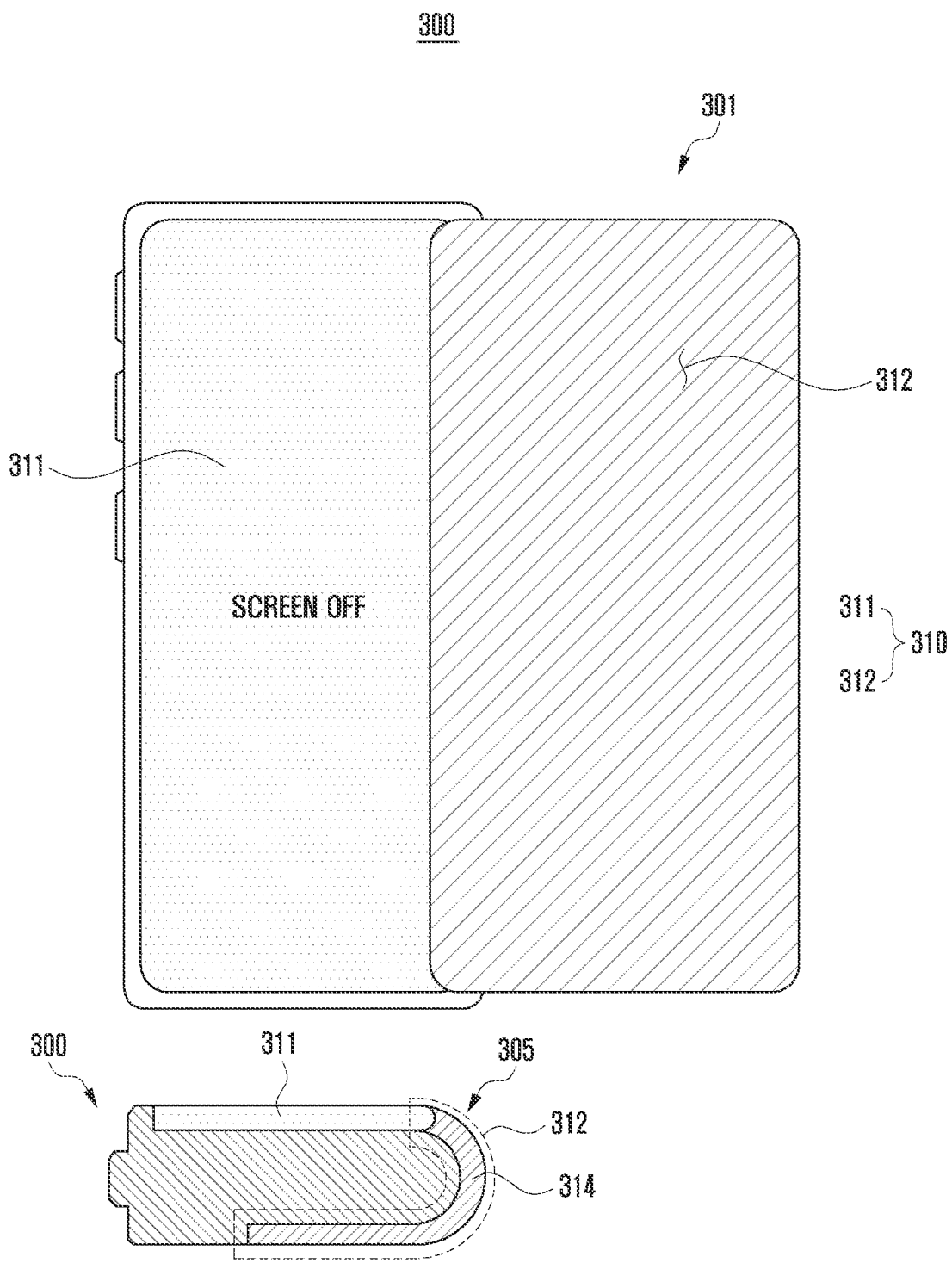
FIG. 3A is a diagram illustrating that a screen is turned off in a slide-in state (e.g., a screen reduction state) of an electronic device according to an embodiment of the disclosure.

According to an embodiment, the processor 120 may sense the degree of expansion (or reduction) of the display 210 so as to reduce a breakage of a variable region (e.g., the variable region 312 in FIG. 3A) of the display 210 (e.g., the display 310 in FIG. 3A). Based on the result of sensing the degree of expansion (or reduction) of the display 210, the processor 120 may control the temperature of at least a partial region (e.g., the variable region 312 in FIG. 3A) of the display 210 to be maintained or changed when the display 210 is expanded or reduced.

According to an embodiment, the processor 120 may check the expanded or reduced state of the display 210 and the on/off state of a fixed region (e.g., the fixed region 311 in FIG. 3A). Depending on the expanded or reduced state of the display 210 and the on/off state of a fixed region (e.g., the fixed region 311 in FIG. 3A), the processor 120 may set the entire of the variable region (e.g., the variable region 312 in FIG. 3A) as a heating region (e.g., the heating region 314 in FIG. 3A) and adjust a heating temperature of the display 210.

According to an embodiment, depending on the expanded or reduced state of the display 210 and the on/off state of a fixed region (e.g., the fixed region 311 in FIG. 3A), the processor 120 may set a part of the variable region (e.g., the variable region 312 in FIG. 3A) as a heating region (e.g., the heating region 314 in FIG. 3A) and adjust a heating temperature of the display 210.

According to an embodiment, the processor 120 may control the driving of a display driver (e.g., the display drive IC (DDI)) to maintain or change the temperature of the variable region (e.g., the variable region 312 in FIG. 3A) in which the display 210 is bent when the display 210 is expanded or reduced.

In an example, the expansion event detector 125 may receive a sensing value from at least one sensor module (e.g., the sensor module 176 in FIG. 1, e.g., TSP or Hall-IC). The expansion event detector 125 may sense the degree of expansion (or reduction) of the display 210, based on the received sensing value. That is, the expansion event detector 125 may detect whether the display 210 is expanded (or reduced). The expansion event detector 125 may output a sensing value for expansion (or reduction) of the display 210.

In an example, the display expansion manager 127 may analyze the sensing value received from the at least one sensor module (e.g., the sensor module 176 in FIG. 1) and thereby determine whether at the current time the display 210 is in an expanded state, a reduced state, or a screen size change state (e.g., a sliding state, an intermediate state between slide-in and slide-out, or an intermediate state between screen expansion and screen reduction). In case that the display 210 is in the expanded state or the screen size change state (e.g., the sliding state, the intermediate state between slide-in and slide-out, or the intermediate state between screen expansion and screen reduction), the display expansion manager 127 may calculate an expanded size of the display 210, that is, how much the display 210 is expanded from the reduced state. The display expansion manager 127 may generate expansion information indicating the expanded size of the display 210. The display expansion manager 127 may output the expansion information of the display 210.

In an example, the device state manager 129 may determine a heating region (e.g., the heating region 314 in FIG. 3A) of the display 210 according to a low-temperature environment, based on operation state information of the display 210. Here, the operation state information of the display 210 may include information about whether the display 210 sleeps, whether the screen of the display 210 is turned on or off, the temperature of the display 210, and/or the ambient temperature of the display 210. The device state manager 129 may control the display driver (e.g., DDI) to maintain or change the temperature of the variable region (e.g., the variable region 312 in FIG. 3A) of the display 210.

In an example, the device state manager 129 may provide the display driver (e.g., DDI) with information about the heating region (e.g., the heating region 314 in FIG. 3A) to be temperature-adjusted among the entire region of the display 210 and characteristic information (e.g., luminance of the variable region, driving frequency of the variable region) for variable region temperature control of the display 210.

In an example, the display driver (e.g., DDI) may adjust the temperature of the variable region by driving the display 210, based on information about the variable region (e.g., the variable region 312 in FIG. 3A) and characteristic information for variable region temperature control of the display 210.

FIG. 3A is a diagram illustrating that a screen is turned off in a slide-in state (e.g., a screen reduction state) of an electronic device according to an embodiment of the disclosure.

Referring to FIG. 3A, an electronic device 300 (e.g., an electronic device 101 in FIG. 1, an electronic device 200 in FIG. 2A) may be in a slide-in state 301. When the electronic device 300 is in the slide-in state 301, a fixed region 311 (e.g., a first region) of a display 310 may be exposed to the outside. When the electronic device 300 is in the slide-in state 301, a variable region 312 (e.g., a second region) of the display 310 may be inserted into the electronic device 300 and thereby not be exposed to the outside.

According to an embodiment, when the electronic device 300 changes from the slide-in state 301 to a slide-out state (e.g., the slide-out state 302 in FIG. 3B), the variable region 312 comes to be visually exposed to the outside by passing through a curved portion 305 of the lateral surface of the electronic device 300.

When the external temperature is lower than a preset reference temperature (e.g., in a low-temperature environment where the display may be damaged), and when the variable region 312 of the display 310 is drawn out of the electronic device 300, the variable region 312 may be broken while passing through the curved portion 305. Because the variable region 312 of the display 320 may be broken while passing through the curved portion 305, a processor (e.g., the processor 120 in FIG. 2B) may heat the entire of the variable region 312 of the display 310 by setting it as a heating region 314. As such, the processor 120 may set the entire variable region 312 of the display 310 as the heating region 314 and heat it. It is therefore possible to reduce the breakage of the variable region 312 of the display 310 in the curved portion 305 of the electronic device 300 even when the display 310 is expanded to the maximum.

Figure 3B:
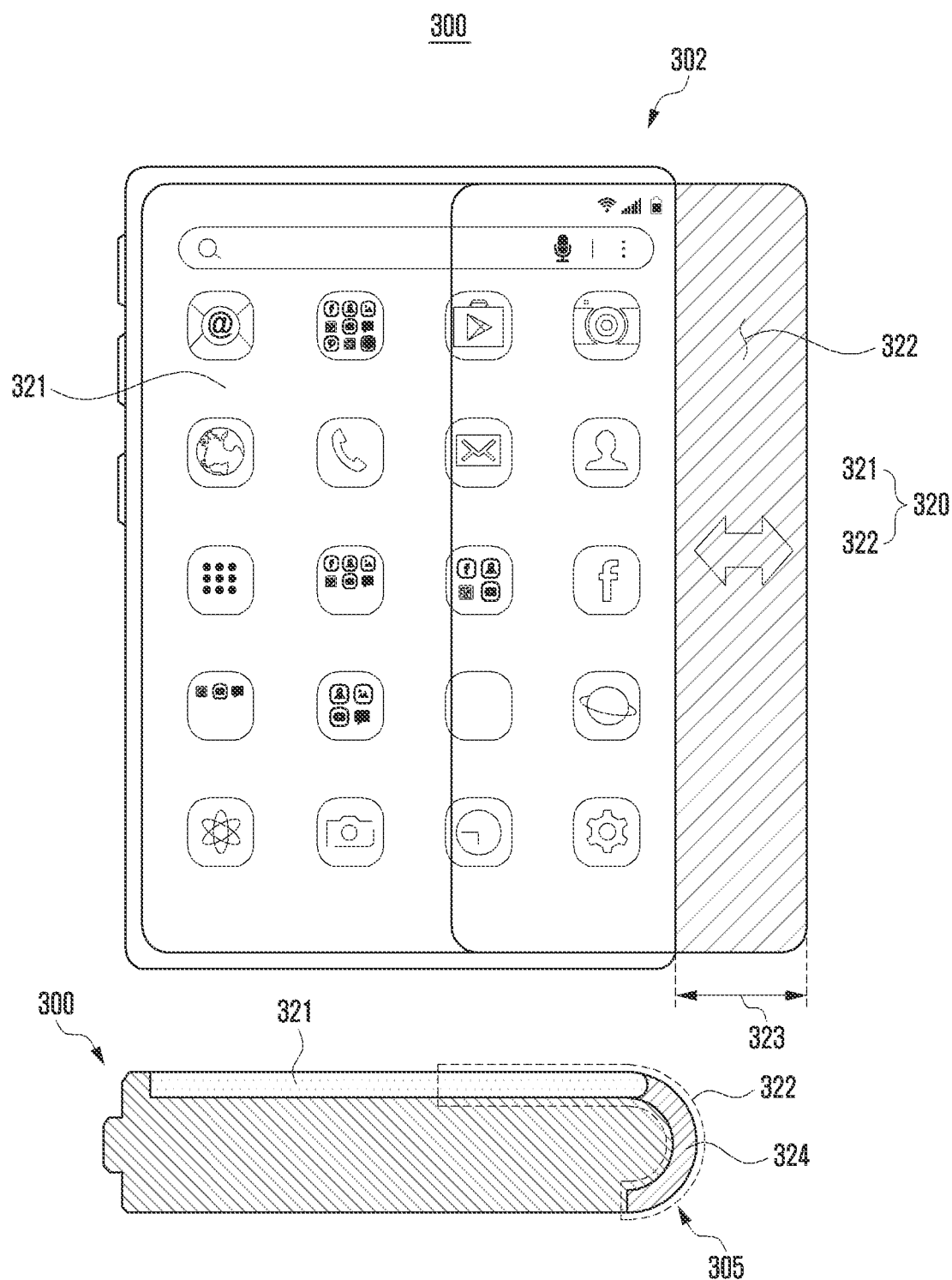
FIG. 3B is a diagram illustrating that a screen is turned on in a screen expansion (e.g., slide-out) state of an electronic device according to an embodiment of the disclosure.

FIG. 3B is a diagram illustrating that a screen is turned on in a screen expansion (e.g., a slide-out state) of an electronic device according to an embodiment of the disclosure.

Referring to FIG. 3B, an electronic device 300 (e.g., an electronic device 101 in FIG. 1, an electronic device 200 in FIG. 2A) may be in the slide-out state 302. When the electronic device 300 is in the slide-out state 302, a fixed region 321 (e.g., the first region) and at least a portion of a variable region 322 of a display 320 may be visually exposed to the outside. FIG. 3B shows a state that the screen of the display 320 is not expanded to the maximum and is expanded in part. That is, a portion of the variable region 322 may be expanded and thereby visually exposed to the outside.

According to an embodiment, when the electronic device 300 is in the slide-out state 302, the screen may be displayed on the fixed region 321 and the externally exposed portion of the variable region 322. Here, if the electronic device 300 is fully expanded, an unexposed, additionally expandable region 323 of the variable region 322 will be exposed to the outside by passing through the curved portion 305 of the lateral surface of the electronic device 300.

When the external temperature is lower than a preset reference temperature (e.g., in a low-temperature environment where the display may be damaged), and when the additionally expandable region 323 of the display 320 is drawn out of the electronic device 300, the additionally expandable region 323 may be broken while passing through the curved portion 305. Because the additionally expandable region 323 of the display 320 may be broken while passing through the curved portion 305, the processor (e.g., the processor 120 in FIG. 2B) may set the additionally expandable region 323 of the variable region 322 of the display 320 as a heating region 324 to be heated. As such, the processor 120 may set the additionally expandable region 323 of the display 320 as the heating region 324 and heat it. It is therefore possible to reduce the breakage of the variable region 322 of the display 320 in the curved portion 305 of the electronic device 300 even when the display 320 is expanded to the maximum.

Figure 3C:
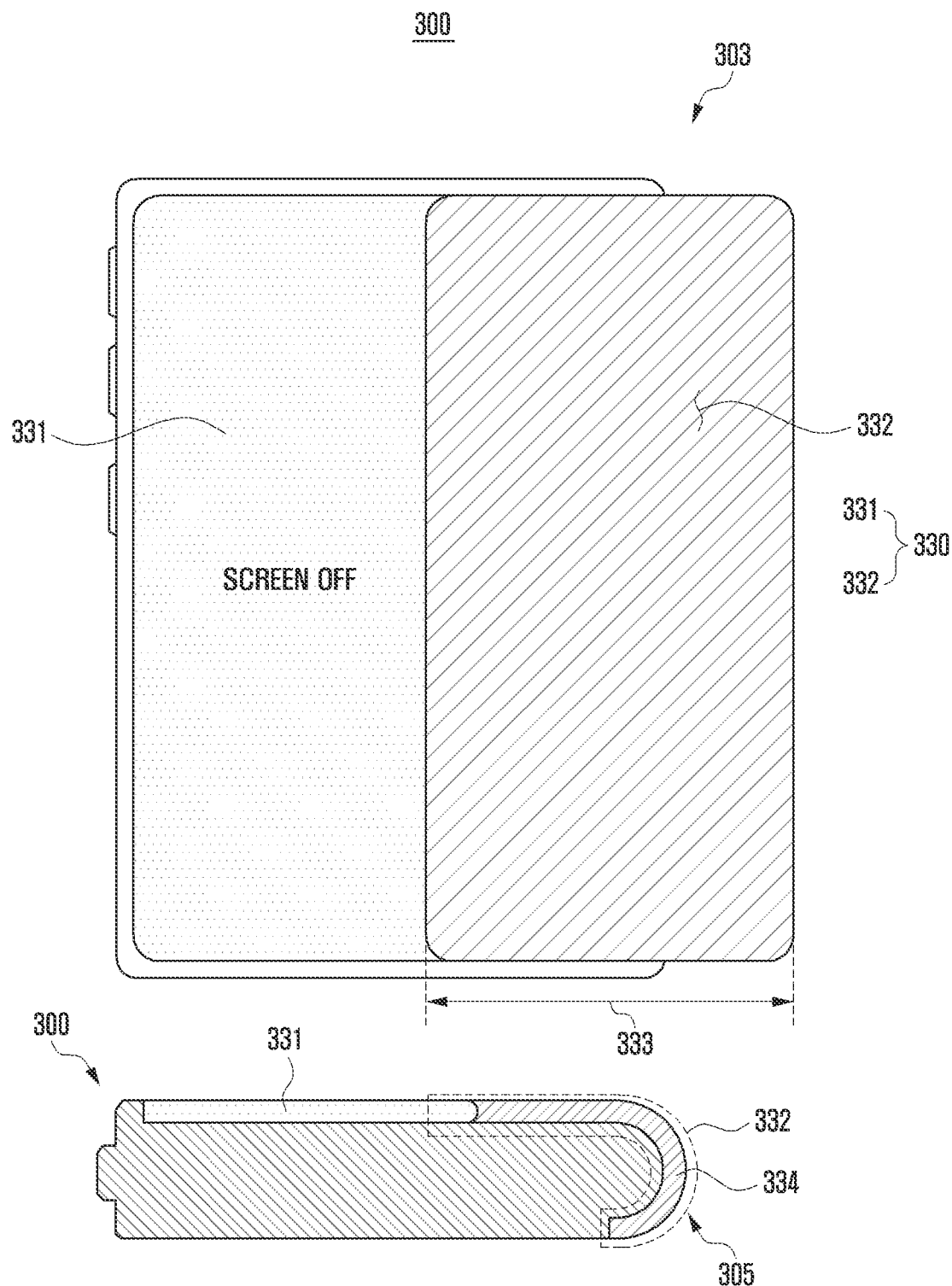
FIG. 3C is a diagram illustrating that a screen is turned off in a screen expansion (e.g., slide-out) state of an electronic device according to an embodiment of the disclosure.

FIG. 3C is a diagram illustrating that a screen is turned off in a screen expansion (e.g., slide-out) state of an electronic device according to an embodiment of the disclosure.

Referring to FIG. 3C, an electronic device 300 (e.g., an electronic device 101 in FIG. 1, an electronic device 200 in FIG. 2A) may be in the slide-out state 302. When the electronic device 300 is in the slide-out state 302, a fixed region 331 (e.g., the first region) and at least a portion of a variable region 332 of a display 330 may be visually exposed to the outside. FIG. 3C exemplarily shows a state that the screen of the display 330 is not expanded to the maximum and is expanded in part. That is, a portion of the variable region 332 may be expanded and thereby visually exposed to the outside.

According to an embodiment, in the slide-out state 303 of the electronic device 300, the screen may be turned off in the fixed region 331 and in an expandable region 333 exposed to the outside among the variable region 332.

When the electronic device 300 changes from the screen expansion state to the screen reduction state, the expandable region 333 exposed to the outside among the variable region 332 of the display 330 will be inserted into the electronic device 300 while passing through the curved portion 305 of the lateral surface of the electronic device 300.

When the external temperature is lower than a preset reference temperature (e.g., in a low-temperature environment where the display may be damaged), and when the expandable region 333 of the display 330 is inserted into the electronic device 300, the expandable region 333 may be broken while passing through the curved portion 305. Because the expandable region 333 of the display 330 may be broken while passing through the curved portion 305, the processor (e.g., the processor 120 in FIG. 2B) may set the expandable region 333 expected to be inserted among the variable region 332 of the display 320 as a heating region 334 to be heated. As such, the processor 120 may set the expandable region 333 to be inserted among the variable region 332 of the display 320 as the heating region 334 and heat it. It is therefore possible to reduce the breakage of the variable region 332 of the display 330 in the curved portion 305 of the electronic device 300 even when the display 330 is reduced to the minimum.

Figure 4:
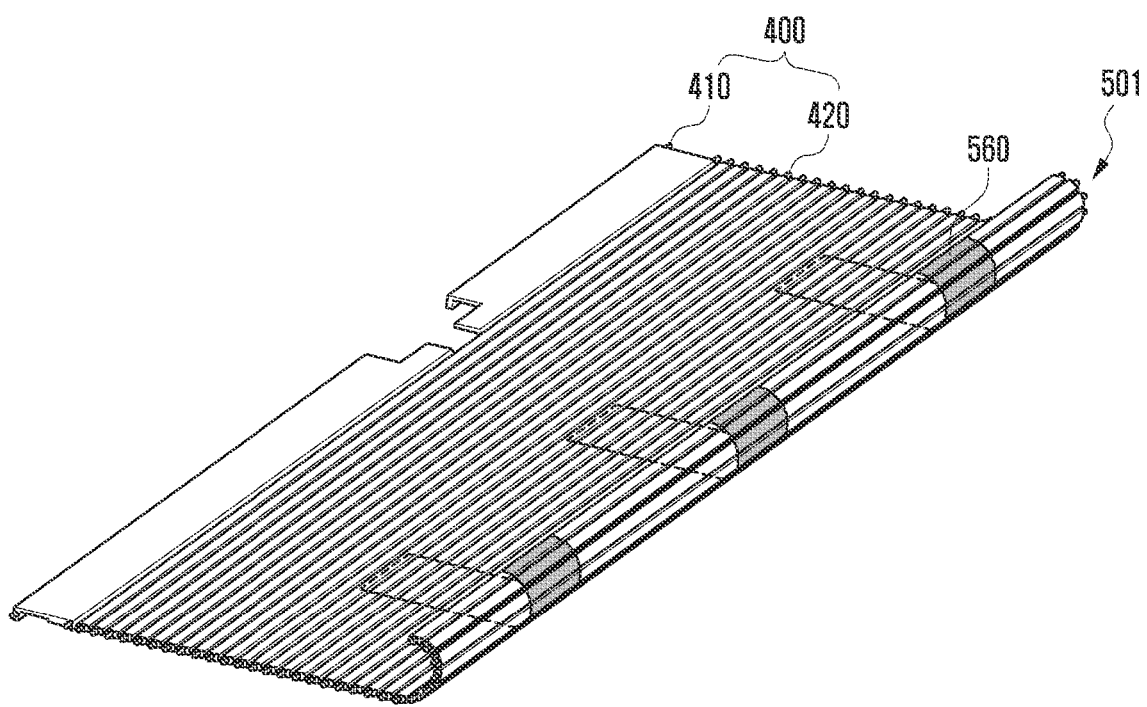
FIG. 4 is a diagram illustrating a slide structure and a flexible heat dissipation member according to an embodiment of the disclosure.

FIG. 4 is a diagram illustrating a slide structure and a flexible heat dissipation member according to an embodiment of the disclosure.

Figure 5:
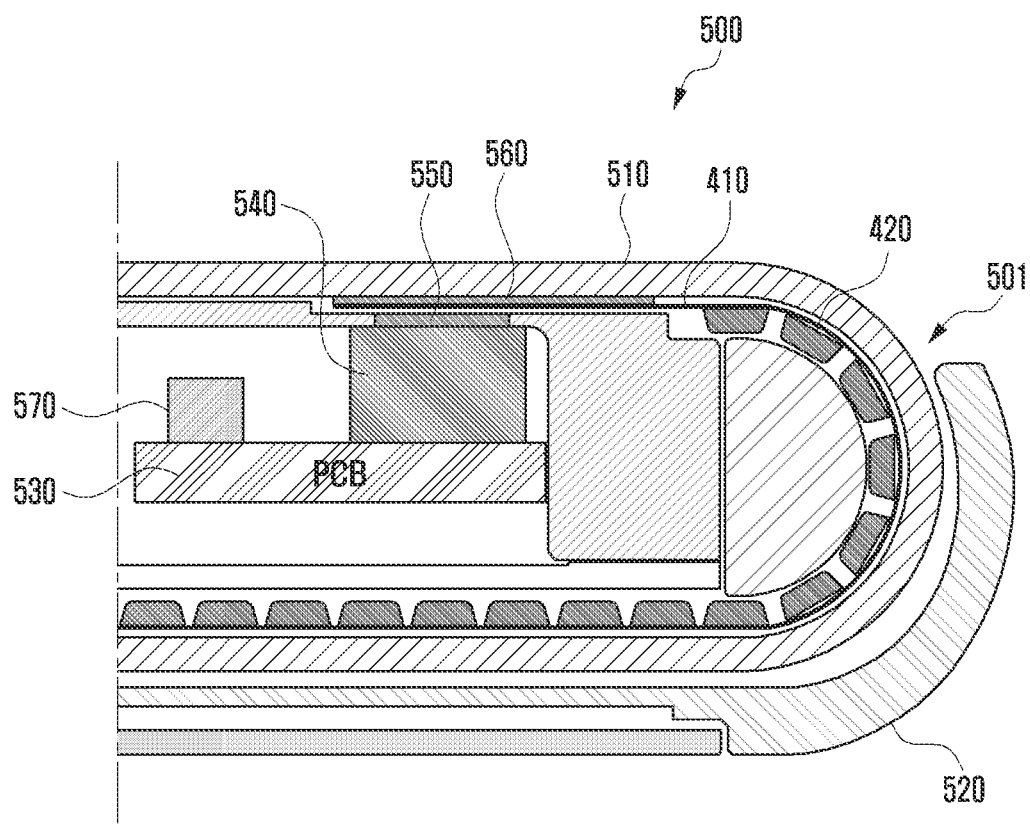
FIG. 5 is a diagram illustrating a cross section of a curved portion of an electronic device according to an embodiment of the disclosure.

FIG. 5 is a diagram illustrating a cross section of a curved portion of an electronic device according to an embodiment of the disclosure.

Referring to FIGS. 4 and 5, an electronic device 500 may include a display 510 (e.g., a display 210 in FIG. 2A), a housing 520, a printed circuit board 530, an electronic component 540, a heat dissipation member 550 (e.g., thermal interface materials (TIM)), and a flexible heat dissipation member 560. The electronic device 500 may include at least one sensor module 570 (e.g., the sensor module 176 in FIG. 1) for sensing a screen reduction (e.g., slide-in) state, screen size change (e.g., sliding) state, and screen expansion (e.g., slide-out) state of the display 510.

According to an embodiment, the heat dissipation member 550 (e.g., a first heat dissipation member) may be formed of a non-flexible material to be attached and fixed to the electronic component 540. According to an embodiment, the flexible heat dissipation member 560 (e.g., a second heat dissipation member) may be formed of a flexible material to be movable depending on the expansion and reduction of the display 510.

According to an embodiment, the slide structure 400 allows a portion of the display 510 to be slidingly drawn out from the inner space of the housing 520 or slidingly inserted into the inner space of the housing 520 from the outside. The slide structure 400 may include a hinge rail 420 formed of a plurality of multi-bars and a slide plate 410. The slide plate 410 may be attached to the rear surface of the display 510 (e.g., a surface opposite to the surface on which the screen is displayed). The display 510 may be supported by the slide plate 410 and the hinge rail 420.

According to an embodiment, the display 510 is a flexible display and may include a fixed region (e.g., the fixed region 311 in FIG. 3A) supported by the slide plate 410 and a variable region (e.g., the variable region 312 in FIG. 3A) supported by the hinge rail 420.

According to an embodiment, in the screen reduction (e.g., slide-in) state of the electronic device 500, the variable region (e.g., the variable region 312 in FIG. 3A) of the display 510 may be inserted into the inner space of the housing 520. In the screen expansion (e.g., slide-out) state of the electronic device 500, the variable region (e.g., the variable region 312 in FIG. 3A) of the display 510 may be drawn out and exposed to the outside while being supported by the hinge rail 420. Here, the variable region (e.g., the variable region 312 in FIG. 3A) of the display 510 may pass through the curved portion 501 and then be drawn out to be visually exposed to the outside or be inserted into the inner space of the housing 520. Therefore, in the electronic device 500, the display 510 may slide according to the movement of the slide plate 410 from the housing 520, so that the screen area of the display 510 (e.g., the area of the display 510 visually exposed to the outside) may be changed.

According to an embodiment, the entire of the variable region (e.g., the variable region 312 in FIG. 3A) of the display 510 may be visually exposed to the outside (e.g., in the screen expansion state). A part of the variable region (e.g., the variable region 312 in FIG. 3A) of the display 510 may be visually exposed to the outside (e.g., the screen size change state) (e.g., the sliding state).

According to an embodiment, the slide plate 410 may be movably coupled in a sliding manner so as to be at least partially inserted into or drawn out from the housing 520.

According to an embodiment, the electronic component 540 may be disposed on the printed circuit board 530 of the electronic device 500. The electronic component 540 may be a heat-generating module (e.g., a heat-generating source) (e.g., CPU, AP, MODEM, antenna module, memory) that generates heat when the electronic device 500 is driven.

According to an embodiment, the electronic device 500 may include a plurality of antennas. At least some of the plurality of antennas may be disposed in the inner space of the housing 520. At least some of the plurality of antennas may be disposed outside the housing 520. A portion of the housing 520 may function as a part of the plurality of antennas.

The heat dissipation member 550 for dissipating heat may be attached to the electronic component 540, and the slide plate 410 of the slide structure 400 may be disposed above the heat dissipation member 550. The flexible heat dissipation member 560 may be disposed between the slide plate 410 and the display 510.

Heat generated by the electronic component 540 may be transferred to the entire area of the display 510 through the heat dissipation member 550 and the flexible heat dissipation member 560. In particular, such heat generated by the electronic component 540 may be transferred to the curved portion 501 in the entire area of the display 510 through the heat dissipation member 550 and the flexible heat dissipation member 560, thereby heating the display 510 on the curved portion 501. As such, the heat generated by the electronic component 540 may heat the display 510 on the curved portion 501 through the heat dissipation member 550 and the flexible heat dissipation member 560, thereby maintaining the display 510 on the curved portion 501 at a constant temperature.

Figure 6A:
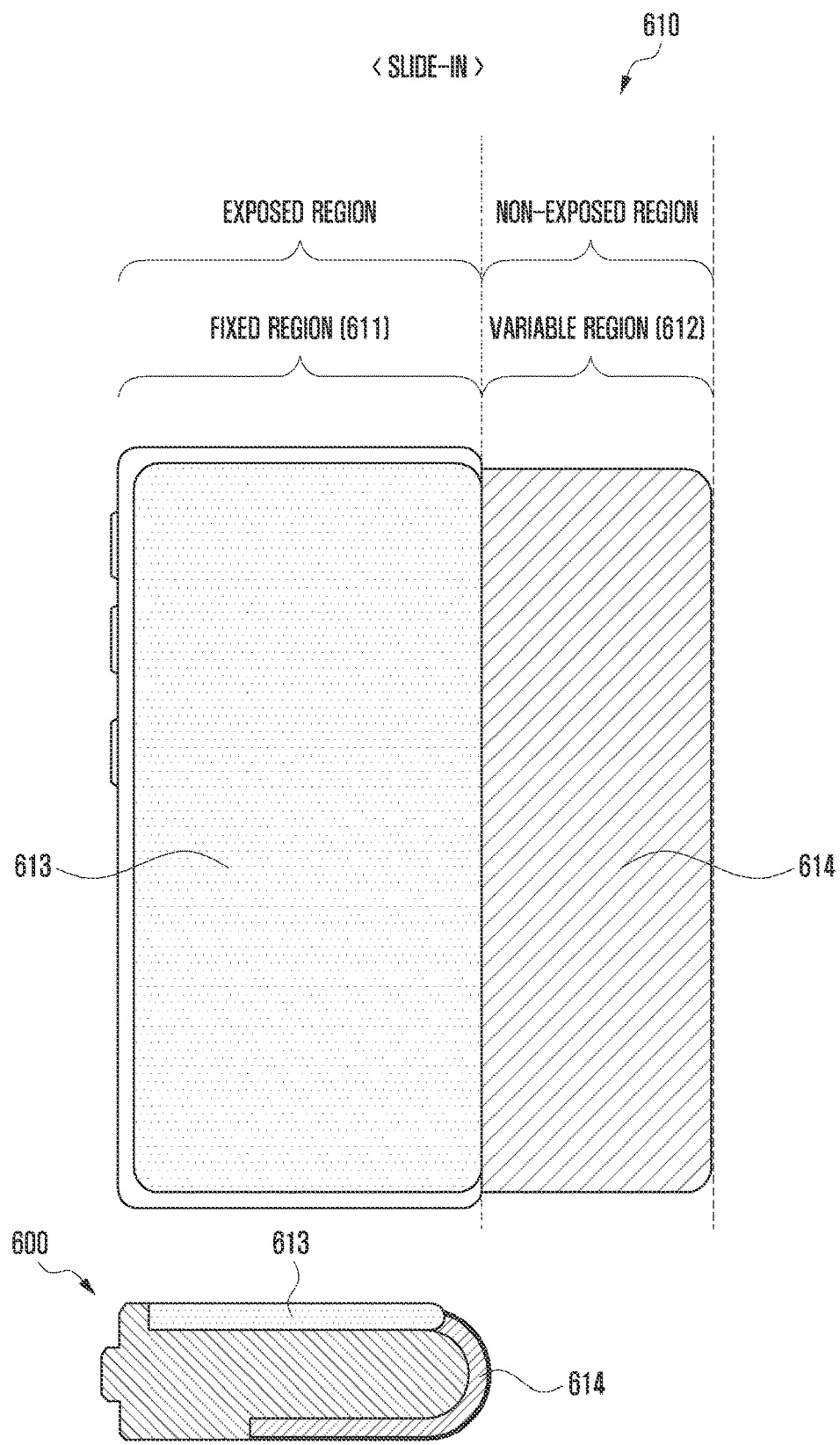
FIG. 6A is a diagram illustrating a screen reduction (e.g., slide-in) state of an electronic device according to an embodiment of the disclosure.

FIG. 6A is a diagram illustrating a screen reduction (e.g., slide-in) state of an electronic device according to an embodiment of the disclosure.

Referring to FIGS. 5 and 6A, an electronic device 600 according to various embodiments may transfer heat generated by an electronic component 540 to a display 510 or 610 in a screen reduction (e.g., slide-in) state of an electronic device 600, thereby heating a display 510 or 610 on a curved portion 501. At the same time, in the screen reduction (e.g., slide-in) state of the electronic device 600, the processor (e.g., the processor 120 in FIG. 2B) may sense the external temperature through a temperature sensor (e.g., the sensor module 176 in FIG. 1). Based on the sensing result of the external temperature, the processor (e.g., the processor 120 in FIG. 2B) may determine whether heating of the variable region 612 of the display 610 is required. When the sensed external temperature is a low-temperature environment that may cause the breakage of the display 610, the electronic device 600 may heat the variable region 612 of the display 610.

In the screen reduction state, adjusting the luminance of the display may be used for heating the variable region. According to an embodiment, based on the sensing result of the external temperature, when the external temperature is lower than a preset value in the screen reduction (e.g., slide-in) state of the electronic device 600, the processor (e.g., the processor 120 in FIG. 2B) may determine that heating of the display 610 is required. The processor (e.g., the processor 120 in FIG. 2B) may sense the fixed region 611 and the variable region 612 of the display 610 by using at least one sensor module (e.g., the sensor module 176 in FIG. 1). The processor (e.g., the processor 120 in FIG. 2B) may heat the variable region 612 when the external temperature is lower than a preset value.

According to an embodiment, in the screen reduction (e.g., slide-in) state of the electronic device 600, the processor (e.g., the processor 120 in FIG. 2B) may set the fixed region 611 as a non-heating region 613. The processor (e.g., the processor 120 in FIG. 2B) may control a display driver (e.g., DDI) so that the fixed region 611 shows a first luminance. Under the control of the processor (e.g., the processor 120 in FIG. 2B), the display driver (e.g., DDI) may cause pixels of the fixed region 611 to emit light at the first luminance. Here, the first luminance is not a single fixed luminance, but may mean the luminance of each pixel that varies in real time to display a screen. Thus, the pixels of the fixed region 611 may emit light to exhibit different luminances.

According to an embodiment, in the screen reduction (e.g., slide-in) state of the electronic device 600, the processor (e.g., the processor 120 in FIG. 2B) may set the variable region 612 as a heating region 614. The processor (e.g., the processor 120 in FIG. 2B) may control the display driver (e.g., DDI) so that the variable region 612 shows a second luminance. Under the control of the processor (e.g., the processor 120 in FIG. 2B), the display driver (e.g., DDI) may cause pixels of the variable region 612 to emit light at the second luminance. Here, the second luminance may include one fixed luminance or different luminances for respective blocks. Therefore, the pixels of the variable region 612 may emit light to exhibit the same luminance or different luminances for respective blocks. Here, the pixels of the variable region 612 may emit light at the second luminance higher than the first luminance shown by the pixels of the fixed region 611. As the luminance of light output from the display 310 increases, the current consumption may increase, and accordingly the temperature of heat emitted from the display 310 may increase. As such, in order to heat the variable region 612, the luminance (e.g., the second luminance) of the variable region 612 may be increased than the luminance (e.g., the first luminance) of the fixed region 611.

Here, although the variable region 612 is not visually exposed to the outside in the screen reduction (e.g., slide-in) state of the electronic device 600, the variable region 612 may emit light at the second luminance for heating. In an example, when the display 610 is an OLED display, the pixels of the variable region 612 may emit light to exhibit the second luminance. In an example, when the display 610 is an LED display, a backlight corresponding to the variable region 612 may emit light at the second luminance.

In the screen reduction state, the driving frequency of the display may be used for heating the variable region. According to an embodiment, in the screen reduction (e.g., slide-in) state of the electronic device 600, the electronic device 600 may sense the external temperature. When heating of the display 610 is required based on the sensing result of the external temperature, the processor (e.g., the processor 120 in FIG. 2B) may sense the fixed region 611 and the variable region 612 of the display 610 by using at least one sensor module (e.g., the sensor module 176 in FIG. 1). The processor (e.g., the processor 120 in FIG. 2B) may heat the variable region 612 when the external temperature is lower than a preset value. As the driving frequency of the display 610 increases, the current consumption may increase, and accordingly the temperature of heat emitted from the display 610 may increase. As such, in order to heat the variable region 612, the driving frequency of the variable region 612 may be increased.

According to an embodiment, in the screen reduction (e.g., slide-in) state of the electronic device 600, the processor (e.g., the processor 120 in FIG. 2B) may set the fixed region 611 as the non-heating region 613. The processor (e.g., the processor 120 in FIG. 2B) may control the display driver (e.g., DDI) so that the pixels of the fixed region 611 are driven at a first frequency (e.g., 60 Hz to 90 Hz). Under the control of the processor (e.g., the processor 120 in FIG. 2B), the display driver (e.g., DDI) may drive the pixels of the fixed region 611 at the first frequency (e.g., 60 Hz to 90 Hz).

According to an embodiment, in the screen reduction (e.g., slide-in) state of the electronic device 600, the processor (e.g., the processor 120 in FIG. 2B) may set the variable region 612 as the heating region 614, and control the display driver (e.g., DDI) so that the pixels of the variable region 612 are driven at a second frequency (e.g., 120 Hz to 240 Hz). Under the control of the processor (e.g., the processor 120 in FIG. 2B), the display driver (e.g., DDI) may drive the pixels of the variable region 612 at the second frequency (e.g., 120 Hz to 240 Hz).

Here, although the variable region 612 is not visually exposed to the outside in the screen reduction (e.g., slide-in) state of the electronic device 600, the pixels of the variable region 612 may be driven at the second frequency (e.g., 120 Hz to 240 Hz) to heat the variable region 612.

Figure 6B:
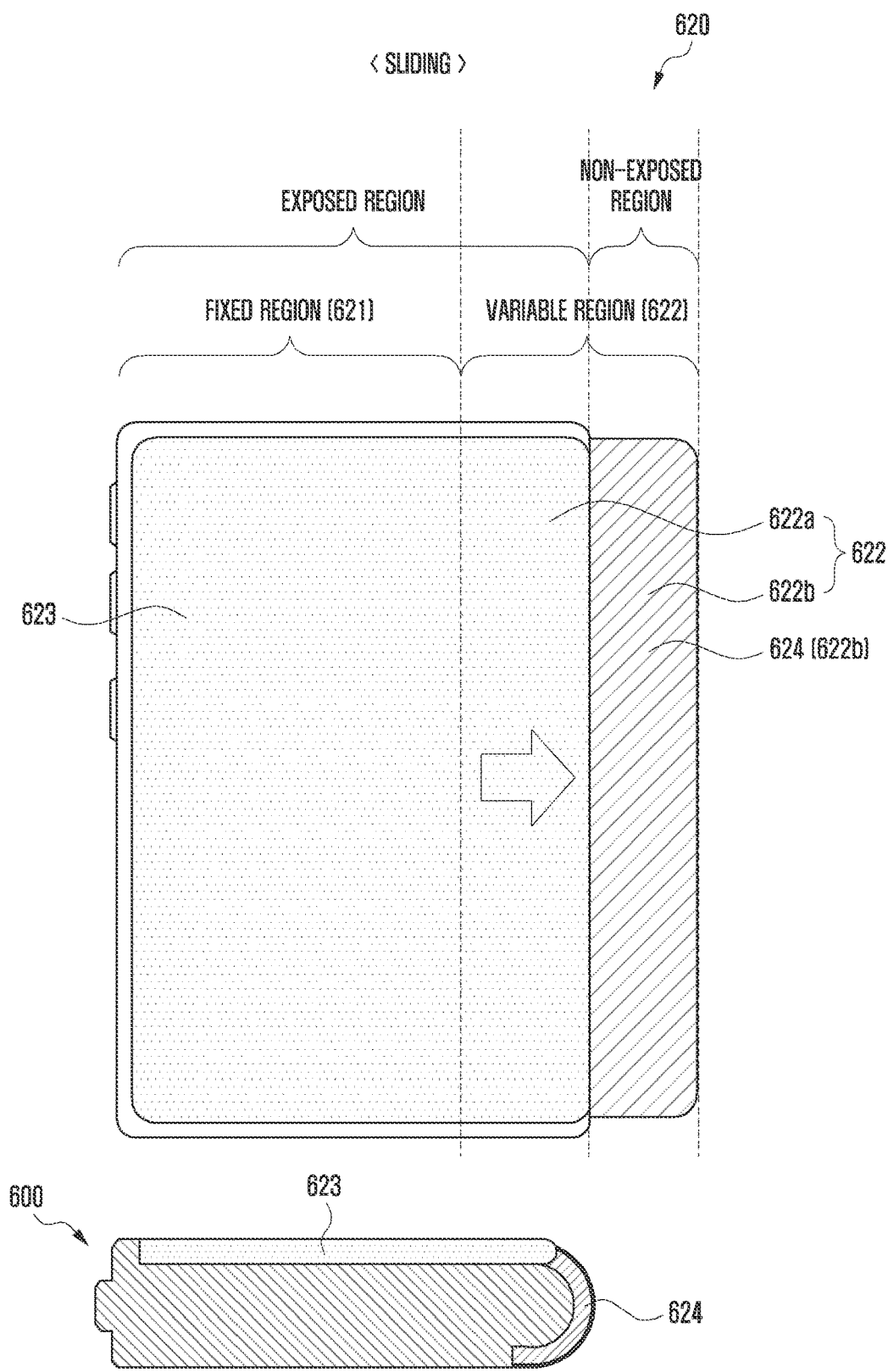
FIG. 6B is a diagram illustrating a screen size change (e.g., sliding) state of an electronic device according to an embodiment of the disclosure.

FIG. 6B is a diagram illustrating a screen size change (e.g., sliding) state of an electronic device according to an embodiment of the disclosure.

Referring to FIGS. 5 and 6B, an electronic device 600 according to various embodiments may transfer heat generated from an electronic component 540 to a display 510 or 620 in a screen size change state (e.g., a sliding state, an intermediate state between slide-in and slide-out, or an intermediate state between screen expansion and screen reduction), thereby heating a display 510 or 620 on a curved portion 501. At the same time, in the screen size change state of the electronic device 600, the processor (e.g., the processor 120 in FIG. 2B) may sense the external temperature through a temperature sensor (e.g., the sensor module 176 in FIG. 1). Based on the sensing result of the external temperature, the processor (e.g., the processor 120 in FIG. 2B) may determine whether heating of the variable region 612 of the display 610 is required. When the sensed external temperature is a low-temperature environment that may cause the breakage of the display 620, the electronic device 600 may heat the variable region 622 of the display 620.

In the screen size change state, adjusting the luminance of the display may be used for heating the variable region. According to an embodiment, in the screen size change state (e.g., the sliding state, the intermediate state between slide-in and slide-out, or the intermediate state between screen expansion and screen reduction) of the electronic device 600, the electronic device 600 may sense the external temperature. Based on the sensing result of the external temperature, when the external temperature is lower than a preset value in the screen size change state (e.g., the sliding state, the intermediate state between slide-in and slide-out, or the intermediate state between screen expansion and screen reduction) of the electronic device 600, the processor (e.g., the processor 120 in FIG. 2B) may determine that heating of the display 620 is required. The processor (e.g., the processor 120 in FIG. 2B) may sense the fixed region 621 and the variable region 622 of the display 620 by using at least one sensor module (e.g., the sensor module 176 in FIG. 1). The processor (e.g., the processor 120 in FIG. 2B) may heat at least a portion of the variable region 622 when the external temperature is lower than a preset value.

According to an embodiment, in the screen size change state (e.g., the sliding state, the intermediate state between slide-in and slide-out, or the intermediate state between screen expansion and screen reduction) of the electronic device 600, the processor (e.g., the processor 120 in FIG. 2B) may set the fixed region 621 as a non-heating region 623. The processor (e.g., the processor 120 in FIG. 2B) may control the display driver (e.g., DDI) so that the fixed region 621 shows the first luminance. Under the control of the processor (e.g., the processor 120 in FIG. 2B), the display driver (e.g., DDI) may cause pixels of the fixed region 621 to emit light at the first luminance.

According to an embodiment, in the screen size change state (e.g., the sliding state, the intermediate state between slide-in and slide-out, or the intermediate state between screen expansion and screen reduction) of the electronic device 600, the processor (e.g., the processor 120 in FIG. 2B) may set an exposed region 622a exposed to the outside in the variable region 622 as the non-heating region 623. The processor (e.g., the processor 120 in FIG. 2B) may control the display driver (e.g., DDI) so that the exposed region 622a shows the first luminance. Under the control of the processor (e.g., the processor 120 in FIG. 2B), the display driver (e.g., DDI) may cause pixels of the exposed region 622a to emit light at the first luminance.

Here, the first luminance is not a single fixed luminance, but may mean the luminance of each pixel that varies in real time to display a screen. Thus, the pixels of the fixed region 621 and the exposed region 622a may emit light to exhibit different luminances.

According to an embodiment, in the screen size change state (e.g., the sliding state, the intermediate state between slide-in and slide-out, or the intermediate state between screen expansion and screen reduction) of the electronic device 600, the processor (e.g., the processor 120 in FIG. 2B) may set a non-exposed region 622b, not exposed to the outside, in the variable region 622 as a heating region 624. The processor (e.g., the processor 120 in FIG. 2B) may control the display driver (e.g., DDI) so that the non-exposed region 622b shows the second luminance. Under the control of the processor (e.g., the processor 120 in FIG. 2B), the display driver (e.g., DDI) may cause pixels of the non-exposed region 622b to emit light at the second luminance.

Here, the second luminance may include one fixed luminance or different luminances for respective blocks. Therefore, the pixels of the non-exposed region 622b may emit light to exhibit the same luminance or different luminances for respective blocks.

Here, although the non-exposed region 622b of the variable region 622 is not exposed to the outside in the screen size change state (e.g., the sliding state, the intermediate state between slide-in and slide-out, or the intermediate state between screen expansion and screen reduction) of the electronic device 600, the non-exposed region 622b may be heated to reduce the breakage of the non-exposed region 622b of the display 620 when the display 620 slides out. The non-exposed region 622b may emit light at the second luminance to heat the non-exposed region 622b. Here, the pixels of the non-exposed region 622b may emit light at the second luminance higher than the first luminance shown by the pixels of the exposed region 622a. The exposed region 622a of the variable region 622 may maintain a constant temperature because pixels emit light to display a screen. Therefore, even when the display 620 slides in, it is possible to reduce the breakage of the exposed region 622a because the exposed region 622a maintains a constant temperature.

In an example, when the display 620 is an OLED display, the pixels of the non-exposed region 622b of the variable region 622 may emit light to exhibit the second luminance. In an example, when the display 620 is an LED display, a backlight corresponding to the non-exposed region 622b of the variable region 622 may emit light with the second luminance.

In the screen size change state, the driving frequency of the display may be used for heating the variable region.

According to an embodiment, in the screen size change state (e.g., the sliding state, the intermediate state between slide-in and slide-out, or the intermediate state between screen expansion and screen reduction) of the electronic device 600, the electronic device 600 may sense the external temperature. When heating of the display 620 is required based on the sensing result of the external temperature, the processor (e.g., the processor 120 in FIG. 2B) may sense the fixed region 621 and the variable region 622 by using at least one sensor module (e.g., the sensor module 176 in FIG. 1). The processor (e.g., the processor 120 in FIG. 2B) may heat at least a portion of the variable region 622 when the external temperature is lower than a preset value.

According to an embodiment, in the screen size change state (e.g., the sliding state, the intermediate state between slide-in and slide-out, or the intermediate state between screen expansion and screen reduction) of the electronic device 600, the processor (e.g., the processor 120 in FIG. 2B) may set the fixed region 621 as the non-heating region 623. The processor (e.g., the processor 120 in FIG. 2B) may control the display driver (e.g., DDI) so that the pixels of the fixed region 621 are driven at the first frequency (e.g., 60 Hz to 90 Hz). Under the control of the processor (e.g., the processor 120 in FIG. 2B), the display driver (e.g., DDI) may drive the pixels of the fixed region 621 at the first frequency (e.g., 60 Hz to 90 Hz).

According to an embodiment, the processor (e.g., the processor 120 in FIG. 2B) may set the exposed region 622a in the variable region 622 as the non-heating region 623, and control the display driver (e.g., DDI) so that the pixels of the exposed region 622a are driven at the first frequency (e.g., 60 Hz to 90 Hz). Under the control of the processor (e.g., the processor 120 in FIG. 2B), the display driver (e.g., DDI) may drive the pixels of the exposed region 622a at the first frequency (e.g., 60 Hz to 90 Hz).

According to an embodiment, in the screen size change state (e.g., the sliding state, the intermediate state between slide-in and slide-out, or the intermediate state between screen expansion and screen reduction) of the electronic device 600, the processor (e.g., the processor 120 in FIG. 2B) may set the non-exposed region 622b in the variable region 622 as the heating region 624, and control the display driver (e.g., DDI) so that the pixels of the non-exposed region 622b are driven at the second frequency (e.g., 120 Hz to 240 Hz). Under the control of the processor (e.g., the processor 120 in FIG. 2B), the display driver (e.g., DDI) may drive the pixels of the non-exposed region 622b at the second frequency (e.g., 120 Hz to 240 Hz).

Here, although the non-exposed region 622b is not visually exposed to the outside in the screen size change state (e.g., the sliding state, the intermediate state between slide-in and slide-out, or the intermediate state between screen expansion and screen reduction) of the electronic device 600, the pixels of the non-exposed region 622b may be driven at the second frequency (e.g., 120 Hz to 240 Hz) to heat the non-exposed region 622b.

Figure 6C:
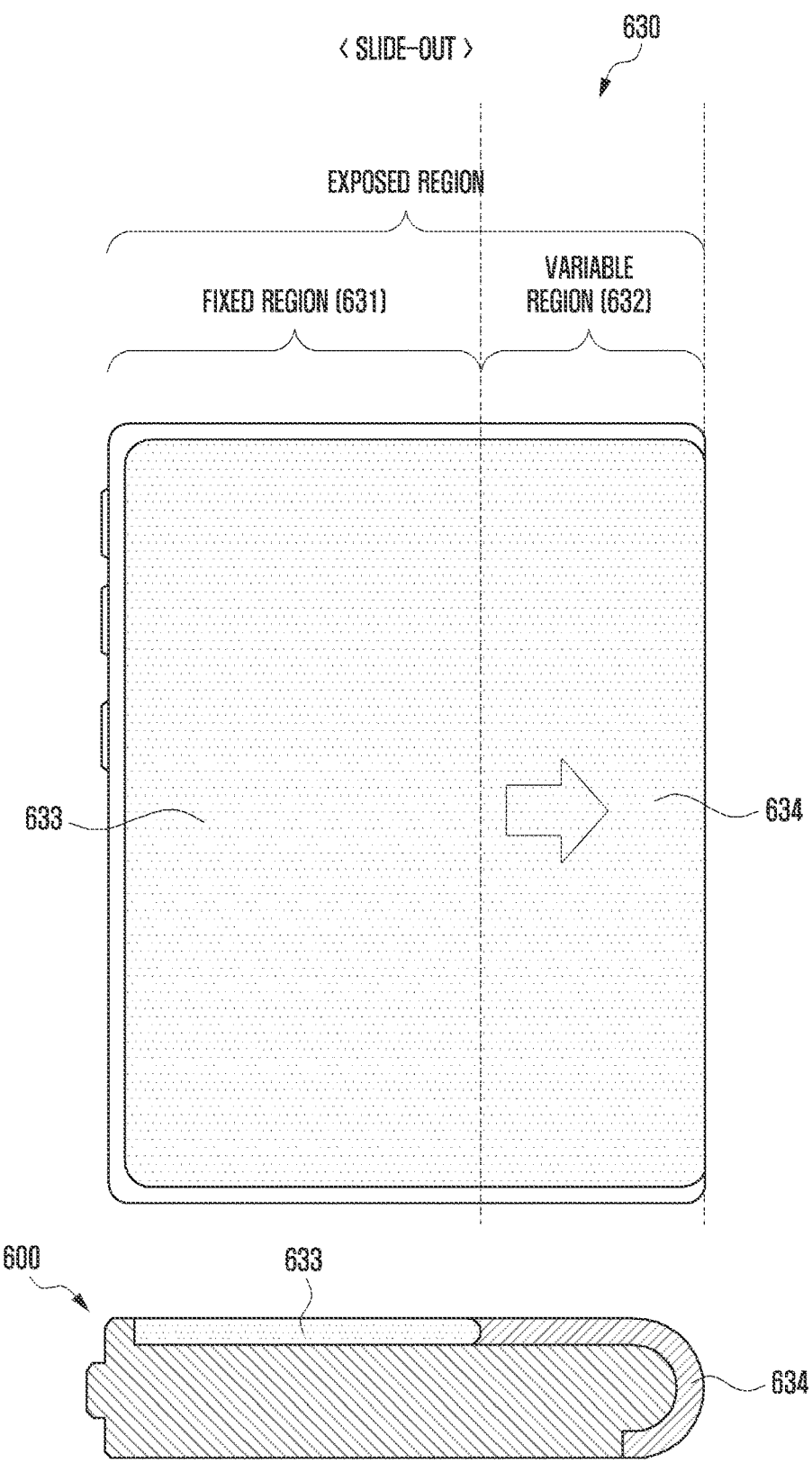
FIG. 6C is a diagram illustrating a screen expansion (e.g., slide-out) state of an electronic device according to an embodiment of the disclosure.

FIG. 6C is a diagram illustrating a screen expansion (e.g., slide-out) state of an electronic device according to an embodiment of the disclosure.

Referring to FIGS. 5 and 6C, an electronic device 600 according to various embodiments may transfer heat generated by an electronic component 540 to a display 510 or 630 in a screen expansion (e.g., slide-out) state of an electronic device 600, thereby heating a display 510 on a curved portion 501. At the same time, in the screen expansion (e.g., slide-out) state of the electronic device 600, the processor (e.g., the processor 120 in FIG. 2B) may sense the external temperature through a temperature sensor (e.g., the sensor module 176 in FIG. 1). Based on the sensing result of the external temperature, the processor (e.g., the processor 120 in FIG. 2B) may determine whether heating of the variable region 632 of the display 630 is required. When the sensed external temperature is a low-temperature environment that may cause the breakage of the display 630, the electronic device 600 may heat the variable region 632 of the display 630.

In the screen expansion state, adjusting the luminance of the display may be used for heating the variable region.

According to an embodiment, based on the sensing result of the external temperature, when the external temperature is lower than a preset value in the screen expansion (e.g., slide-out) state of the electronic device 600, the processor (e.g., the processor 120 in FIG. 2B) may determine that heating of the display 630 is required. The processor (e.g., the processor 120 in FIG. 2B) may sense the fixed region 631 and the variable region 632 of the display 630 by using at least one sensor module (e.g., the sensor module 176 in FIG. 1). The processor (e.g., the processor 120 in FIG. 2B) may heat the variable region 632 when the external temperature is lower than a preset value.

According to an embodiment, the processor (e.g., the processor 120 in FIG. 2B) may set the fixed region 631 as a non-heating region 633, and control a display driver (e.g., DDI) so that the fixed region 631 shows a first luminance. Under the control of the processor (e.g., the processor 120 in FIG. 2B), the display driver (e.g., DDI) may cause pixels of the fixed region 631 to emit light at the first luminance. Here, the first luminance is not a single fixed luminance, but may mean the luminance of each pixel that varies in real time to display a screen. Thus, the pixels of the fixed region 631 may emit light to exhibit different luminances.

According to an embodiment, in the screen expansion (e.g., slide-out) state of the electronic device 600, the processor (e.g., the processor 120 in FIG. 2B) may set the variable region 632 as a heating region 634. The processor (e.g., the processor 120 in FIG. 2B) may control the display driver (e.g., DDI) so that the variable region 632 shows a second luminance. Under the control of the processor (e.g., the processor 120 in FIG. 2B), the display driver (e.g., DDI) may cause pixels of the variable region 632 to emit light at the second luminance. Here, the second luminance may include one fixed luminance or different luminances for respective blocks. Therefore, the pixels of the variable region 632 may emit light to exhibit the same luminance or different luminances for respective blocks. Here, the pixels of the variable region 632 may emit light at the second luminance higher than the first luminance shown by the pixels of the fixed region 631.

Here, although the variable region 632 is not visually exposed to the outside in the screen expansion (e.g., slide-out) state of the electronic device 600, the variable region 632 may emit light at the second luminance for heating. In an example, when the display 630 is an OLED display, the pixels of the variable region 632 may emit light to exhibit the second luminance. In an example, when the display 630 is an LED display, a backlight corresponding to the variable region 632 may emit light at the second luminance.

In the screen expansion state, the driving frequency of the display may be used for heating the variable region. According to an embodiment, in the screen expansion (e.g., slide-out) state of the electronic device 600, the electronic device 600 may sense the external temperature. When heating of the display 630 is required based on the sensing result of the external temperature, the processor (e.g., the processor 120 in FIG. 2B) may sense the fixed region 631 and the variable region 632 of the display 630 by using at least one sensor module (e.g., the sensor module 176 in FIG. 1). The processor (e.g., the processor 120 in FIG. 2B) may heat the variable region 632 when the external temperature is lower than a preset value.

According to an embodiment, in the screen expansion (e.g., slide-out) state of the electronic device 600, the processor (e.g., the processor 120 in FIG. 2B) may set the fixed region 631 as the non-heating region 613. The processor (e.g., the processor 120 in FIG. 2B) may control the display driver (e.g., DDI) so that the pixels of the fixed region 631 are driven at a first frequency (e.g., 60 Hz to 90 Hz). Under the control of the processor (e.g., the processor 120 in FIG. 2B), the display driver (e.g., DDI) may drive the pixels of the fixed region 631 at the first frequency (e.g., 60 Hz to 90 Hz).

According to an embodiment, in the screen expansion (e.g., slide-out) state of the electronic device 600, the processor (e.g., the processor 120 in FIG. 2B) may set the variable region 632 as the heating region 634, and control the display driver (e.g., DDI) so that the pixels of the variable region 632 are driven at a second frequency (e.g., 120 Hz to 240 Hz). Under the control of the processor (e.g., the processor 120 in FIG. 2B), the display driver (e.g., DDI) may drive the pixels of the variable region 632 at the second frequency (e.g., 120 Hz to 240 Hz).

Here, when the electronic device 600 changes from the screen expansion (e.g., slide-out) state to the screen reduction (e.g., slide-in) state, a part or the entire of the variable region 632 may be inserted into the housing 520. Therefore, in order to reduce the breakage of the variable region 632 of the display 630 in the curved portion 501, the pixels of the variable region 632 may be driven at the second frequency (e.g., 120 Hz to 240 Hz) to heat the variable region 632.

Figure 7:
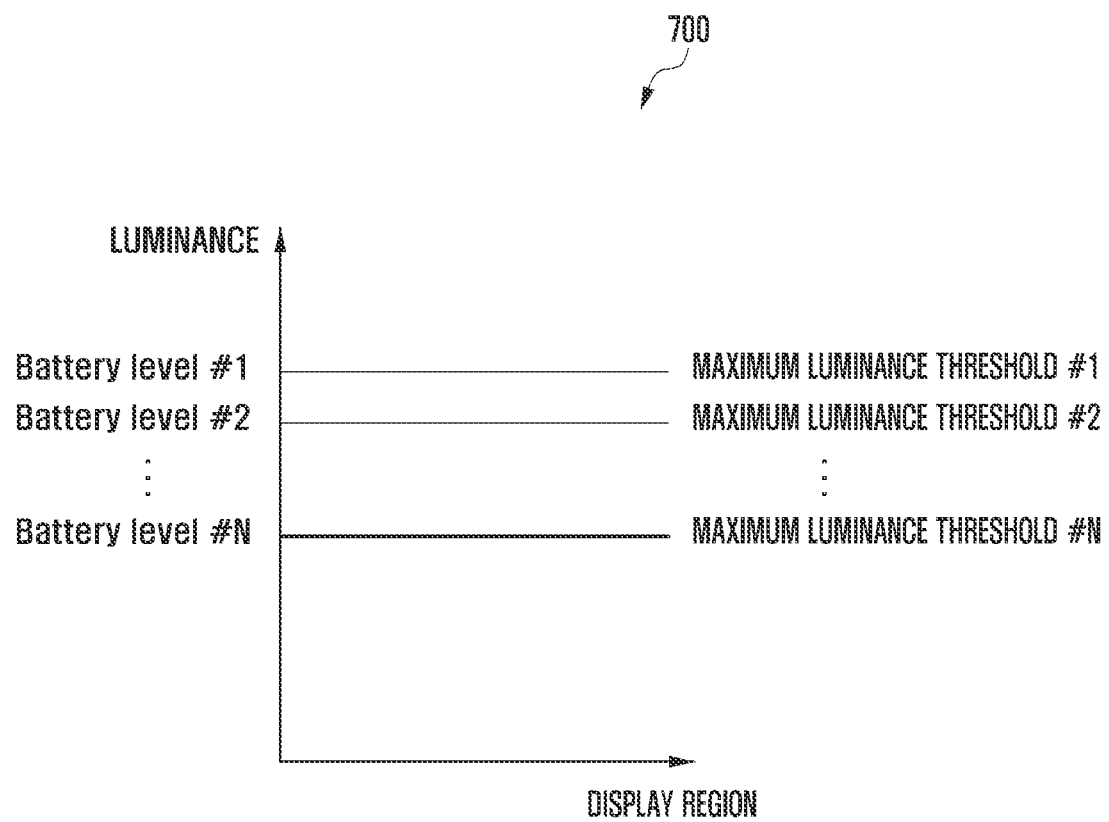
FIG. 7 is a diagram illustrating a maximum luminance threshold value of a variable region of a display depending on a charge level of a battery according to an embodiment of the disclosure.

FIG. 7 is a diagram illustrating a maximum luminance threshold value of a variable region of a display depending on a charge level of a battery according to an embodiment of the disclosure.

Referring to FIGS. 6A to 6C and 7 (depicting diagram 700), a processor of an electronic device 600 (e.g., a processor 120 in FIG. 2B) may refer to a charge level of a battery (e.g., a battery 189 in FIG. 1) when adjusting a luminance of a variable region 612, 622, or 632 so as to heat a variable region 612, 622, or 632 of a display 610, 620, or 630.

According to an embodiment, when it is determined that heating of the variable region 612, 622, or 632 is required, the processor (e.g., the processor 120 in FIG. 2B) of the electronic device 600 may identify the charge level of the battery (e.g., the battery 189 in FIG. 1). Based on the charge level of the battery (e.g., the battery 189 in FIG. 1), the processor (e.g., the processor 120 in FIG. 2B) may set a maximum luminance threshold value for heating the variable region 612, 622, or 632.

In an example, when a charge state of the battery (e.g., the battery 189 in FIG. 1) is a first charge level (e.g., greater than 90% charge), the processor (e.g., the processor 120 in FIG. 2B) may control the display driver (e.g., DDI) so that the variable region 612, 622, or 632 emit light at a first maximum luminance threshold value (e.g., 239 to 255 luminance values). When the charge state of the battery (e.g., the battery 189 in FIG. 1) is the first charge level (e.g., greater than 90% charge), the variable region 612, 622, or 632 emits light at the first maximum luminance threshold value (e.g., 239 to 255 luminance values) under the control of the display driver (e.g., DDI), and thereby the variable region 612, 622, or 632 may be heated. Here, the variable region 612, 622, or 632 may be heated at a first temperature.

In an example, when the charge state of the battery (e.g., the battery 189 in FIG. 1) is a second charge level (e.g., 80-90% charge), the processor (e.g., the processor 120 in FIG. 2B) may control the display driver (e.g., DDI) so that the variable region 612, 622, or 632 emit light at a second maximum luminance threshold value (e.g., 223 to 239 luminance values). When the charge state of the battery (e.g., the battery 189 in FIG. 1) is the second charge level (e.g., 80-90% charge), the variable region 612, 622, or 632 emits light at the second maximum luminance threshold value (e.g., 223 to 239 luminance values) under the control of the display driver (e.g., DDI), and thereby the variable region 612, 622, or 632 may be heated. Here, the variable region 612, 622, or 632 may be heated at a second temperature, and the second temperature may be lower than the first temperature.

In an example, when the charge state of the battery (e.g., the battery 189 in FIG. 1) is a third charge level (e.g., 70-80% charge), the processor (e.g., the processor 120 in FIG. 2B) may control the display driver (e.g., DDI) so that the variable region 612, 622, or 632 emit light at a third maximum luminance threshold value (e.g., 207 to 223 luminance values). When the charge state of the battery (e.g., the battery 189 in FIG. 1) is the third charge level (e.g., 70-80% charge), the variable region 612, 622, or 632 emits light at the third maximum luminance threshold value (e.g., 207 to 223 luminance values) under the control of the display driver (e.g., DDI), and thereby the variable region 612, 622, or 632 may be heated. Here, the variable region 612, 622, or 632 may be heated at a third temperature, and the third temperature may be lower than the second temperature.

In an example, when the charge state of the battery (e.g., the battery 189 in FIG. 1) is a fourth charge level (e.g., 60-70% charge), the processor (e.g., the processor 120 in FIG. 2B) may control the display driver (e.g., DDI) so that the variable region 612, 622, or 632 emit light at a fourth maximum luminance threshold value (e.g., 191 to 207 luminance values). When the charge state of the battery (e.g., the battery 189 in FIG. 1) is the fourth charge level (e.g., 60-70% charge), the variable region 612, 622, or 632 emits light at the fourth maximum luminance threshold value (e.g., 191 to 207 luminance values) under the control of the display driver (e.g., DDI), and thereby the variable region 612, 622, or 632 may be heated. Here, the variable region 612, 622, or 632 may be heated at a fourth temperature, and the fourth temperature may be lower than the third temperature.

In an example, when the charge state of the battery (e.g., the battery 189 in FIG. 1) is a fifth charge level (e.g., 50-60% charge), the processor (e.g., the processor 120 in FIG. 2B) may control the display driver (e.g., DDI) so that the variable region 612, 622, or 632 emit light at a fifth maximum luminance threshold value (e.g., 191 to 207 luminance values). When the charge state of the battery (e.g., the battery 189 in FIG. 1) is the fifth charge level (e.g., 50-60% charge), the variable region 612, 622, or 632 emits light at the fifth maximum luminance threshold value (e.g., 191 to 207 luminance values) under the control of the display driver (e.g., DDI), and thereby the variable region 612, 622, or 632 may be heated. Here, the variable region 612, 622, or 632 may be heated at a fifth temperature, and the fifth temperature may be lower than the fourth temperature.

In an example, when the charge state of the battery (e.g., the battery 189 in FIG. 1) is a preset power saving mode level (e.g., 30% charge or less), the processor (e.g., the processor 120 in FIG. 2B) may not heat the variable region 612, 622, or 632.

As such, the processor (e.g., the processor 120 in FIG. 2B) may set the maximum luminance threshold value for heating the variable region 612, 622, or 632 to increase in proportion to the charge state (e.g., charge level) of the battery (e.g., the battery 189 in FIG. 1).

Besides, in case that the battery (e.g., the battery 189 in FIG. 1) of the electronic device 600 is charged, the processor (e.g., the processor 120 in FIG. 2B) may set the maximum luminance threshold value for heating the variable region 612, 622, or 632 to the maximum. When the battery (e.g., the battery 189 in FIG. 1) is charged, the variable region 612, 622, or 632 may emit light at the maximum luminance threshold value (e.g., 255 luminance value), and thereby the variable region 612, 622, or 632 may be heated.

Besides, when the electronic device 600 increases the driving frequency (e.g., heating frequency, 120 to 240 Hz) of the variable region 612, 622, or 632 than the driving frequencies (e.g., 60 Hz) of the fixed region 611, 621, or 631 of the display 610, 620, or 630 for heating, the processor 120 may set the heating frequency (e.g., 120 to 240 Hz) for heating the variable region 612, 622, or 632 based on the charge level of the battery (e.g., the battery 189 in FIG. 1).

In an example, when the charge state of the battery (e.g., the battery 189 in FIG. 1) is the first charge level (e.g., greater than 90% charge), the processor (e.g., the processor 120 in FIG. 2B) may control the display driver (e.g., DDI) so that pixels of the variable region 612, 622, or 632 operate at a first heating frequency (e.g., 240 Hz). When the charge state of the battery (e.g., the battery 189 in FIG. 1) is the first charge level (e.g., greater than 90% charge), the pixels of the variable region 612, 622, or 632 may operate at the first heating frequency (e.g., 240 Hz) by the display driver (e.g., DDI). Here, the variable region 612, 622, or 632 may be heated at a first temperature.

In an example, when the charge state of the battery (e.g., the battery 189 in FIG. 1) is the second charge level (e.g., 80-90% charge), the processor (e.g., the processor 120 in FIG. 2B) may control the display driver (e.g., DDI) so that pixels of the variable region 612, 622, or 632 operate at a second heating frequency (e.g., 180 Hz). When the charge state of the battery (e.g., the battery 189 in FIG. 1) is the second charge level (e.g., 80-90% charge), the pixels of the variable region 612, 622, or 632 may operate at the second heating frequency (e.g., 180 Hz) by the display driver (e.g., DDI), and thereby the variable region 612, 622, or 632 may be heated. Here, the variable region 612, 622, or 632 may be heated at a second temperature, and the second temperature may be lower than the first temperature.

In an example, when the charge state of the battery (e.g., the battery 189 in FIG. 1) is the third charge level (e.g., 70-80% charge), the processor (e.g., the processor 120 in FIG. 2B) may control the display driver (e.g., DDI) so that pixels of the variable region 612, 622, or 632 operate at a third heating frequency (e.g., 150 Hz). When the charge state of the battery (e.g., the battery 189 in FIG. 1) is the third charge level (e.g., 70-80% charge), the pixels of the variable region 612, 622, or 632 may operate at the third heating frequency (e.g., 150 Hz) by the display driver (e.g., DDI), and thereby the variable region 612, 622, or 632 may be heated. Here, the variable region 612, 622, or 632 may be heated at a third temperature, and the third temperature may be lower than the second temperature.

In an example, when the charge state of the battery (e.g., the battery 189 in FIG. 1) is the fourth charge level (e.g., 60-70% charge), the processor (e.g., the processor 120 in FIG. 2B) may control the display driver (e.g., DDI) so that pixels of the variable region 612, 622, or 632 operate at a fourth heating frequency (e.g., 120 Hz). When the charge state of the battery (e.g., the battery 189 in FIG. 1) is the fourth charge level (e.g., 60-70% charge), the pixels of the variable region 612, 622, or 632 may operate at the fourth heating frequency (e.g., 120 Hz) by the display driver (e.g., DDI), and thereby the variable region 612, 622, or 632 may be heated. Here, the variable region 612, 622, or 632 may be heated at a fourth temperature, and the fourth temperature may be lower than the third temperature.

In an example, when the charge state of the battery (e.g., the battery 189 in FIG. 1) is the preset power saving mode level (e.g., 30% charge or less), the processor (e.g., the processor 120 in FIG. 2B) may not heat the variable region 612, 622, or 632.

Figure 8A:
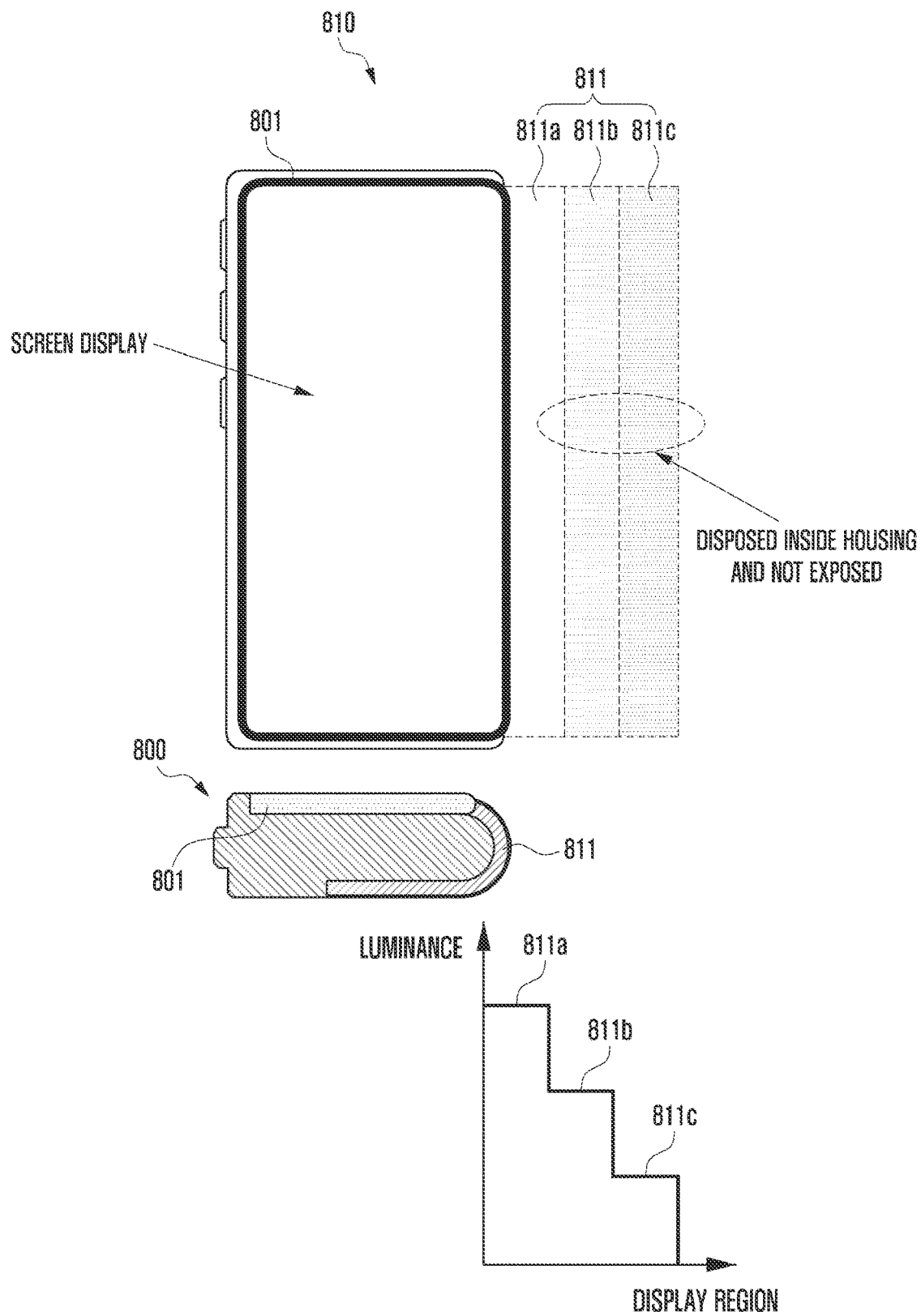
FIG. 8A is a diagram illustrating an example of heating a variable region by adjusting luminance of the variable region in a screen reduction (e.g., slide-in) state of an electronic device according to an embodiment of the disclosure.

FIG. 8A is a diagram illustrating an example of heating a variable region by adjusting a luminance of a variable region in a screen reduction (e.g., slide-in) state of an electronic device according to an embodiment of the disclosure.

Referring to FIGS. 6A and 8A, in a screen reduction (e.g., slide-in) state of an electronic device 800, an electronic device 600 or 800 may transfer heat generated by an electronic component (e.g., an electronic component 540 in FIG. 5) to a display 810 and thereby heat a region (e.g., a variable region 811) of a display corresponding to a curved portion (e.g., a curved portion 501 in FIG. 5). In the screen reduction (e.g., slide-in) state of the electronic device 800, a processor (e.g., the processor 120 in FIG. 2B) may sense a fixed region 801 and the variable region 811 of the display 810 by using at least one sensor module (e.g., the sensor module 570 in FIG. 5).

According to an embodiment, the processor (e.g., the processor 120 in FIG. 2B) may sense the external temperature by using the at least one sensor module (e.g., the sensor module 570 in FIG. 5). When the external temperature is lower than a preset reference temperature (e.g., a low-temperature environment that may cause the breakage of the display) as a result of sensing the external temperature, the processor (e.g., the processor 120 in FIG. 2B) may heat the variable region 811 of the display 810. The processor (e.g., the processor 120 in FIG. 2B) may sense the temperature of the fixed region 801 of the display 810 by using the at least one sensor module (e.g., the sensor module 570 in FIG. 5). The processor (e.g., the processor 120 in FIG. 2B) may sense the temperature of the variable region 811 of the display 810 by using the at least one sensor module (e.g., the sensor module 570 in FIG. 5). The processor (e.g., the processor 120 in FIG. 2B) may divide the variable region 811 of the display 810 into a plurality of regions 811*a*, 811*b*, and 811*c*, and adjust the heating temperature of each of the plurality of regions 811*a*, 811*b*, and 811*c*. When the electronic device 800 changes from the screen reduction (e.g., slide-in) state to the screen expansion (e.g., slide-out) state, the processor (e.g., (e.g., the processor 120 in FIG. 2B) may separately heat the plurality of regions 811*a*, 811*b*, and 811*c* of the variable region 811 according to the order that the variable region 811 is exposed to the outside.

In an example, the plurality of regions 811*a*, 811*b*, and 811*c* may be divided into a first region 811*a*, a second region 811*b*, and a third region 811*c* in the order adjacent to the fixed region 801. The first region 811*a* may be disposed adjacent to the fixed region 801, the second region 811*b* may be disposed adjacent to the first region 811*a*, and the third region 811*c* may be disposed adjacent to the second region 811*b*. That is, in the plurality of regions 811*a*, 811*b*, and 811*c*, the first region 811*a*, the second region 811*b*, and the third region 811*c* may be sequentially disposed in the order that they are exposed to the outside.

In an example, when the electronic device 800 changes from the screen reduction (e.g., slide-in) state to the screen expansion (e.g., slide-out) state, the processor (e.g., the processor 120 in FIG. 2B) may heat the plurality of regions 811*a*, 811*b*, and 811*c* of the variable region 811 at different temperatures so as to reduce the breakage of the display 810. The processor (e.g., the processor 120 in FIG. 2B) may heat the first region 811*a* exposed first among the plurality of regions 811*a*, 811*b*, and 811*c* of the variable region 811 at the highest first temperature. In addition, the processor (e.g., the processor 120 in FIG. 2B) may heat the second region 811*b* exposed after the first region 811*a* at a second temperature lower than the first temperature. In addition, the processor (e.g., the processor 120 in FIG. 2B) may heat the third region 811*c* exposed after the second region 811*b* at a third temperature lower than the second temperature.

In an example, when the electronic device 800 changes from the screen reduction (e.g., slide-in) state to the screen expansion (e.g., slide-out) state, the processor (e.g., the processor 120 in FIG. 2B) may heat the plurality of regions 811*a*, 811*b*, and 811*c* of the variable region 811 so as to reduce the breakage of the display 810. Here, the processor (e.g., the processor 120 in FIG. 2B) may set heating temperatures of the plurality of regions 811*a*, 811*b*, and 811*c* of the variable region 811 to be high in the order of proximity to the fixed region 801. The processor (e.g., the processor 120 in FIG. 2B) may heat the first region 811*a* closest to the fixed region 801 at the highest first temperature. In addition, the processor (e.g., the processor 120 in FIG. 2B) may heat the second region 811*b* disposed farther than the first region 811*a* with respect to the fixed region 801 at a second temperature lower than the first temperature. In addition, the processor (e.g., the processor 120 in FIG. 2B) may heat the third region 811*c* disposed farther than the second region 811*b* with respect to the fixed region 801 at a third temperature lower than the second temperature.

As the luminance of light output from the display 810 increases, the current consumption may increase, and accordingly the temperature of heat emitted from the display 810 may increase. Therefore, the processor (e.g., the processor 120 in FIG. 2B) may adjust each heating temperature of the plurality of regions 811*a*, 811*b*, and 811*c* by adjusting the luminance of the plurality of regions 811*a*, 811*b*, and 811*c* of the variable region 811.

In the screen reduction state, adjusting each luminance of the plurality of variable regions may be used for heating the variable regions. According to an embodiment, in the screen reduction state, the processor (e.g., the processor 120 in FIG. 2B) may control a display driver (e.g., DDI) so that pixels of the first region 811*a* of the variable region 811 emit light at a first luminance. Under the control of the processor (e.g., the processor 120 in FIG. 2B), the display driver (e.g., DDI) may cause the pixels of the first region 811*a* to emit light at the first luminance. Through this, the first region 811*a* may be heated at a first temperature.

In an example, the processor (e.g., the processor 120 in FIG. 2B) may control the display driver (e.g., DDI) so that pixels of the second region 811*b* of the variable region 811 emit light at a second luminance lower than the first luminance. Under the control of the processor (e.g., the processor 120 in FIG. 2B), the display driver (e.g., DDI) may cause the pixels of the second region 811*b* to emit light at the second luminance lower than the first luminance. Through this, the second region 811*b* may be heated at a second temperature lower than the first temperature.

In an example, the processor (e.g., the processor 120 in FIG. 2B) may control the display driver (e.g., DDI) so that pixels of the third region 811*c* of the variable region 811 emit light at a third luminance lower than the second luminance. Under the control of the processor (e.g., the processor 120 in FIG. 2B), the display driver (e.g., DDI) may cause the pixels of the third region 811*c* to emit light at the third luminance lower than the second luminance. Through this, the third region 811*c* may be heated at a third temperature lower than the second temperature.

Besides, the processor (e.g., the processor 120 in FIG. 2B) may sense the temperature of each of the plurality of regions 811*a*, 811*b*, and 811*c* of the variable region 811. Based on the temperature sensing result of each of the plurality of regions 811*a*, 811*b*, and 811*c*, the processor (e.g., the processor 120 in FIG. 2B) may cause a region having a lower temperature than the surrounding regions among the plurality of regions 811*a*, 811*b*, and 811*c* to emit light at a higher luminance than the surrounding regions.

In the screen reduction state, adjusting each driving frequency of the plurality of variable regions may be used for heating the variable regions. According to an embodiment, in the screen reduction (e.g., slide-in) state of the electronic device 800, the processor (e.g., the processor 120 in FIG. 2B) may control the display driver (e.g., DDI) so that pixels of the fixed region 801 are driven at a driving frequency (e.g., 60 Hz) when the fixed region 801 displays a screen. Under the control of the processor (e.g., the processor 120 in FIG. 2B), the display driver (e.g., DDI) may drive the pixels of the fixed region 801 at the driving frequency (e.g., 60 Hz).

In an example, when the electronic device 800 changes from the screen reduction (e.g., slide-in) state to the screen expansion (e.g., slide-out) state, the processor (e.g., the processor 120 in FIG. 2B) may heat the variable region 811 so as to reduce the breakage of the display 810.

The processor (e.g., the processor 120 in FIG. 2B) may set the variable region 811 as a heating region, and control the display driver (e.g., DDI) so that the pixels of the variable region 811 are driven at a heating frequency (e.g., 120 Hz to 240 Hz) higher than the driving frequency (e.g., 60 Hz). Under the control of the processor (e.g., the processor 120 in FIG. 2B), the display driver (e.g., DDI) may drive the pixels of the variable region 811 at the heating frequency (e.g., 120 Hz to 240 Hz). To heat the variable region 811, the driving frequency of the variable region 811 may be increased than the driving frequency (e.g., 60 Hz) of the fixed region 801. Here, the processor (e.g., the processor 120 in FIG. 2B) may set the heating temperatures of the plurality of regions 811a, 811b, and 811c of the variable region 811 to be high in the order of proximity to the fixed region 801.

As the driving frequency of the display 810 increases, the current consumption may increase, and accordingly the temperature of heat emitted from the display 810 may increase. As such, in order to heat the variable region 811, the driving frequency of the variable region 811 may be increased.

In an example, the processor (e.g., the processor 120 in FIG. 2B) may control the display driver (e.g., DDI) so that pixels of the first region 811a of the variable region 811 are driven at a first heating frequency (e.g., 240 Hz). Under the control of the processor (e.g., the processor 120 in FIG. 2B), the display driver (e.g., DDI) may drive the pixels of the first region 811a at the first heating frequency (e.g., 240 Hz). Through this, the first region 811a may be heated at the highest first temperature.

In an example, the processor (e.g., the processor 120 in FIG. 2B) may control the display driver (e.g., DDI) so that pixels of the second region 811b of the variable region 811 are driven at a second heating frequency (e.g., 180 Hz) lower than the first heating frequency (e.g., 240 Hz). Under the control of the processor (e.g., the processor 120 in FIG. 2B), the display driver (e.g., DDI) may drive the pixels of the second region 811b at the second heating frequency (e.g., 180 Hz). Through this, the second region 811b may be heated at a second temperature lower than the first temperature.

In an example, the processor (e.g., the processor 120 in FIG. 2B) may control the display driver (e.g., DDI) so that pixels of the third region 811c of the variable region 811 are driven at a third heating frequency (e.g., 150 Hz) lower than the second heating frequency (e.g., 180 Hz). Under the control of the processor (e.g., the processor 120 in FIG. 2B), the display driver (e.g., DDI) may drive the pixels of the third region 811c at the third heating frequency (e.g., 150 Hz). Through this, the third region 811c may be heated at a third temperature lower than the second temperature.

Besides, the processor (e.g., the processor 120 in FIG. 2B) may sense the temperature of each of the plurality of regions 811a, 811b, and 811c of the variable region 811. Based on the temperature sensing result of each of the plurality of regions 811a, 811b, and 811c, the processor (e.g., the processor 120 in FIG. 2B) may drive a region having a lower temperature than the surrounding regions among the plurality of regions 811a, 811b, and 811c at a higher frequency than the surrounding regions.

According to another embodiment, in the screen reduction (e.g., slide-in) state of the electronic device 800, the processor (e.g., the processor 120 in FIG. 2B) may not only increase the luminance of the variable region 811, but also increase the driving frequency of the variable region 811, so as to heat the variable region 811. Increasing the luminance and driving frequency of the variable region 811 may heat faster the variable region 811 than increasing only the luminance or driving frequency of the variable region 811.

Figure 8B:
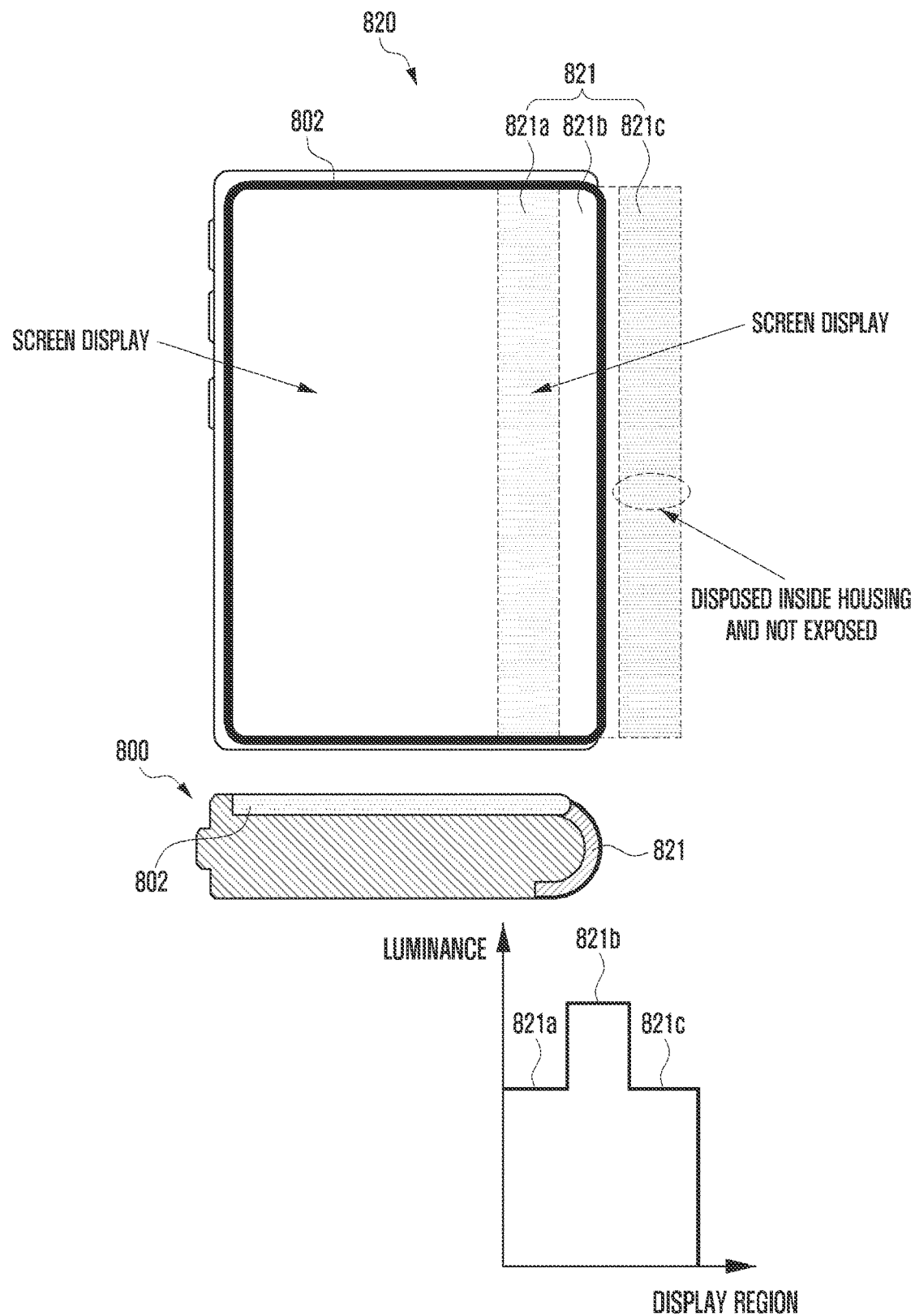
FIG. 8B is a diagram illustrating an example of heating a variable region by adjusting luminance of the variable region in a screen size change (e.g., sliding) state of an electronic device according to an embodiment of the disclosure.

FIG. 8B is a diagram illustrating an example of heating a variable region by adjusting a luminance of a variable region in a screen size change (e.g., sliding) state of an electronic device according to an embodiment of the disclosure.

Referring to FIGS. 6B and 8B, in a screen size change state (e.g., a sliding state, an intermediate state between slide-in and slide-out, or an intermediate state between screen expansion and screen reduction), an electronic device 600 or 800 according to various embodiments may transfer heat generated by an electronic component (e.g., an electronic component 540 in FIG. 5) to a display 820 and thereby heat a region (e.g., a variable region) of a display corresponding to a curved portion (e.g., a curved portion 501 in FIG. 5). In the screen size change state, a processor (e.g., the processor 120 in FIG. 2B) may sense a fixed region 802 and a variable region 821 of the display 820 by using at least one sensor module (e.g., the sensor module 570 in FIG. 5).

According to an embodiment, the processor (e.g., the processor 120 in FIG. 2B) may sense the external temperature by using the at least one sensor module (e.g., the sensor module 570 in FIG. 5). When the external temperature is lower than a preset reference temperature (e.g., a low-temperature environment that may cause the breakage of the display) as a result of sensing the external temperature, the processor (e.g., the processor 120 in FIG. 2B) may heat the variable region 821 of the display 820. The processor (e.g., the processor 120 in FIG. 2B) may sense the temperature of the fixed region 802 of the display 820 by using the at least one sensor module (e.g., the sensor module 570 in FIG. 5). The processor (e.g., the processor 120 in FIG. 2B) may sense the temperature of the variable region 821 of the display 820 by using the at least one sensor module (e.g., the sensor module 570 in FIG. 5). The processor (e.g., the processor 120 in FIG. 2B) may divide the variable region 821 of the display 820 into a plurality of regions 821a, 821b, and 821c, and adjust the heating temperature of each of the plurality of regions 821a, 821b, and 821c. In an example, the plurality of regions 821a, 821b, and 821c may be divided into a first region 821a, a second region 821b, and a third region 821c in the order adjacent to the fixed region 802. The first region 821a may be disposed adjacent to the fixed region 802, the second region 821b may be disposed adjacent to the first region 821a, and the third region 821c may be disposed adjacent to the second region 821b.

According to an embodiment, in the screen size change state of the electronic device 800, the screen reduction (e.g., slide-in) or screen expansion (e.g., slide-out) may be performed. In case of the screen reduction (e.g., slide-in) or screen expansion (e.g., slide-out), the electronic device 800 may adjust each heating temperature of the plurality of regions 821a, 821b, and 821c so as to reduce the breakage of the display 820.

In an example, considering the order that movement occurs when the screen reduction (e.g., slide-in) or screen expansion (e.g., slide-out) is performed in the screen size change state, the processor (e.g., the processor 120 in FIG. 2B) may heat, at the highest first temperature, the second region 821b where the screen reduction (e.g., slide-in) or screen expansion (e.g., slide-out) may occur first. In addition, the first region 821a inserted into a housing (e.g., the housing 520 in FIG. 5) in case of the screen reduction (e.g., slide-in) may be heated at a second temperature lower than the first temperature. In addition, the third region 821c exposed to the outside in case of the screen expansion (e.g., slide-out) may be heated at the second temperature lower than the first temperature.

As the luminance of light output from the display 820 increases, the current consumption may increase, and accordingly the temperature of heat emitted from the display 820 may increase. Therefore, the processor (e.g., the processor 120 in FIG. 2B) may adjust each heating temperature of the plurality of regions 811a, 811b, and 811c by adjusting the luminance of the plurality of regions 811a, 811b, and 811c of the variable region 821.

In the screen size change state, adjusting each luminance of the plurality of variable regions may be used for heating the variable regions. According to an embodiment, in the screen size change state, the processor (e.g., the processor 120 in FIG. 2B) may control a display driver (e.g., DDI) so that pixels of the second region 821b of the variable region 821 emit light at a first luminance. Under the control of the processor (e.g., the processor 120 in FIG. 2B), the display driver (e.g., DDI) may cause the pixels of the second region 821b to emit light at the first luminance. Through this, the second region 821b may be heated at a first temperature.

In an example, the processor (e.g., the processor 120 in FIG. 2B) may control the display driver (e.g., DDI) so that pixels of the first region 821a of the variable region 821 emit light at a second luminance lower than the first luminance. Under the control of the processor (e.g., the processor 120 in FIG. 2B), the display driver (e.g., DDI) may cause the pixels of the first region 821a to emit light at the second luminance lower than the first luminance. Through this, the first region 821a may be heated at a second temperature lower than the first temperature.

In an example, the processor (e.g., the processor 120 in FIG. 2B) may control the display driver (e.g., DDI) so that pixels of the third region 821c of the variable region 821 emit light at the second luminance lower than the first luminance. Under the control of the processor (e.g., the processor 120 in FIG. 2B), the display driver (e.g., DDI) may cause the pixels of the third region 821c to emit light at the second luminance lower than the first luminance. Through this, the third region 821c may be heated at the second temperature lower than the first temperature.

Besides, the processor (e.g., the processor 120 in FIG. 2B) may sense the temperature of each of the plurality of regions 821a, 821b, and 821c of the variable region 821. Based on the temperature sensing result of each of the plurality of regions 821a, 821b, and 821c, the processor (e.g., the processor 120 in FIG. 2B) may cause a region having a lower temperature than the surrounding regions among the plurality of regions 821a, 821b, and 821c to emit light at a higher luminance than the surrounding regions.

In the screen size change state, adjusting each driving frequency of the plurality of variable regions may be used for heating the variable regions. According to an embodiment, in the screen size change state of the electronic device 800, the processor (e.g., the processor 120 in FIG. 2B) may control the display driver (e.g., DDI) so that pixels of the fixed region 802 displaying a screen are driven at a driving frequency (e.g., 60 Hz). Under the control of the processor (e.g., the processor 120 in FIG. 2B), the display driver (e.g., DDI) may drive the pixels of the fixed region 801 at the driving frequency (e.g., 60 Hz).

In an example, in the screen size change state, the electronic device 800 may heat the variable region 821 so as to reduce the breakage of the display 810.

The processor (e.g., the processor 120 in FIG. 2B) may set the variable region 821 as a heating region, and control the display driver (e.g., DDI) so that the pixels of the variable region 821 are driven at a heating frequency (e.g., 120 Hz to 240 Hz) higher than the driving frequency (e.g., 60 Hz). Under the control of the processor (e.g., the processor 120 in FIG. 2B), the display driver (e.g., DDI) may drive the pixels of the variable region 821 at the heating frequency (e.g., 120 Hz to 240 Hz). To heat the variable region 821, the driving frequency of the variable region 821 may be increased than the driving frequency (e.g., 60 Hz) of the fixed region 802.

In an example, considering the order that movement occurs when the screen reduction (e.g., slide-in) or screen expansion (e.g., slide-out) is performed in the screen size change state, the processor (e.g., the processor 120 in FIG. 2B) may heat, at the highest first temperature, the second region 821b where the screen reduction (e.g., slide-in) or screen expansion (e.g., slide-out) may occur first. In addition, the first region 821a inserted into a housing (e.g., the housing 520 in FIG. 5) in case of the screen reduction (e.g., slide-in) may be heated at a second temperature lower than the first temperature. In addition, the third region 821c exposed to the outside in case of the screen expansion (e.g., slide-out) may be heated at the second temperature lower than the first temperature.

As the driving frequency of the display 820 increases, the current consumption may increase, and accordingly the temperature of heat emitted from the display 820 may increase. As such, in order to heat the variable region 821, the driving frequency of the variable region 821 may be increased.

In an example, the processor (e.g., the processor 120 in FIG. 2B) may control the display driver (e.g., DDI) so that pixels of the second region 821b of the variable region 821 are driven at a first heating frequency (e.g., 240 Hz). Under the control of the processor (e.g., the processor 120 in FIG. 2B), the display driver (e.g., DDI) may drive the pixels of the second region 821b at the first heating frequency (e.g., 240 Hz). Through this, the second region 821b may be heated at the highest first temperature.

In an example, the processor (e.g., the processor 120 in FIG. 2B) may control the display driver (e.g., DDI) so that pixels of the first region 821a of the variable region 821 are driven at a second heating frequency (e.g., 180 Hz) lower than the first heating frequency (e.g., 240 Hz). Under the control of the processor (e.g., the processor 120 in FIG. 2B), the display driver (e.g., DDI) may drive the pixels of the first region 821a at the second heating frequency (e.g., 180 Hz). Through this, the first region 821a may be heated at a second temperature lower than the first temperature.

In an example, the processor (e.g., the processor 120 in FIG. 2B) may control the display driver (e.g., DDI) so that pixels of the third region 821c of the variable region 821 are driven at the second heating frequency (e.g., 180 Hz) lower than the first heating frequency (e.g., 240 Hz). Under the control of the processor (e.g., the processor 120 in FIG. 2B), the display driver (e.g., DDI) may drive the pixels of the third region 821c at the second heating frequency (e.g., 180 Hz). Through this, the third region 821c may be heated at the second temperature lower than the first temperature.

Besides, the processor (e.g., the processor 120 in FIG. 2B) may sense the temperature of each of the plurality of regions 821a, 821b, and 821c of the variable region 821. Based on the temperature sensing result of each of the plurality of regions 821a, 821b, and 821c, the processor (e.g., the processor 120 in FIG. 2B) may drive a region having a lower temperature than the surrounding regions among the plurality of regions 821a, 821b, and 821c at a higher frequency than the surrounding regions.

According to another embodiment, in the screen size change state of the electronic device 800, the processor (e.g., the processor 120 in FIG. 2B) may not only increase the luminance of the variable region 821, but also increase the driving frequency of the variable region 821, so as to heat the variable region 821. Increasing the luminance and driving frequency of the variable region 821 may heat faster the variable region 821 than increasing only the luminance or driving frequency of the variable region 821.

Figure 8C:
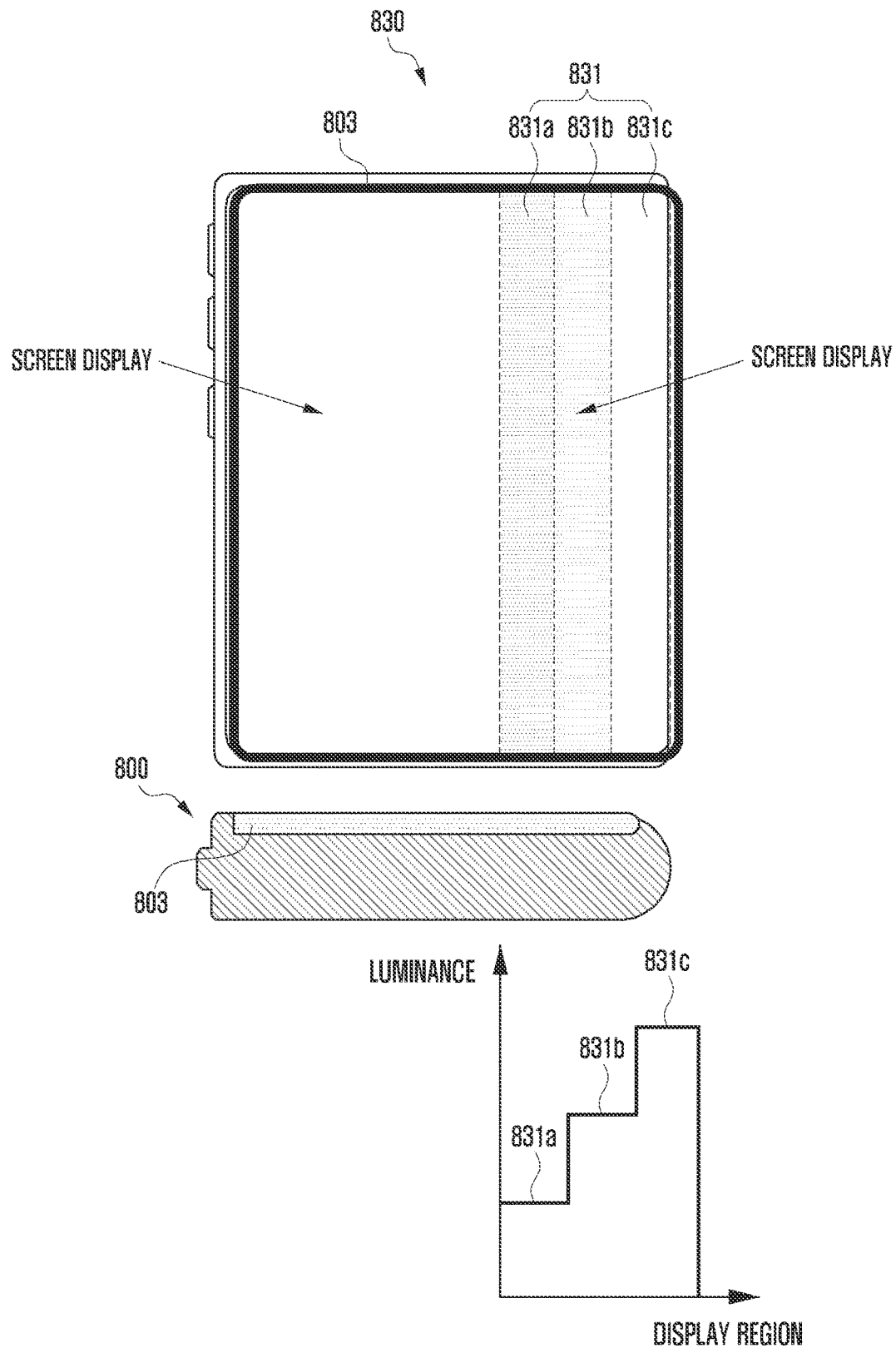
FIG. 8C is a diagram illustrating an example of heating a variable region by adjusting luminance of the variable region in a screen expansion (e.g., slide-out) state of an electronic device according to an embodiment of the disclosure.

FIG. 8C is a diagram illustrating an example of heating a variable region by adjusting a luminance of the variable region in a screen expansion (e.g., slide-out) state of an electronic device according to an embodiment of the disclosure.

Referring to FIGS. 6C and 8C, in a screen expansion (e.g., slide-out) state of an electronic device 800, an electronic device 800 may transfer heat generated by an electronic component (e.g., an electronic component 540 in FIG. 5) to a display 830 and thereby heat a region (e.g., a variable region) of a display corresponding to a curved portion (e.g., a curved portion 501 in FIG. 5). In the screen expansion (e.g., slide-out) state of the electronic device 800, a processor (e.g., the processor 120 in FIG. 2B) may sense a fixed region 803 and the variable region 831 of the display 830 by using at least one sensor module (e.g., the sensor module 570 in FIG. 5).

According to an embodiment, the processor (e.g., the processor 120 in FIG. 2B) may sense the external temperature by using the at least one sensor module (e.g., the sensor module 570 in FIG. 5). When the external temperature is lower than a preset reference temperature (e.g., a low-temperature environment that may cause the breakage of the display) as a result of sensing the external temperature, the processor (e.g., the processor 120 in FIG. 2B) may heat the variable region 831 of the display 830. The processor (e.g., the processor 120 in FIG. 2B) may sense the temperature of the fixed region 803 of the display 830 by using the at least one sensor module (e.g., the sensor module 570 in FIG. 5). The processor (e.g., the processor 120 in FIG. 2B) may sense the temperature of the variable region 831 of the display 830 by using the at least one sensor module (e.g., the sensor module 570 in FIG. 5). The processor (e.g., the processor 120 in FIG. 2B) may divide the variable region 831 of the display 810 into a plurality of regions 831a, 831b, and 831c, and adjust the heating temperature of each of the plurality of regions 831a, 831b, and 831c. When the electronic device 800 changes from the screen expansion (e.g., slide-out) state to the screen reduction (e.g., slide-in) state, the processor (e.g., the processor 120 in FIG. 2B) may separately heat the plurality of regions 831a, 831b, and 831c of the variable region 831 according to the order that the variable region 831 is inserted into a housing (e.g., the housing 520 in FIG. 5).

In an example, the plurality of regions 831a, 831b, and 831c may be divided into a first region 831a, a second region 831b, and a third region 831c in the order adjacent to the fixed region 803. The first region 831a may be disposed adjacent to the fixed region 803, the second region 831b may be disposed adjacent to the first region 831a, and the third region 831c may be disposed adjacent to the second region 831b.

In an example, when the electronic device 800 changes from the screen expansion (e.g., slide-out) state to the screen reduction (e.g., slide-in) state, the processor (e.g., the processor 120 in FIG. 2B) may heat the plurality of regions 813a, 831b, and 831c of the variable region 831 at different temperatures so as to reduce the breakage of the display 830. The processor (e.g., the processor 120 in FIG. 2B) may heat the third region 831c inserted first among the plurality of regions 831a, 831b, and 831c of the variable region 831 at the highest first temperature. In addition, the processor (e.g., the processor 120 in FIG. 2B) may heat the second region 831b inserted after the third region 831c at a second temperature lower than the first temperature. In addition, the processor (e.g., the processor 120 in FIG. 2B) may heat the first region 831a inserted after the second region 831b at a third temperature lower than the second temperature.

In an example, the processor (e.g., the processor 120 in FIG. 2B) may set heating temperatures of the plurality of regions 831a, 831b, and 831c of the variable region 831 to be high in the order of a long distance from the fixed region 803. The processor (e.g., the processor 120 in FIG. 2B) may heat the third region 831c furthest from the fixed region 803 at the highest first temperature. In addition, the processor (e.g., the processor 120 in FIG. 2B) may heat the second region 831b disposed closer than the third region 831c with respect to the fixed region 803 at a second temperature lower than the first temperature. In addition, the processor (e.g., the processor 120 in FIG. 2B) may heat the first region 831a disposed closer than the second region 831b with respect to the fixed region 803 at a third temperature lower than the second temperature.

As the luminance of light output from the display 830 increases, the current consumption may increase, and accordingly the temperature of heat emitted from the display 830 may increase. Therefore, the processor (e.g., the processor 120 in FIG. 2B) may adjust each heating temperature of the plurality of regions 831a, 831b, and 831c by adjusting the luminance of the plurality of regions 831a, 831b, and 831c of the variable region 831.

In the screen expansion state, adjusting each luminance of the plurality of variable regions may be used for heating the variable regions. According to an embodiment, in the screen expansion state, the processor (e.g., the processor 120 in FIG. 2B) may control a display driver (e.g., DDI) so that pixels of the third region 831c of the variable region 831 emit light at a first luminance. Under the control of the processor (e.g., the processor 120 in FIG. 2B), the display driver (e.g., DDI) may cause the pixels of the third region 831c to emit light at the first luminance. Through this, the third region 831c may be heated at a first temperature.

In an example, the processor (e.g., the processor 120 in FIG. 2B) may control the display driver (e.g., DDI) so that pixels of the second region 831b of the variable region 831 emit light at a second luminance lower than the first luminance. Under the control of the processor (e.g., the processor 120 in FIG. 2B), the display driver (e.g., DDI) may cause the pixels of the second region 831b to emit light at the second luminance lower than the first luminance. Through this, the second region 831b may be heated at a second temperature lower than the first temperature.

In an example, the processor (e.g., the processor 120 in FIG. 2B) may control the display driver (e.g., DDI) so that pixels of the first region 831a of the variable region 831 emit light at a third luminance lower than the second luminance.

Under the control of the processor (e.g., the processor 120 in FIG. 2B), the display driver (e.g., DDI) may cause the pixels of the first region 831a to emit light at the third luminance lower than the second luminance. Through this, the first region 831a may be heated at a third temperature lower than the second temperature.

Besides, the processor (e.g., the processor 120 in FIG. 2B) may sense the temperature of each of the plurality of regions 831a, 831b, and 831c of the variable region 831. Based on the temperature sensing result of each of the plurality of regions 831a, 831b, and 831c, the processor (e.g., the processor 120 in FIG. 2B) may cause a region having a lower temperature than the surrounding regions among the plurality of regions 831a, 831b, and 831c to emit light at a higher luminance than the surrounding regions.

In the screen expansion state, adjusting each driving frequency of the plurality of variable regions may be used for heating the variable regions. According to an embodiment, in the screen expansion (e.g., slide-out) state of the electronic device 800, the processor (e.g., the processor 120 in FIG. 2B) may control the display driver (e.g., DDI) so that pixels of the fixed region 803 are driven at a driving frequency (e.g., 60 Hz) when the fixed region 803 displays a screen. Under the control of the processor (e.g., the processor 120 in FIG. 2B), the display driver (e.g., DDI) may drive the pixels of the fixed region 803 at the driving frequency (e.g., 60 Hz).

In an example, when the electronic device 800 changes from the screen expansion (e.g., slide-out) state to the screen reduction (e.g., slide-in) state, the processor (e.g., the processor 120 in FIG. 2B) may heat the variable region 831 so as to reduce the breakage of the display 830.

The processor (e.g., the processor 120 in FIG. 2B) may set the variable region 831 as a heating region, and control the display driver (e.g., DDI) so that the pixels of the variable region 831 are driven at a heating frequency (e.g., 120 Hz to 240 Hz) higher than the driving frequency (e.g., 60 Hz). Under the control of the processor (e.g., the processor 120 in FIG. 2B), the display driver (e.g., DDI) may drive the pixels of the variable region 831 at the heating frequency (e.g., 120 Hz to 240 Hz). To heat the variable region 831, the driving frequency of the variable region 831 may be increased than the driving frequency (e.g., 60 Hz) of the fixed region 803. Here, the processor (e.g., the processor 120 in FIG. 2B) may set the heating temperatures of the plurality of regions 831a, 831b, and 831c of the variable region 831 to be high in the order of insertion into the housing (e.g., the housing 520 in FIG. 5).

As the driving frequency of the display 830 increases, the current consumption may increase, and accordingly the temperature of heat emitted from the display 830 may increase. As such, in order to heat the variable region 831, the driving frequency of the variable region 831 may be increased.

In an example, the processor (e.g., the processor 120 in FIG. 2B) may control the display driver (e.g., DDI) so that pixels of the third region 831c of the variable region 831 are driven at a first heating frequency (e.g., 240 Hz). Under the control of the processor (e.g., the processor 120 in FIG. 2B), the display driver (e.g., DDI) may drive the pixels of the third region 831c at the first heating frequency (e.g., 240 Hz). Through this, the third region 831c may be heated at the highest first temperature.

In an example, the processor (e.g., the processor 120 in FIG. 2B) may control the display driver (e.g., DDI) so that pixels of the second region 831b of the variable region 831 are driven at a second heating frequency (e.g., 180 Hz) lower than the first heating frequency (e.g., 240 Hz). Under the control of the processor (e.g., the processor 120 in FIG. 2B), the display driver (e.g., DDI) may drive the pixels of the second region 831b at the second heating frequency (e.g., 180 Hz). Through this, the second region 831b may be heated at a second temperature lower than the first temperature.

In an example, the processor (e.g., the processor 120 in FIG. 2B) may control the display driver (e.g., DDI) so that pixels of the first region 831a of the variable region 831 are driven at a third heating frequency (e.g., 150 Hz) lower than the second heating frequency (e.g., 180 Hz). Under the control of the processor (e.g., the processor 120 in FIG. 2B), the display driver (e.g., DDI) may drive the pixels of the first region 831a at the third heating frequency (e.g., 150 Hz). Through this, the first region 831a may be heated at a third temperature lower than the second temperature.

Besides, the processor (e.g., the processor 120 in FIG. 2B) may sense the temperature of each of the plurality of regions 831a, 831b, and 831c of the variable region 831. Based on the temperature sensing result of each of the plurality of regions 831a, 831b, and 831c, the processor (e.g., the processor 120 in FIG. 2B) may drive a region having a lower temperature than the surrounding regions among the plurality of regions 831a, 831b, and 831c at a higher frequency than the surrounding regions.

According to another embodiment, in the screen expansion (e.g., slide-out) state of the electronic device 800, the processor (e.g., the processor 120 in FIG. 2B) may not only increase the luminance of the variable region 831, but also increase the driving frequency of the variable region 831, so as to heat the variable region 831. Increasing the luminance and driving frequency of the variable region 831 may heat faster the variable region 831 than increasing only the luminance or driving frequency of the variable region 831.

Figure 9:
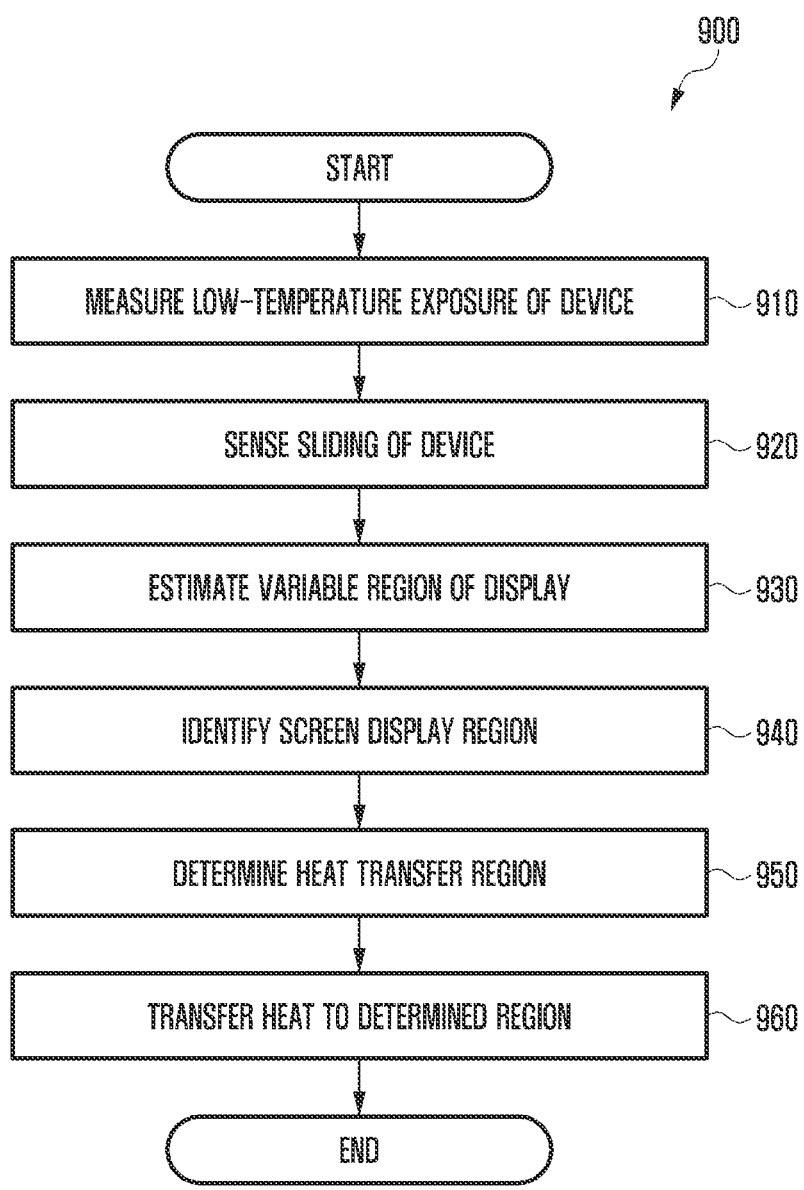
FIG. 9 is a diagram illustrating operations of heating a display depending on an external temperature according to an embodiment of the disclosure.

FIG. 9 is a diagram illustrating operations of heating a display depending on an external temperature according to an embodiment of the disclosure.

Referring to FIGS. 2B, 5, and 9 (depicting diagram 900), at operation 910, the processor 120 may measure an external temperature by using at least one sensor module 570. Based on the result of external temperature measurement, the processor 120 may determine whether a device (e.g., an electronic device) is exposed to a low-temperature environment.

At operation 920, the processor 120 may sense the sliding of the device (e.g., the electronic device) by using the sensor module 570. In an example, based on the result of sensing the sliding of the device (e.g., the electronic device), the processor 120 may determine whether a display (e.g., the display 610 in FIG. 6A, the display 620 in FIG. 6B, or the display 630 in FIG. 6C) is in a screen reduction (e.g., slide-in) state, a screen size change (e.g., sliding) state, or a screen expansion (e.g., slide-out) state. In addition, when the display 610, 620, or 630 is in the screen expansion state, in the screen reduction state, or in the screen size change state (e.g., a sliding state, an intermediate state between slide-in and slide-out, or an intermediate state between screen expansion and screen reduction), the processor 120 may calculate an expanded size (or reduced size) of the display 610, 620, or 630.

At operation 930, the processor 120 may estimate a variable region (e.g., the variable region 612 in FIG. 6A, the variable region 622 in FIG. 6B, or the variable region 632 in FIG. 6C) of the display 610, 620, or 630. In an example, based on the expanded size (or reduced size) of the display 610, 620, or 630, the processor 120 may estimate the variable region 612, 622, or 632 of the display 610, 620, or 630 that is varied during the screen expansion or screen reduction.

At operation 940, the processor 120 may identify a screen display region in the entire region (e.g., a fixed region and a variable region) of the display 610, 620, or 630.

At operation 950, the processor 120 may determine a heat transfer region (e.g., a region that requires heating in the variable region of the display) in which the risk of breakage is predicted during the screen expansion or screen reduction.

At operation 960, the processor 120 may heat the region where the risk of breakage is predicted during the screen expansion or screen reduction. In an example, the processor 120 may heat the entire of the variable region 612, 622, or 632 by adjusting the luminance and/or driving frequency of the entire variable region 612, 622, or 632 of the display 610, 620, or 630. In an example, the processor 120 may heat a part of the variable region 612, 622, or 632 by adjusting the luminance and/or driving frequency of the part of the variable region 612, 622, or 632 of the display 610, 620, or 630. In an example, the processor 120 may divide the variable region 612, 622, or 632 of the display 610, 620, or 630 into a plurality of regions, and adjust each heating temperature of the plurality of regions by adjusting the luminance and/or driving frequency of each of the plurality of regions.

Figure 10:
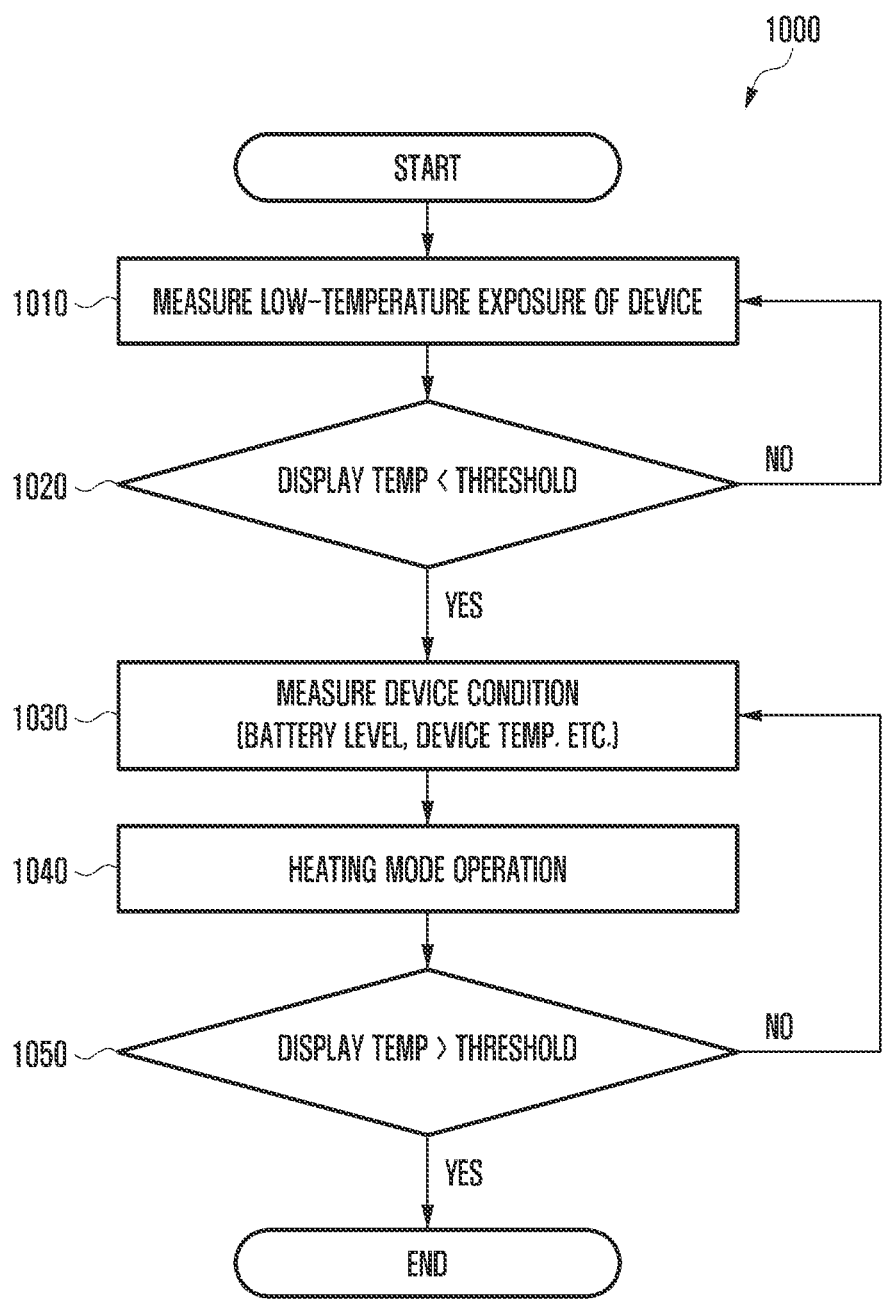
FIG. 10 is a diagram illustrating operations of heating a display depending on an external temperature and a display temperature according to an embodiment of the disclosure.

FIG. 10 is a diagram illustrating operations of heating a display depending on an external temperature and a display temperature according to an embodiment of the disclosure.

Referring to FIGS. 2B, 5, 7, and 10 (depicting diagram 1000), at operation 1010, a processor 120 may measure an external temperature by using at least one sensor module 570. Based on the result of external temperature measurement, the processor 120 may determine whether a device (e.g., an electronic device) is exposed to a low-temperature environment.

At operation 1020, using the at least one sensor module 570, the processor 120 may measure a temperature of at least a portion of a display (e.g., the display 610 in FIG. 6A, the display 620 in FIG. 6B, or the display 630 in FIG. 6C). The processor 120 may compare the temperature of the display 610, 620, or 630 with a preset threshold value (e.g., a temperature at which the breakage of the display is predicted). The processor 120 may determine whether the temperature of the display 610, 620, or 630 is lower than the threshold value.

When the temperature of the display 610, 620, or 630 is not lower than the threshold value, the processor 120 may return to the operation 1010 and perform the subsequent operations.

When the temperature of the display 610, 620, or 630 is lower than the threshold value, the processor 120 may measure a condition of the device (e.g., the electronic device) at operation 1030. In an example, the processor 120 may measure a remaining charge level of a battery (e.g., the battery 189 in FIG. 1) of the electronic device and a temperature of the electronic device.

At operation 1040, the processor 120 may perform a heating mode operation based on the remaining charge level of the battery 189 and the temperature of the electronic device. In an example, as shown in FIG. 7, the processor 120 may set the maximum luminance threshold value for heating a variable region (e.g., the variable region 612 in FIG. 6A, the variable region 622 in FIG. 6B, or the variable region 632 in FIG. 6C) depending on the charge level of the battery 189. The processor 120 may heat the variable region 612, 622, or 632 of the display 610, 620, or 630 at the set maximum luminance threshold value.

At operation 1050, the processor 120 may determine whether the temperature of the display 610, 620, or 630 exceeds a threshold value.

If the temperature of the display 610, 620, or 630 does not exceed the threshold value, the processor 120 may return to the operation 1030 and perform the subsequent operations.

If the temperature of the display 610, 620, or 630 exceeds the threshold value, the heating operation of the display 610, 620, or 630 may be terminated.

Figure 11:
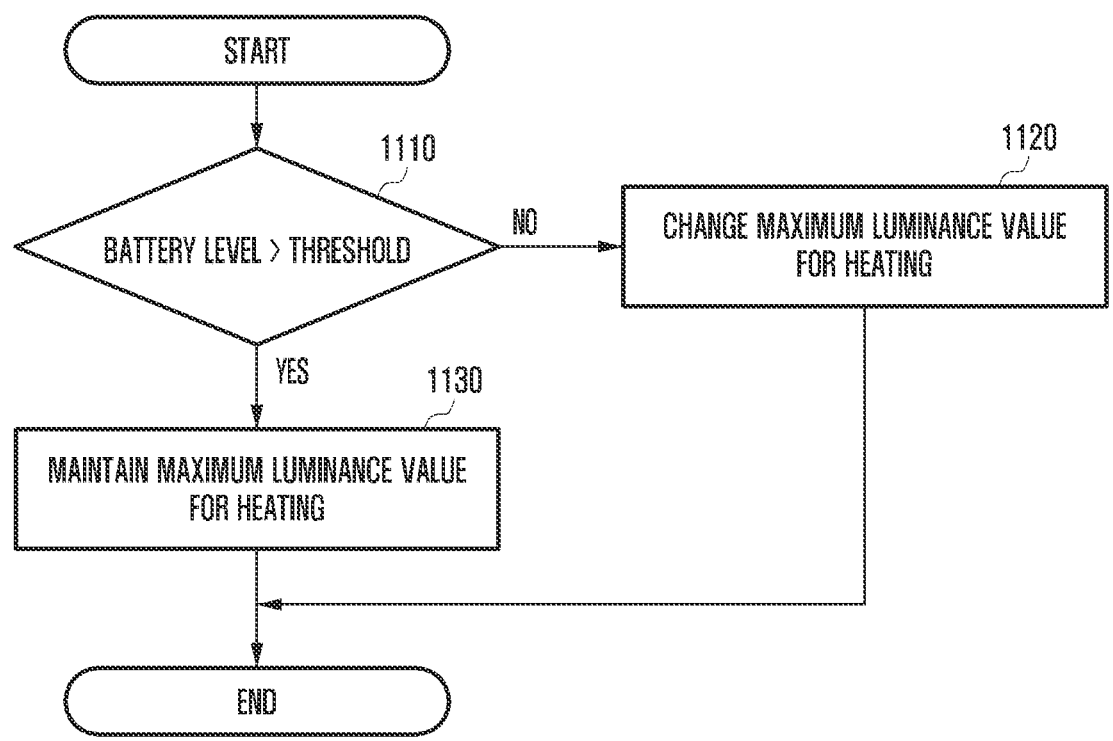
FIG. 11 is a diagram illustrating operations of heating a display depending on a charge level of a battery according to an embodiment of the disclosure.

FIG. 11 is a diagram illustrating operations of heating a display depending on a charge level of a battery according to an embodiment of the disclosure.

Figure 12:
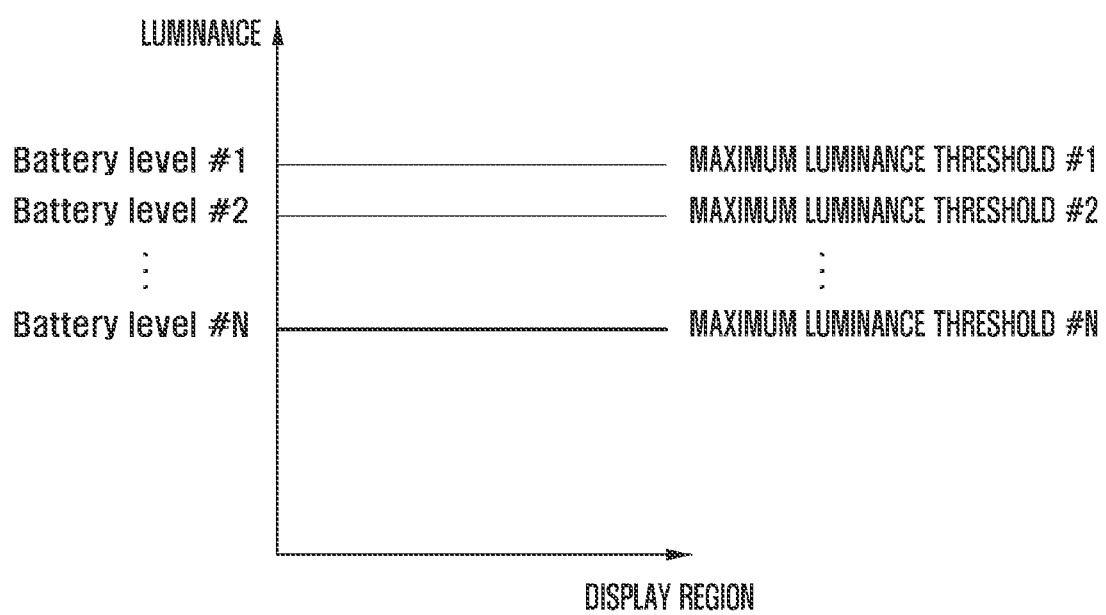
FIG. 12 is a diagram illustrating a maximum luminance threshold value for heating a display depending on a charge level of a battery according to an embodiment of the disclosure.

FIG. 12 is a diagram illustrating a maximum luminance threshold value for heating a display depending on a charge level of a battery according to an embodiment of the disclosure.

Referring to FIGS. 2B, 5, 7, 11, and 12, a processor 120 may perform a heating operation of a display (e.g., a display 610 in FIG. 6A, a display 620 in FIG. 6B, or a display 630 in FIG. 6C) in consideration of a charge level of a battery (e.g., a battery 189 in FIG. 1).

At operation 1110, the processor 120 may determine whether the charge level of the battery 189 exceeds a preset threshold value (e.g., 50% charge).

If the charge level of the battery 189 does not exceed the threshold value (e.g., 50% charge), the processor 120 may change the maximum luminance value for heating the display 610, 620, or 630 at operation 1120. The processor 120 may heat the display 610, 620, or 630 at the changed maximum luminance value.

If the charge level of the battery 189 exceeds the threshold value (e.g., 50% charge), the processor 120 may maintain the maximum luminance value for heating the display 610, 620, or 630 at operation 1130. The processor 120 may heat the display 610, 620, or 630 at the maintained maximum luminance value.

The operations shown in FIGS. 9 to 11 may be performed by the processor 120 or a separate control circuit. For example, a memory (e.g., the memory 130 in FIG. 1) of the electronic device may store instructions that cause, when executed, the processor 120 (or a control device) to perform at least some operations shown in FIGS. 9 to 11.

Figure 13:
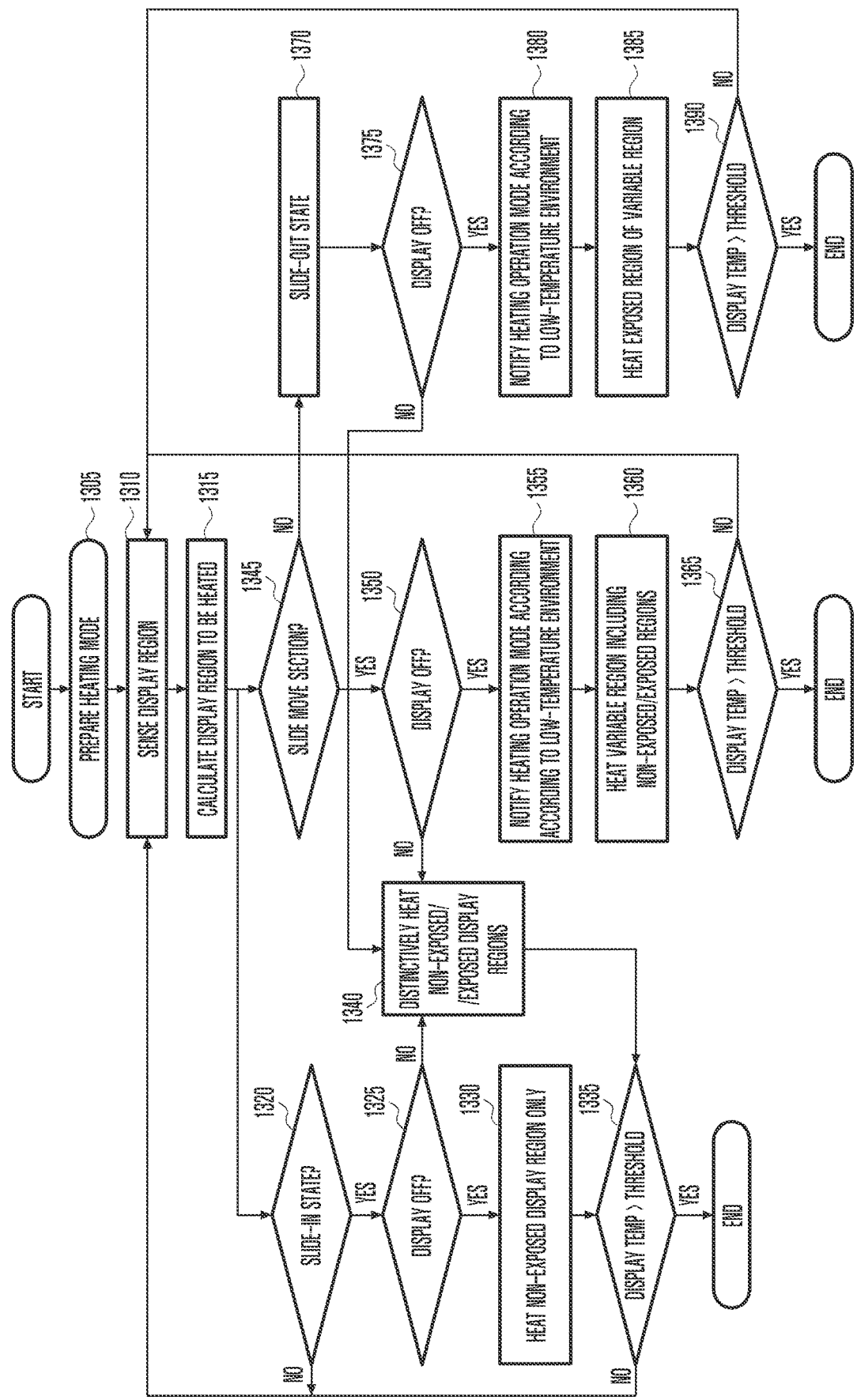
FIG. 13 is a diagram illustrating operations of heating a display to reduce a breakage of the display in a low-temperature environment according to an embodiment of the disclosure.

FIG. 13 is a diagram illustrating operations of heating a display to reduce a breakage of a display in a low-temperature environment according to an embodiment of the disclosure.

Figure 14A:
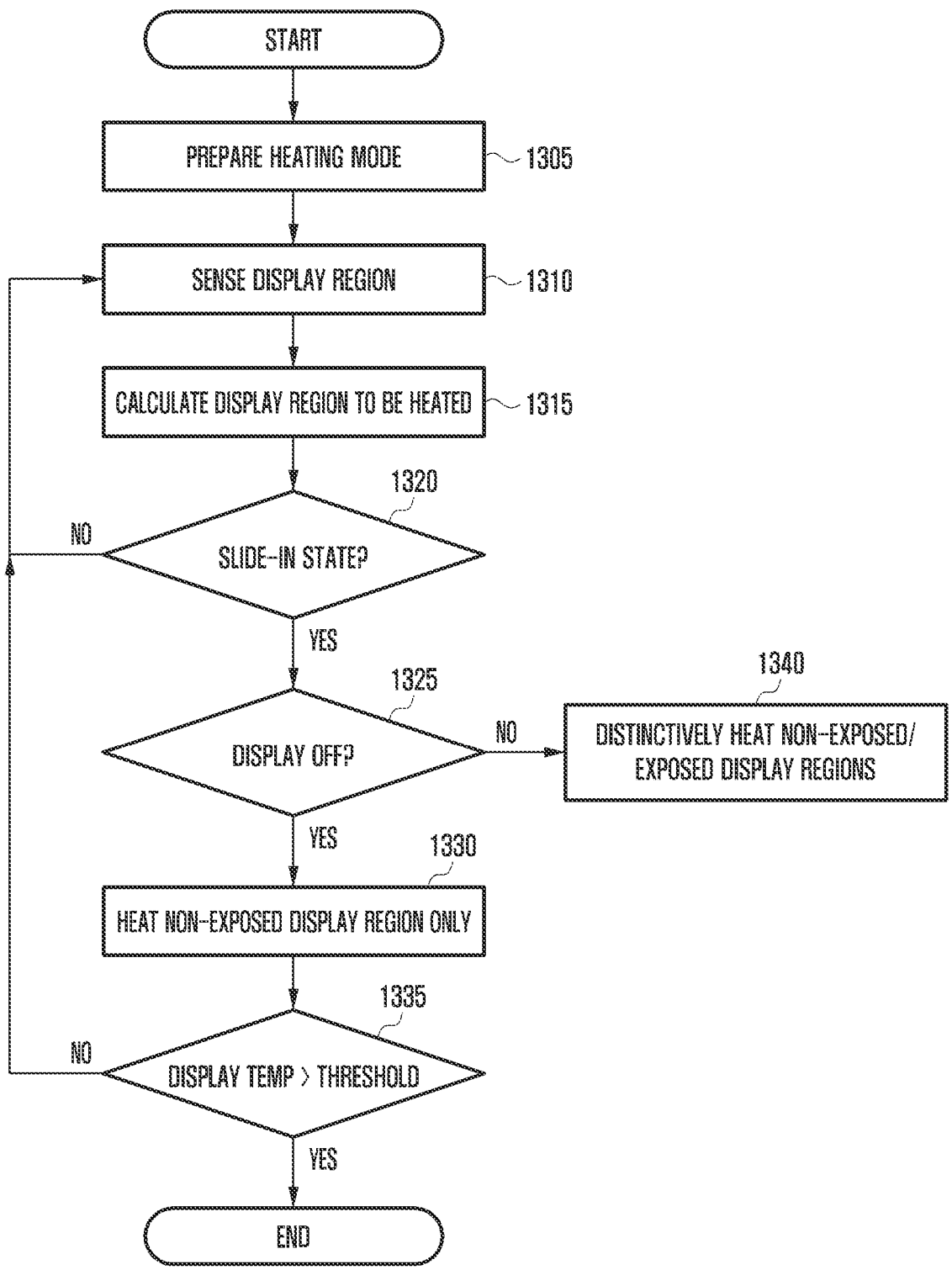
FIG. 14A is a diagram illustrating operations of heating a display in a screen reduction (e.g., slide-in) state of an electronic device according to an embodiment of the disclosure.

FIG. 14A is a diagram illustrating operations of heating a display in a screen reduction (e.g., slide-in) state of an electronic device according to an embodiment of the disclosure.

Referring to FIGS. 13 and 14A, at operation 1305, a processor (e.g., a processor 120 in FIG. 2B) may prepare a heating mode to reduce a breakage of a display (e.g., a display 610 in FIG. 6A, a display 620 in FIG. 6B, or a display 630 in FIG. 6C) when an external temperature of an electronic device (e.g., an electronic device 600 in FIG. 6A) is lower than a preset temperature (e.g., a temperature at which a breakage of a display is predicted).

At operation 1310, for heating the display 610, 620, or 630, the processor 120 may sense a fixed region (e.g., the fixed region 611 in FIG. 6A, the fixed region 621 in FIG. 6B, or the fixed region 631 in FIG. 6C) and a variable region (e.g., the variable region 612 in FIG. 6A, the variable region 622 in FIG. 6B, or the variable region 632 in FIG. 6C) of the display 610, 620, or 630.

At operation 1315, the processor 120 may calculate an expanded size (or reduced size) of the display 610, 620, or 630. The processor 120 may calculate a region to be heated in the entire region of the display 610, 620, or 630.

Thereafter, the processor 120 may determine whether the electronic device 600 is in a screen reduction state (e.g., operation 1320), a screen size change state (e.g., operation 1345), or a screen expansion state (e.g., operation 1370).

At operation 1320, the processor 120 may determine whether the electronic device 600 is in the screen reduction (e.g., slide-in) state.

If the electronic device 600 is not in the screen reduction (e.g., slide-in) state, the processor 120 may perform operation 1345.

If the electronic device 600 is in the screen reduction (e.g., slide-in) state, the processor 120 may determine at operation 1325 whether the screen of the display 610 is in the off state.

When the screen of the display 610 is off in the screen reduction (e.g., slide-in) state, the processor 120 may heat a non-exposed region of the display 610, that is, the variable region 612, at operation 1330. In an example, the processor 120 may heat the variable region 612 by increasing the luminance of pixels of the variable region 612. In an example, the processor 120 may heat the variable region 612 by increasing the driving frequency of pixels of the variable region 612. In an example, the processor 120 may heat the variable region 612 by increasing the luminance and driving frequency of pixels of the variable region 612.

At operation 1335, the processor 120 may measure a temperature of the display 610 by using at least one sensor module (e.g., the sensor module 570 in FIG. 5), and determine whether the temperature of the display 610 exceeds a preset threshold value (e.g., the minimum temperature capable of preventing the breakage of the display).

If the temperature of the display 610 does not exceed the preset threshold value (e.g., the minimum temperature capable of preventing the breakage of the display), the processor 120 may return to the operation 1310 and perform the subsequent procedure.

If the temperature of the display 610 exceeds the preset threshold value (e.g., the minimum temperature capable of preventing the breakage of the display), the processor 120 may terminate the heating operation of the display 610.

On the other hand, when at the operation 1325 the screen of the display 610 is not off (i.e., the screen is in the on state) in the screen reduction (e.g., slide-in) state, the processor 120 may distinctively perform a heating operation for an exposed region (e.g., the fixed region) and a non-exposed region (e.g., the variable region) of the display 610 at operation 1340.

According to an embodiment, in the screen reduction (e.g., slide-in) state, the processor 120 may heat the variable region 612 by increasing the luminance of pixels of the variable region 612. In an example, the processor 120 may heat the variable region 612 by increasing the driving frequency of pixels of the variable region 612. In an example, the processor 120 may heat the variable region 612 by increasing the luminance and driving frequency of pixels of the variable region 612.

At the same time, as shown in FIG. 5, heat generated by the electronic component 540 may be transferred to the variable region 612 of the display 610 through the heat dissipation member 550, the slide structure 400, and the flexible heat dissipation member 560, and thereby the variable region 612 may be heated at a predetermined temperature.

Figure 14B:
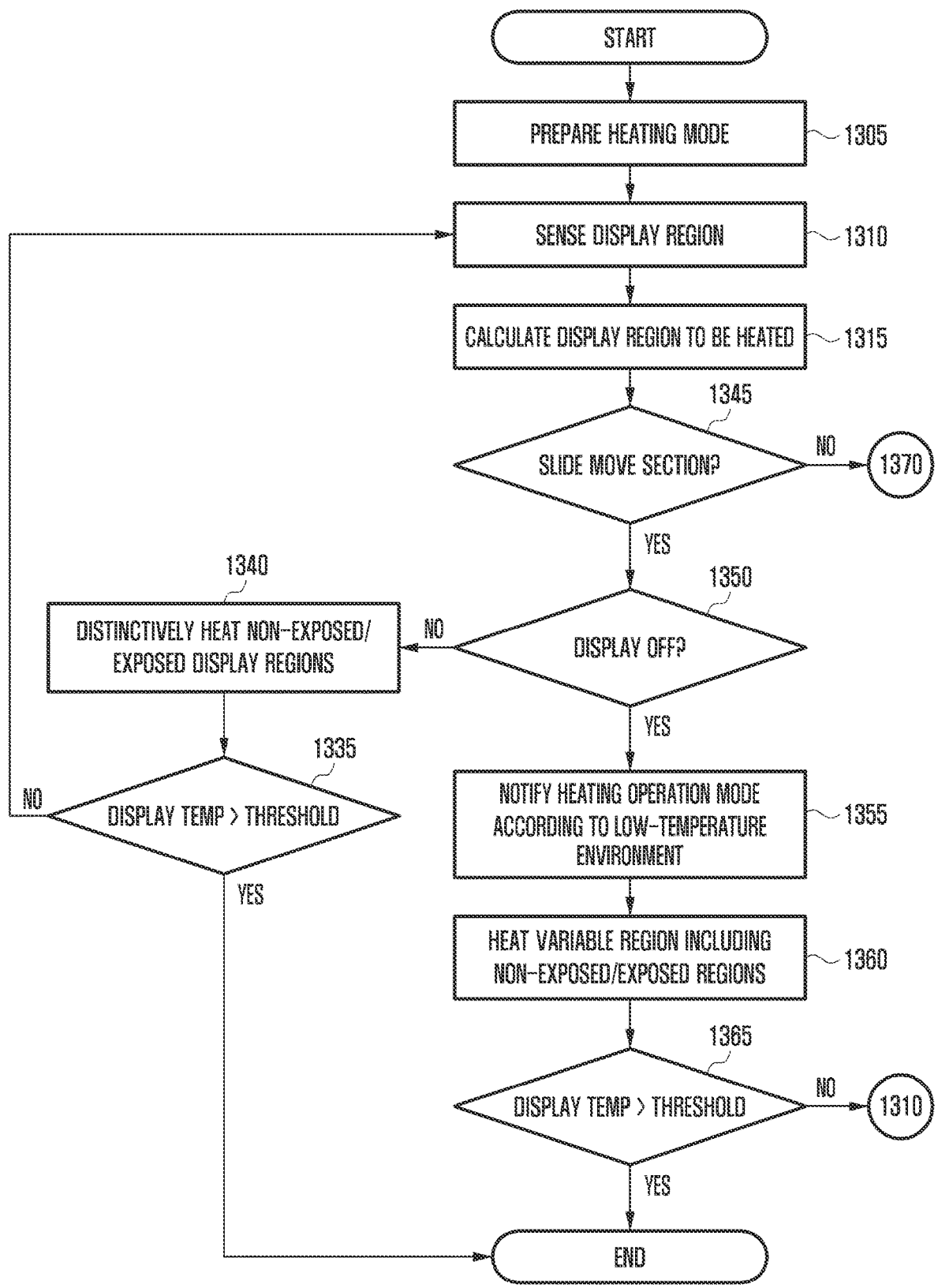
FIG. 14B is a diagram illustrating operations of heating a display in a screen size change (e.g., sliding) state of an electronic device according to an embodiment of the disclosure.

FIG. 14B is a diagram illustrating operations of heating a display in a screen size change (e.g., sliding) state of an electronic device according to an embodiment of the disclosure.

Referring to FIGS. 13 and 14B, at operation 1305, a processor (e.g., a processor 120 in FIG. 2B) may prepare a heating mode to reduce a breakage of a display (e.g., a display 610 in FIG. 6A, a display 620 in FIG. 6B, or a display 630 in FIG. 6C) when an external temperature of an electronic device (e.g., an electronic device 600 in FIG. 6A) is lower than a preset temperature (e.g., a temperature at which a breakage of a display is predicted).

At operation 1310, for heating the display 610, 620, or 630, the processor 120 may sense a fixed region (e.g., the fixed region 611 in FIG. 6A, the fixed region 621 in FIG. 6B, or the fixed region 631 in FIG. 6C) and a variable region (e.g., the variable region 612 in FIG. 6A, the variable region 622 in FIG. 6B, or the variable region 632 in FIG. 6C) of the display 610, 620, or 630.

At operation 1315, the processor 120 may calculate an expanded size (or reduced size) of the display 610, 620, or 630. The processor 120 may calculate a region to be heated in the entire region of the display 610, 620, or 630.

Thereafter, the processor 120 may determine whether the electronic device 600 is in a screen reduction state (e.g., operation 1320), a screen size change state (e.g., operation 1345), or a screen expansion state (e.g., operation 1370).

At operation 1345, the processor 120 may determine whether the electronic device 600 is in the screen size change (e.g., a slide movement section) state.

If the electronic device 600 is not in the screen size change state, the processor 120 may perform operation 1370.

If the electronic device 600 is in the screen size change state, the processor 120 may determine at operation 1350 whether the screen of the display 620 is in the off state.

If the screen of the display 620 is off in the screen size change state, the processor 120 may display at operation 1355 the heating operation mode of the display 620 according to a low-temperature environment as a notification.

Figure 15:
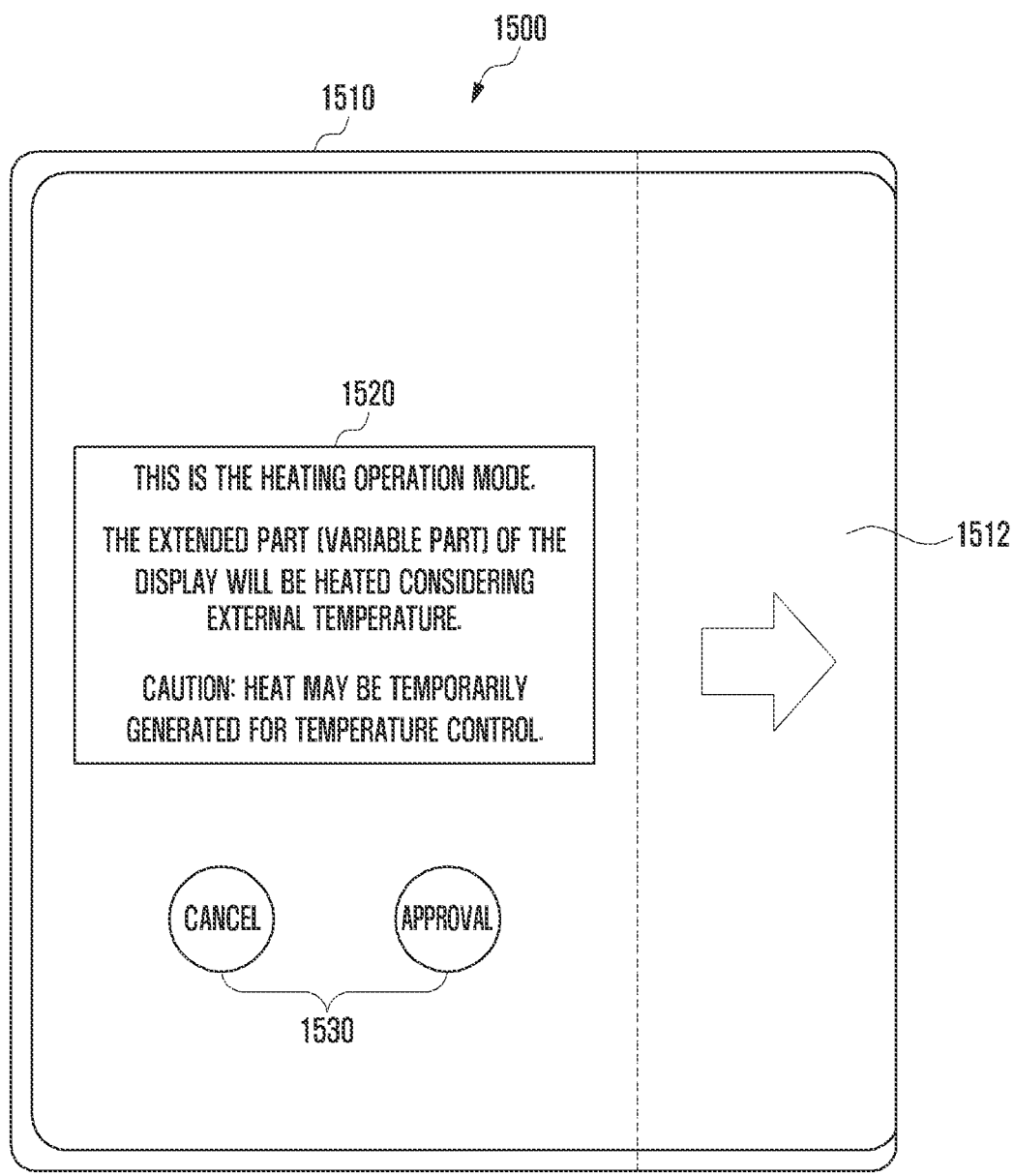
FIG. 15 is a diagram illustrating an example of a user interface for notifying a heating operation mode through a display of an electronic device according to an embodiment of the disclosure.

FIG. 15 is a diagram illustrating an example of a user interface for notifying a heating operation mode through a display of an electronic device according to an embodiment of the disclosure.

Referring to FIG. 15, a processor 120 may display a first user interface (UI) 1520 notifying a heating operation mode on a screen through a display 1510. Through the notification of the first UI 1520, a user may be informed that a variable region 1512 of the display 1510 is heated. In addition, the first UI 1520 may contain a caution notice that heat may be generated according to the heating operation of the display 1510. The processor 120 may not only notify the heating operation mode through the first UI 1520, but also display a second UI 1530 on the screen so that the heating operation mode can be canceled or approved by a user's selection.

Referring again to FIGS. 13 and 14B, at operation 1360, the processor 120 may heat an exposed region (e.g., the exposed region 622a in FIG. 6B) and a non-exposed region (e.g., the non-exposed region 622b in FIG. 6B) of the variable region (e.g., the variable region 622 in FIG. 6B). In an example, when the variable region 622 is heated, the processor 120 may heat the exposed region 622a and the non-exposed region 622b at the same temperature or different temperatures.

At operation 1365, the processor 120 may measure a temperature of the display 620 by using at least one sensor module (e.g., the sensor module 570 in FIG. 5), and determine whether the temperature of the display 620 exceeds a preset threshold value (e.g., the minimum temperature capable of preventing the breakage of the display).

If the temperature of the display 630 does not exceed the preset threshold value (e.g., the minimum temperature capable of preventing the breakage of the display), the processor 120 may return to the operation 1310 and perform the subsequent procedure.

If the temperature of the display 630 exceeds the preset threshold value (e.g., the minimum temperature capable of preventing the breakage of the display), the processor 120 may terminate the heating operation of the display 620.

On the other hand, when at the operation 1350 the screen of the display 620 is not off (i.e., the screen is in the on state) in the screen size change state, the processor 120 may distinctively perform a heating operation for the exposed region 622a and the non-exposed region 622b of the variable region 622 at operation 1340.

According to an embodiment, in the screen size change (e.g., sliding) state, the processor 120 may heat the variable region 622 by increasing the luminance of pixels of the variable region 622. In an example, the processor 120 may heat the variable region 622 by increasing the driving frequency of pixels of the variable region 622. In an example, the processor 120 may heat the variable region 622 by increasing the luminance and driving frequency of pixels of the variable region 622.

At the same time, as shown in FIG. 5, heat generated by the electronic component 540 may be transferred to the variable region 622 of the display 620 through the heat dissipation member 550, the slide structure 400, and the flexible heat dissipation member 560, and thereby the variable region 622 may be heated at a predetermined temperature.

Figure 14C:
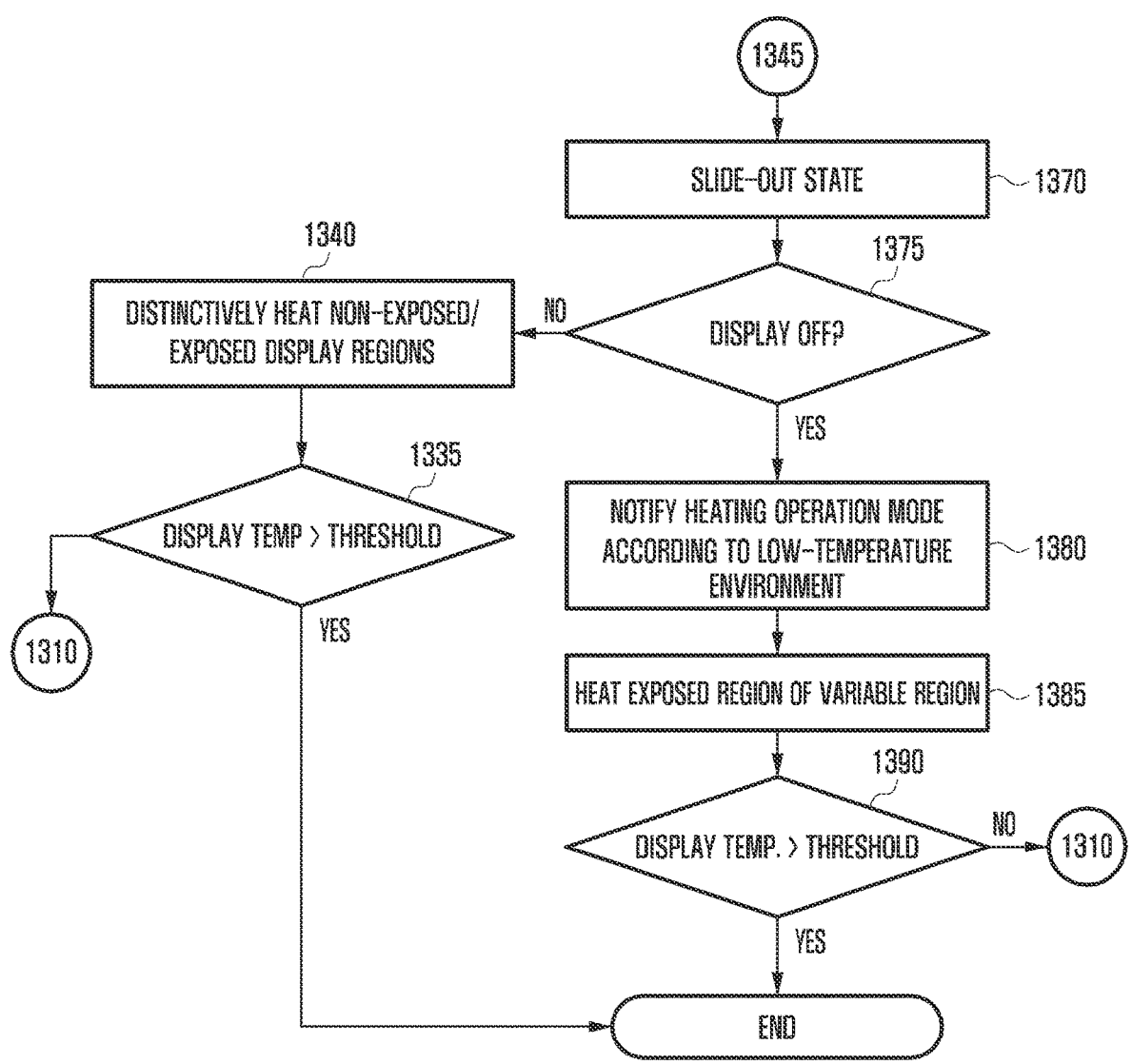
FIG. 14C is a diagram illustrating operations of heating a display in a screen expansion (e.g., slide-out) state of an electronic device according to an embodiment of the disclosure.

FIG. 14C is a diagram illustrating operations of heating a display in a screen expansion (e.g., slide-out) state of an electronic device according to an embodiment of the disclosure.

Referring to FIGS. 13 and 14C at operation 1345, a processor 120 may determine whether an electronic device 600 is in a screen size change (e.g., a slide movement section) state.

If the electronic device 600 is not in the screen size change state as the result of determination at the operation 1345, the processor 120 may determine at the operation 1370 that the electronic device (e.g., the electronic device 600 in FIG. 6C) is in the screen expansion (e.g., slide-out) state.

At operation 1375, the processor 120 may determine whether the screen of the display (e.g., the display 630 in FIG. 6C) is in the off state while the electronic device 600 is in the screen expansion (e.g., slide-out) state.

If the screen of the display 620 is in the off state as the result of determination at the operation 1375, the processor 120 may display at operation 1380 the heating operation mode of the display 620 according to a low-temperature environment as a notification.

In an example, the processor 120 may display a first UI (e.g., the first UI 1520 in FIG. 15) notifying the heating operation mode on the screen through the display. Through the notification of the first UI 1520, a user may be informed that the variable region of the display is heated. The processor 120 may not only notify the heating operation mode through the first UI 1520, but also display a second UI (e.g., the second UI 1530 in FIG. 15) on the screen so that the heating operation mode can be canceled or approved by a user's selection.

At operation 1385, the processor 120 may heat the variable region 632 of the display 630.

At operation 1390, the processor 120 may measure a temperature of the display 630 by using at least one sensor module (e.g., the sensor module 570 in FIG. 5), and determine whether the temperature of the display 630 exceeds a preset threshold value (e.g., the minimum temperature capable of preventing the breakage of the display).

If the temperature of the display 630 does not exceed the preset threshold value (e.g., the minimum temperature capable of preventing the breakage of the display), the processor 120 may return to the operation 1310 and perform the subsequent procedure.

If the temperature of the display 630 exceeds the preset threshold value (e.g., the minimum temperature capable of preventing the breakage of the display), the processor 120 may terminate the heating operation of the display 620.

On the other hand, when the screen of the display 630 is not in the off state (i.e., the screen is in the on state) as the result of determination at the operation 1375, the processor 120 may distinctively perform a heating operation for the exposed region (e.g., the fixed region) and the non-exposed region (e.g., the variable region) of the display 630 at operation 1340.

According to an embodiment, in the screen expansion (e.g., slide-out) state, the processor 120 may heat the variable region 632 by increasing the luminance of pixels of the variable region 632. In an example, the processor 120 may heat the variable region 632 by increasing the driving frequency of pixels of the variable region 632. In an example, the processor 120 may heat the variable region 632 by increasing the luminance and driving frequency of pixels of the variable region 632.

At the same time, as shown in FIG. 5, heat generated by the electronic component 540 may be transferred to the variable region 632 of the display 630 through the heat dissipation member 550, the slide structure 400, and the flexible heat dissipation member 560, and thereby the variable region 632 may be heated at a predetermined temperature.

The operations shown in FIGS. 13 to 15 may be performed by the processor 120 or a separate control circuit. For example, a memory (e.g., the memory 130 in FIG. 1) of the electronic device may store instructions that cause, when executed, the processor 120 (or a control device) to perform at least some operations shown in FIGS. 13 to 15.

The electronic device according to various embodiments of the disclosure can heat the variable region of the display in screen expansion (e.g., slide-out), screen reduction (e.g., slide-in), and screen size change (e.g., sliding) states of the electronic device in consideration of a temperature environment (external temperature) that may cause a breakage of the display. Through this, it is possible to reduce the display breakage caused by a low-temperature environment when the screen size of the electronic device is changed.

The electronic device according to various embodiments of the disclosure may set the luminance and/or the driving frequency for heating the display in consideration of the charge level of the battery. Through this, it is possible to quickly heat the display and thereby reduce a breakage of the display in a low-temperature environment.

According to various embodiments, an operating method of an electronic device (e.g., the electronic device 200 in FIG. 2A, the electronic device 300 in FIG. 3A, the electronic device 300 in FIG. 3B, the electronic device 300 in FIG. 3C, the electronic device 500 in FIG. 5, the electronic device 600 in FIG. 6A, the electronic device 600 in FIG. 6B, or the electronic device 600 in FIG. 6C) may measure an external temperature of the electronic device 200, 300, 500, or 600 by using at least one sensor module (e.g., the sensor module 176 in FIG. 1 or the sensor module 570 in FIG. 5). The method may calculate, from an entire region of a flexible display (e.g., the display 210 in FIG. 2, the display 310 in FIG. 3A, the display 320 in FIG. 3B, the display 330 in FIG. 3C, the display 510 in FIG. 5, the display 610 in FIG. 6A, the display 620 in FIG. 6B, or the display 630 in FIG. 6C), a fixed region 311, 611, 621, or 631 that is visually exposed to an outside regardless of a screen size of the electronic device 200, 300, 500, or 600, and a variable region 312, 322, 612, 622, or 632 that is visually exposed at least in part to the outside in a screen expansion or screen size change state of the electronic device 200, 300, 500, or 600. The method may compare the external temperature with a preset first threshold temperature, thereby determining heating of the variable region 312, 322, 612, 622, or 632 when the external temperature is smaller than the first threshold temperature. The method may heat the variable region 312, 322, 612, 622, or 632 by controlling at least one of a luminance and a driving frequency of the variable region 312, 322, 612, 622, or 632.

According to an embodiment, the method may, in a screen reduction state of the electronic device 200, 300, 500, or 600 in which the fixed region 311, 611, 621, or 631 of the flexible display 210, 310, 320, 330, 510, 610, 620, or 630 is visually exposed and the variable region 312, 322, 612, 622, or 632 is not visually exposed, heat the variable region 312, 322, 612, 622, or 632 by causing pixels of the variable region 312, 322, 612, 622, or 632 to emit light.

According to an embodiment, the method may divide the variable region 312, 322, 612, 622, or 632 into a plurality of regions, and differently adjust a light emission luminance of pixels of the plurality of region, wherein pixels of a first region adjacent to the fixed region 311, 611, 621, or 631 among the plurality of regions emit light at a first luminance, and wherein pixels of a second region spaced apart from the fixed region 311, 611, 621, or 631 among the plurality of regions emit light at a second luminance lower than the first luminance.

According to an embodiment, the method may drive pixels of the fixed region 311, 611, 621, or 631 at a driving frequency, and drive pixels of the variable region 312, 322, 612, 622, or 632 at a heating frequency higher than the driving frequency.

According to an embodiment, the method may divide the variable region 312, 322, 612, 622, or 632 into a plurality of regions, and differently adjust a heating frequency of pixels of the plurality of region, wherein pixels of a first region adjacent to the fixed region 311, 611, 621, or 631 among the plurality of regions are driven at a first heating frequency, and wherein pixels of a second region spaced apart from the fixed region 311, 611, 621, or 631 among the plurality of regions are driven at a second heating frequency lower than the first heating frequency.

According to an embodiment, the method may, in the screen size change state of the electronic device 200, 300, 500, or 600 in which a part of the variable region 312, 322, 612, 622, or 632 is visually exposed to the outside, heat the variable region 312, 322, 612, 622, or 632 by causing, in the variable region 312, 322, 612, 622, or 632, pixels of a first region visually exposed to the outside and pixels of a second region not visually exposed to the outside to emit light.

According to an embodiment, the pixels of the second region may emit light at a higher luminance than the pixels of the first region.

According to an embodiment, the method may drive pixels of the fixed region 311, 611, 621, or 631 at a driving frequency, and drive the pixels of the first region and the pixels of the second region at a heating frequency higher than the driving frequency.

According to an embodiment, the method may differently adjust a heating frequency of pixels of the first region and pixels of the second region, wherein pixels of the first region adjacent to the fixed region 311, 611, 621, or 631 among the plurality of regions are driven at a first heating frequency, and wherein pixels of the second region spaced apart from the fixed region 311, 611, 621, or 631 among the plurality of regions are driven at a second heating frequency lower than the first heating frequency.

According to an embodiment, the method may, in the screen expansion state of the electronic device 200, 300, 500, or 600 in which the entire variable region 312, 322, 612, 622, or 632 is visually exposed to the outside, heat the variable region 312, 322, 612, 622, or 632 by causing pixels of the variable region 312, 322, 612, 622, or 632 to emit light.

According to an embodiment, the method may divide the variable region 312, 322, 612, 622, or 632 into a plurality of regions, and differently adjust a light emission luminance of pixels of the plurality of region, wherein pixels of a first region adjacent to the fixed region 311, 611, 621, or 631 among the plurality of regions emit light at a first luminance, and wherein pixels of a second region spaced apart from the fixed region 311, 611, 621, or 631 among the plurality of regions emit light at a second luminance lower than the first luminance.

According to an embodiment, the method may drive pixels of the fixed region 311, 611, 621, or 631 at a driving frequency, and drive pixels of the variable region 312, 322, 612, 622, or 632 at a heating frequency higher than the driving frequency.

According to an embodiment, the method may divide the variable region 312, 322, 612, 622, or 632 into a plurality of regions, and differently adjust a heating frequency of pixels of the plurality of region, wherein pixels of a first region adjacent to the fixed region 311, 611, 621, or 631 are driven at a first heating frequency, and wherein pixels of a second region spaced apart from the fixed region 311, 611, 621, or 631 are driven at a second heating frequency lower than the first heating frequency.

According to an embodiment, the method may sense a temperature of the flexible display 210, 310, 320, 330, 510, 610, 620, or 630, compare temperature of the flexible display 210, 310, 320, 330, 510, 610, 620, or 630 with a preset second threshold temperature, and heat the variable region 312, 322, 612, 622, or 632 until the temperature of the flexible display 210, 310, 320, 330, 510, 610, 620, or 630 exceeds the second threshold temperature.

According to an embodiment, the method may identify a charge level of a battery of the electronic device 200, 300, 500, or 600, and adjust a light emission luminance value of pixels of the variable region 312, 322, 612, 622, or 632 for heating the variable region 312, 322, 612, 622, or 632 based on the charge level of the battery.

According to an embodiment, the method may identify a charge level of a battery of the electronic device 200, 300, 500, or 600, and adjust a driving frequency of pixels of the variable region 312, 322, 612, 622, or 632 for heating the variable region 312, 322, 612, 622, or 632 based on the charge level of the battery.

According to an embodiment, the method may, when the flexible display 210, 310, 320, 330, 510, 610, 620, or 630 is turned on in the screen reduction state, distinctively heat the fixed region 311, 611, 621, or 631 and a non-exposed region of the variable region 312, 322, 612, 622, or 632 in the flexible display 210, 310, 320, 330, 510, 610, 620, or 630, wherein a light emission luminance of the variable region 312, 322, 612, 622, or 632 is higher than a light emission luminance of the fixed region 311, 611, 621, or 631.

According to an embodiment, the method may, when the flexible display 210, 310, 320, 330, 510, 610, 620, or 630 is turned off in the screen reduction state, heat only the variable region 312, 322, 612, 622, or 632.

According to an embodiment, the method may, when the flexible display 210, 310, 320, 330, 510, 610, 620, or 630 is turned on in the screen size change state, cause the pixels of the first region visually exposed to the outside and the pixels of the second region not visually exposed to the outside to emit light at different luminances.

According to an embodiment, the method may, when the flexible display 210, 310, 320, 330, 510, 610, 620, or 630 is turned off in the screen size change state, cause the pixels of the first region visually exposed to the outside and the pixels of the second region not visually exposed to the outside to emit light at the same luminance.

According to an embodiment, the method may, when the flexible display 210, 310, 320, 330, 510, 610, 620, or 630 is turned on in the screen expansion state, cause the pixels of the fixed region 311, 611, 621, or 631 and the pixels of the variable region 312, 322, 612, 622, or 632 to emit light at different luminances.

According to various embodiments, an electronic device (e.g., the electronic device 200 in FIG. 2A, the electronic device 300 in FIG. 3A, the electronic device 300 in FIG. 3B, the electronic device 300 in FIG. 3C, the electronic device 500 in FIG. 5, the electronic device 600 in FIG. 6A, the electronic device 600 in FIG. 6B, or the electronic device 600 in FIG. 6C) may include a housing 221 or 223, a flexible display (e.g., the display 210 in FIG. 2, the display 310 in FIG. 3A, the display 320 in FIG. 3B, the display 330 in FIG. 3C, the display 510 in FIG. 5, the display 610 in FIG. 6A, the display 620 in FIG. 6B, or the display 630 in FIG. 6C), a display driver, a plurality of sensors (e.g., the sensor module 176 in FIG. 1 or the sensor module 570 in FIG. 5), a processor 120, and a memory 130. The flexible display 210, 310, 320, 330, 510, 610, 620, or 630 may include a variable region 312, 322, 612, 622, or 632 drawn out from the housing 221 or 223 to an outside or inserted into the housing 221 or 223 from the outside when a screen size is changed. The display driver may drive the flexible display 210, 310, 320, 330, 510, 610, 620, or 630. The plurality of sensors (e.g., the sensor module 176 in FIG. 1 or the sensor module 570 in FIG. 5) may sense an external temperature of the electronic device 200, 300, 500, or 600, a temperature of the flexible display 210, 310, 320, 330, 510, 610, 620, or 630, and the variable region 312, 322, 612, 622, or 632 depending on a change in the screen size of the electronic device 200, 300, 500, or 600. The processor 120 may control the display driver and the plurality of sensors (e.g., the sensor module 176 in FIG. 1 or the sensor module 570 in FIG. 5). The memory 130 may be operatively connected to the processor 120. The memory 130 may store instructions that cause, when executed, the processor 120 to measure the external temperature of the electronic device 200, 300, 500, or 600 by using at least one of the plurality of sensors (e.g., the sensor module 176 in FIG. 1 or the sensor module 570 in FIG. 5), to calculate, from an entire region of the flexible display 210, 310, 320, 330, 510, 610, 620, or 630, a fixed region 311, 611, 621, or 631 that is visually exposed to the outside regardless of the screen size of the electronic device 200, 300, 500, or 600, and a variable region 312, 322, 612, 622, or 632 that is visually exposed at least in part to the outside in a screen expansion or screen size change state of the electronic device 200, 300, 500, or 600, to compare the external temperature with a preset first threshold temperature, thereby determining heating of the variable region 312, 322, 612, 622, or 632 when the external temperature is smaller than the first threshold temperature, and to heat the variable region 312, 322, 612, 622, or 632 by controlling at least one of a luminance and a driving frequency of the variable region 312, 322, 612, 622, or 632.

According to an embodiment, in a screen reduction state of the electronic device 200, 300, 500, or 600 in which the fixed region 311, 611, 621, or 631 is visually exposed and the variable region 312, 322, 612, 622, or 632 is not visually exposed, the processor may be caused to heat the variable region 312, 322, 612, 622, or 632 by causing pixels of the variable region 312, 322, 612, 622, or 632 to emit light.

According to an embodiment, the processor may be caused to divide the variable region 312, 322, 612, 622, or 632 into a plurality of regions, and to differently adjust a light emission luminance of pixels of the plurality of region, wherein pixels of a first region adjacent to the fixed region 311, 611, 621, or 631 among the plurality of regions emit light at a first luminance, and wherein pixels of a second region spaced apart from the fixed region 311, 611, 621, or 631 among the plurality of regions emit light at a second luminance lower than the first luminance.

According to an embodiment, the processor may be caused to drive pixels of the fixed region 311, 611, 621, or 631 at a driving frequency, and to drive pixels of the variable region 312, 322, 612, 622, or 632 at a heating frequency higher than the driving frequency.

According to an embodiment, the processor may be caused to, in the screen size change state of the electronic device 200, 300, 500, or 600 in which a part of the variable region 312, 322, 612, 622, or 632 is visually exposed to the outside, heat the variable region 312, 322, 612, 622, or 632 by causing, in the variable region 312, 322, 612, 622, or 632, pixels of a first region visually exposed to the outside and pixels of a second region not visually exposed to the outside to emit light.

According to an embodiment, the pixels of the second region may emit light at a higher luminance than the pixels of the first region.

According to an embodiment, the processor may be caused to drive pixels of the fixed region 311, 611, 621, or 631 at a driving frequency, and to drive pixels of the variable region 312, 322, 612, 622, or 632 at a heating frequency higher than the driving frequency.

According to an embodiment, the processor may be caused to, in the screen expansion state of the electronic device 200, 300, 500, or 600 in which the entire variable region 312, 322, 612, 622, or 632 is visually exposed to the outside, heat the variable region 312, 322, 612, 622, or 632 by causing pixels of the variable region 312, 322, 612, 622, or 632 to emit light.

According to an embodiment, the processor may be caused to divide the variable region 312, 322, 612, 622, or 632 into a plurality of regions, and to differently adjust a light emission luminance of pixels of the plurality of region, wherein pixels of a first region adjacent to the fixed region 311, 611, 621, or 631 among the plurality of regions emit light at a first luminance, and wherein pixels of a second region spaced apart from the fixed region 311, 611, 621, or 631 among the plurality of regions emit light at a second luminance lower than the first luminance.

According to an embodiment, the processor may be caused to drive pixels of the fixed region 311, 611, 621, or 631 at a driving frequency, and to drive pixels of the variable region 312, 322, 612, 622, or 632 at a heating frequency higher than the driving frequency.

According to an embodiment, the processor may be caused to identify a charge level of a battery of the electronic device 200, 300, 500, or 600, and to adjust a light emission luminance value of pixels of the variable region 312, 322, 612, 622, or 632 for heating the variable region 312, 322, 612, 622, or 632 based on the charge level of the battery.

According to an embodiment, the processor may be caused to identify a charge level of a battery of the electronic device 200, 300, 500, or 600, and to adjust a driving frequency of pixels of the variable region 312, 322, 612, 622, or 632 for heating the variable region 312, 322, 612, 622, or 632 based on the charge level of the battery.

According to various embodiments, an electronic device (e.g., the electronic device 200 in FIG. 2A, the electronic device 300 in FIG. 3A, the electronic device 300 in FIG. 3B, the electronic device 300 in FIG. 3C, the electronic device 500 in FIG. 5, the electronic device 600 in FIG. 6A, the electronic device 600 in FIG. 6B, or the electronic device 600 in FIG. 6C) may include a housing 221 or 223, a flexible display (e.g., the display 210 in FIG. 2, the display 310 in FIG. 3A, the display 320 in FIG. 3B, the display 330 in FIG. 3C, the display 510 in FIG. 5, the display 610 in FIG. 6A, the display 620 in FIG. 6B, or the display 630 in FIG. 6C), a printed circuit board 530, a heat dissipation member 550, a slide structure, and a flexible heat dissipation member 560. The flexible display 210, 310, 320, 330, 510, 610, 620, or 630 may include, among an entire region thereof, a fixed region 311, 611, 621, or 631 visually exposed to an outside regardless of a screen size of the electronic device 200, 300, 500, or 600, and a variable region 312, 322, 612, 622, or 632 drawn out from the housing 221 or 223 and visually exposed at least in part to the outside in a screen expansion or screen size change state of the electronic device 200, 300, 500, or 600. The printed circuit board 530 may be disposed in an inner space of the housing 221 or 223 and include an electronic component 540. The heat dissipation member 550 may be disposed on the electronic component 540 and dissipate heat generated by the electronic component 540. The slide structure may include a slide plate disposed on the heat dissipation member 550 in the inner space of the housing 221 or 223 and supporting the fixed region 311, 611, 621, or 631, and a plurality of multi-bars supporting the variable region 312, 322, 612, 622, or 632. The flexible heat dissipation member 560 may be disposed on the slide structure. The flexible heat dissipation member 560 may be disposed between the slide structure and the flexible display 210, 310, 320, 330, 510, 610, 620, or 630, and dissipate heat generated by the electronic component 540 to the flexible display 210, 310, 320, 330, 510, 610, 620, or 630.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An operating method of an electronic device, the method comprising:
measuring an external temperature of the electronic device by using at least one sensor;
calculating, from an entire region of a flexible display, a fixed region that is visually exposed to an outside regardless of a screen size of the electronic device, and a variable region that is visually exposed at least in part to the outside in a screen expansion or screen size change state of the electronic device;
comparing the external temperature with a preset first threshold temperature, thereby determining heating of the variable region in response to the external temperature being less than the preset first threshold temperature; and
heating the variable region by controlling at least one of a luminance or a driving frequency of the variable region.

2. The method of claim 1, comprising:
in a screen reduction state of the electronic device in which the fixed region of the flexible display is visually exposed and the variable region is not visually exposed, heating the variable region by causing pixels of the variable region to emit light.

3. The method of claim 2, comprising:
dividing the variable region into a plurality of regions; and
differently adjusting a light emission luminance of pixels of the plurality of region,
wherein pixels of a first region adjacent to the fixed region among the plurality of regions emit light at a first luminance, and
wherein pixels of a second region spaced apart from the fixed region among the plurality of regions emit light at a second luminance lower than the first luminance.

4. The method of claim 2, comprising:
driving pixels of the fixed region at a driving frequency; and
driving pixels of the variable region at a heating frequency higher than the driving frequency.

5. The method of claim 1, comprising:
in the screen size change state of the electronic device in which a part of the variable region is visually exposed to the outside, heating the variable region by causing, in the variable region, pixels of a first region visually exposed to the outside and pixels of a second region not visually exposed to the outside to emit light.

6. The method of claim 5, comprising:
driving pixels of the fixed region at a driving frequency; and
driving the pixels of the first region and the pixels of the second region at a heating frequency higher than the driving frequency.

7. The method of claim 5, comprising:
in response to the flexible display being turned on in the screen size change state, causing the pixels of the first region visually exposed to the outside and the pixels of the second region not visually exposed to the outside to emit light at different luminances.

8. The method of claim 1, comprising:
in a screen expansion state of the electronic device in which the entire variable region is visually exposed to the outside, heating the variable region by causing pixels of the variable region to emit light.

9. The method of claim 2, comprising:
in response to the flexible display being turned on in the screen reduction state, distinctively heating the fixed region and a non-exposed region of the variable region in the flexible display, wherein a light emission luminance of the variable region is higher than a light emission luminance of the fixed region.

10. The method of claim 2, comprising:
in response to the flexible display being turned off in the screen reduction state, heating only the variable region.

11. An electronic device comprising:
a housing;
a flexible display comprising a variable region drawn out from the housing to an outside or inserted into the housing from the outside in response to a screen size being changed;
a display driver controlling the flexible display;
a plurality of sensors sensing an external temperature of the electronic device, a temperature of the flexible display, and the variable region depending on a change in the screen size of the electronic device;
a processor controlling the display driver and the plurality of sensors; and
a memory operatively connected to the processor,
wherein the memory stores instructions that cause, when executed, the processor to:
 measure the external temperature of the electronic device by using at least one of the plurality of sensors,
 calculate, from an entire region of the flexible display, a fixed region that is visually exposed to the outside regardless of the screen size of the electronic device, and a variable region that is visually exposed at least in part to the outside in a screen expansion or screen size change state of the electronic device,
 compare the external temperature with a preset first threshold temperature, thereby determining heating of the variable region in response to the external temperature being less than the preset first threshold temperature, and
 heat the variable region by controlling at least one of a luminance or a driving frequency of the variable region.

12. The electronic device of claim 11, wherein the instructions further cause the processor to:
in a screen reduction state of the electronic device in which the fixed region is visually exposed and the variable region is not visually exposed, heat the variable region by causing pixels of the variable region to emit light.

13. The electronic device of claim 12, wherein the instructions further cause the processor to:
divide the variable region into a plurality of regions, and
differently adjust a light emission luminance of pixels of the plurality of region,
wherein pixels of a first region adjacent to the fixed region among the plurality of regions emit light at a first luminance, and
wherein pixels of a second region spaced apart from the fixed region among the plurality of regions emit light at a second luminance lower than the first luminance.

14. The electronic device of claim 12, wherein the instructions further cause the processor to:
drive pixels of the fixed region at a driving frequency, and
drive pixels of the variable region at a heating frequency higher than the driving frequency.

15. The electronic device of claim 11, wherein the instructions further cause the processor to:
in the screen size change state of the electronic device in which a part of the variable region is visually exposed to the outside, heat the variable region by causing, in the variable region, pixels of a first region visually exposed to the outside and pixels of a second region not visually exposed to the outside to emit light.

16. The electronic device of claim 15, wherein the pixels of the second region emit light at a higher luminance than the pixels of the first region.

17. The electronic device of claim 11, wherein the instructions further cause the processor to:
in a screen expansion state of the electronic device in which the entire variable region is visually exposed to the outside, heat the variable region by causing pixels of the variable region to emit light.

18. The electronic device of claim 11, wherein the instructions further cause the processor to:
identify a charge level of a battery of the electronic device, and
adjust a light emission luminance value of pixels of the variable region for heating the variable region based on the charge level of the battery.

19. The electronic device of claim 11, wherein the instructions further cause the processor to:
identify a charge level of a battery of the electronic device, and
adjust a driving frequency of pixels of the variable region for heating the variable region based on the charge level of the battery.

* * * * *